US012623624B2

(12) United States Patent
Wang

(10) Patent No.: US 12,623,624 B2
(45) Date of Patent: May 12, 2026

(54) COMPONENT FOR VEHICLE INTERIOR

(71) Applicant: Shanghai Yanfeng Jinqiao Automotive Trim Systems Co., Ltd., Novi, MI (US)

(72) Inventor: Liyong Wang, Shanghai (CN)

(73) Assignee: Shanghai Yanfeng Jinqiao Automotive Trim Systems Co., Ltd., Novi, MI (US)

( * ) Notice: Subject to any disclaimer, the term of this patent is extended or adjusted under 35 U.S.C. 154(b) by 52 days.

(21) Appl. No.: 18/825,607

(22) Filed: Sep. 5, 2024

(65) Prior Publication Data

US 2025/0010810 A1    Jan. 9, 2025

Related U.S. Application Data

(63) Continuation-in-part of application No. 17/941,579, filed on Sep. 9, 2022, now abandoned, which is a
(Continued)

(30) Foreign Application Priority Data

Apr. 23, 2020    (CN) ........................ 202010326691.X

(51) Int. Cl.
B60R 21/2165        (2011.01)
B32B 3/30            (2006.01)
B32B 27/06           (2006.01)

(52) U.S. Cl.
CPC ........... B60R 21/2165 (2013.01); B32B 3/30 (2013.01); B32B 27/06 (2013.01); B32B 2274/00 (2013.01);
(Continued)

(58) Field of Classification Search
CPC .............................. B60R 21/2165; B32B 3/30
See application file for complete search history.

(56) References Cited

U.S. PATENT DOCUMENTS 5,316,822 A * 5/1994 Nishijima ........... B60R 21/2165
428/218
7,165,782 B2 * 1/2007 Yasuda ............... B60R 21/2165
264/400
(Continued)

FOREIGN PATENT DOCUMENTS

CN        110949308 A     4/2020
DE    10 2005 012 720 A1    9/2006
(Continued)

OTHER PUBLICATIONS

Communication pursuant to Article 94(3) EPC received for EP Patent Application Serial No. 21792005.7 dated Oct. 24, 2024, 5 pages.

*Primary Examiner* — Faye M Fleming
(74) *Attorney, Agent, or Firm* — Amin, Turocy & Watson, LLP

(57)        ABSTRACT

A vehicle interior component configured to provide an opening for airbag deployment is disclosed. The component may comprise a substrate and a cover structure comprising a single-layer cover comprising a generally uniform outer surface and an inner surface comprising a line such as a seam/tear line; the line may comprise sections and/or a set of cavities; the line may be not readily perceptible at the outer surface; the line may comprise an opening section and a groove connecting cavities; the line may comprise an intermediate section and a transition section. The cover structure may comprise a molded cover such as a single-layer molded cover/skin. A cavity may comprise a depth and facets. The cover structure/cover may consist essentially of a resin material. The component may comprise a trim panel, instrument panel, door panel, etc. A method for forming a
(Continued)

component comprising the cover structure comprising a single-layer cover comprising cavities in a mold is also disclosed.

20 Claims, 28 Drawing Sheets

Related U.S. Application Data continuation of application No. PCT/CN2021/088929, filed on Apr. 22, 2021.

(52) U.S. Cl.
CPC .................. *B32B 2307/582* (2013.01); *B32B 2307/7375* (2023.05); *B32B 2605/003* (2013.01)

(56) References Cited

U.S. PATENT DOCUMENTS

| | | | |
|---|---|---|---|
| 7,398,991 | B2 | 7/2008 | Hayashi et al. |
| 8,011,688 | B2 * | 9/2011 | Komura .............. B60R 21/2165 |
| | | | 280/728.3 |
| 9,663,057 | B2 * | 5/2017 | Aust ................... B60R 21/2165 |
| 9,789,838 | B1 * | 10/2017 | Witt, Jr. .............. B60R 21/2165 |
| 11,891,010 | B2 * | 2/2024 | Schwabl .............. B29C 44/586 |
| 2003/0230875 | A1 | 12/2003 | Lutze et al. |
| 2023/0001877 | A1 * | 1/2023 | Wang ................... B60R 21/205 |

FOREIGN PATENT DOCUMENTS

| | | | | |
|---|---|---|---|---|
| JP | 3123158 | B2 * | 1/2001 | ........ B60R 21/2165 |
| JP | 7488515 | B2 * | 5/2024 | .......... B60R 21/205 |
| WO | 2018/172179 | A1 | 9/2018 | |

* cited by examiner

FIG. 16A
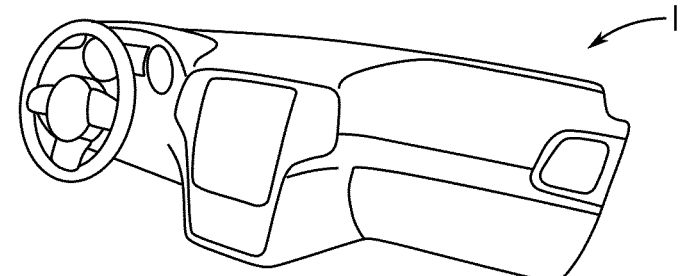
FIG. 16B
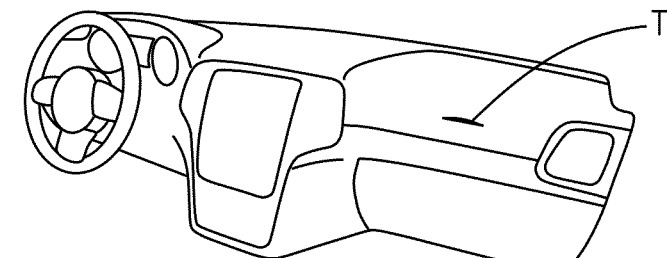
FIG. 16C
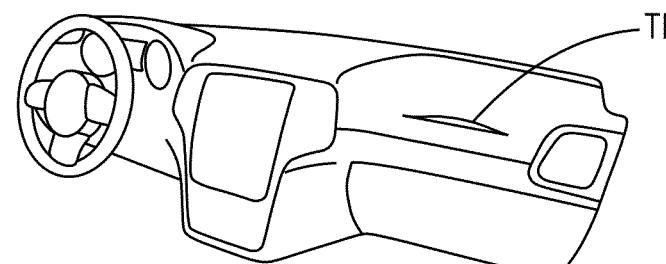
FIG. 16D
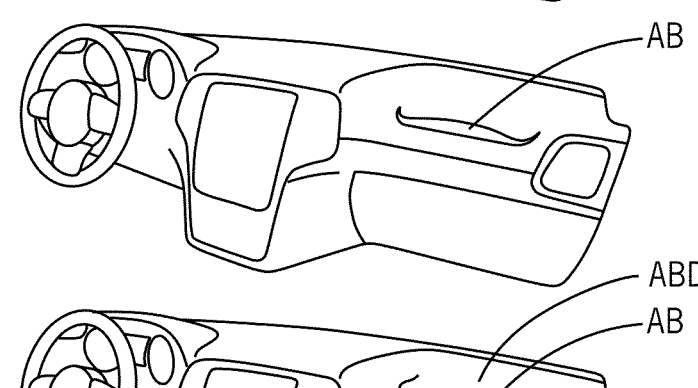
FIG. 16E
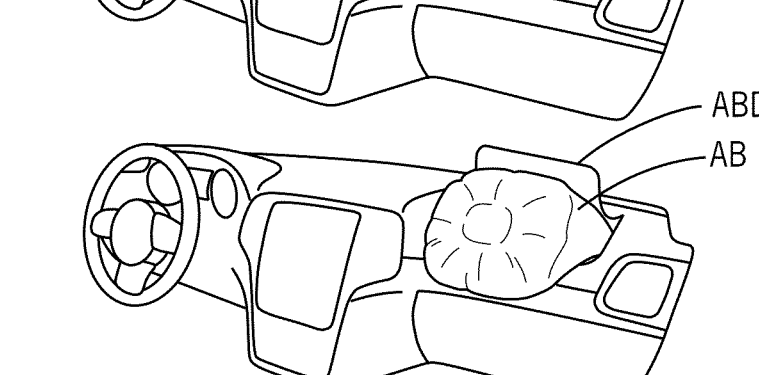
FIG. 16F

COMPONENT FOR VEHICLE INTERIOR

CROSS-REFERENCE TO RELATED APPLICATIONS

The present application is a continuation-in-part of U.S. patent application Ser. No. 17/941,579 titled "COMPONENT FOR VEHICLE INTERIOR" filed Sep. 9, 2022, which is a continuation of PCT/International Patent Application No. PCT/CN2021/088929 titled "VEHICLE INTERIOR COMPONENT" filed Apr. 22, 2021, which claims the benefit of Chinese Patent Application No. 202010326691.X filed Apr. 23, 2020 (now Chinese Patent No. 111391777B).

The present application claims priority to and incorporates by reference in full the following patent application(s): (a) Chinese Patent Application No. 202010326691.X filed Apr. 23, 2020 (now Chinese Patent No. 111391777B); (b) PCT/International Patent Application No. PCT/CN2021/088929 titled "VEHICLE INTERIOR COMPONENT" filed Apr. 22, 2021; (c) U.S. patent application Ser. No. 17/941,579 titled "COMPONENT FOR VEHICLE INTERIOR" filed Sep. 9, 2022.

FIELD

The present invention relates to a vehicle interior component.

The present invention also relates to a vehicle interior component comprising a cover configured with a set of elements in the cover underside configured to facilitate the formation of an opening for deployment of an airbag from an airbag module.

The present invention also relates to a vehicle interior component comprising a single-layer cover configured with a set of elements in the cover underside configured to facilitate the formation of an opening for deployment of an airbag from an airbag module.

BACKGROUND

It is known to provide vehicle interior component configured to facilitate deployment of an airbag from an airbag module.

It would be advantageous to provide an improved vehicle interior component configured to facilitate deployment of an airbag from an airbag module.

It would be advantageous to provide a vehicle interior component comprising a cover configured with a set of elements in the cover underside configured to facilitate the formation of an opening for deployment of an airbag from an airbag module.

It would be advantageous to provide a vehicle interior component comprising a cover configured with a set of elements in the cover underside configured in sections to facilitate the formation of an opening in a progression across the sections for deployment of an airbag from an airbag module.

It would be advantageous to provide a vehicle interior component comprising a cover formed by molding and configured with a set of elements in the cover underside configured to facilitate the formation of an opening for deployment of an airbag from an airbag module and to provide a uniform consistent appearance without perceptible defects.

It would be advantageous to provide a vehicle interior component comprising a cover formed by molding in a mold tool and configured with a set of elements in the cover underside configured to facilitate the formation of an opening for deployment of an airbag from an airbag module and to be produced in an efficient manner with a relatively thin molded cover and with projections in the mold tool to form the set of elements with a set of projections configured to facilitate formation and efficient release of the cover from the mold tool.

It would be advantageous to provide a vehicle interior component comprising a single-layer cover configured with a set of elements in the cover underside configured to facilitate the formation of an opening for deployment of an airbag from an airbag module.

It would be advantageous to provide a vehicle interior component comprising a single-layer cover configured with a set of elements in the cover underside configured in sections to facilitate the formation of an opening in a progression across the sections for deployment of an airbag from an airbag module.

It would be advantageous to provide a component for a vehicle interior configured to provide an opening for airbag deployment through the opening comprising a substrate and a single-layer cover structure/cover comprising a generally uniform outer/exterior surface and an inner surface comprising a line not readily perceptible at the outer surface to provide a tear line for the opening.

It would be advantageous to provide a component for a vehicle interior configured to provide an opening for airbag deployment through the opening comprising a substrate and a single-layer cover structure/cover consisting essentially of a resin material.

It would be advantageous to provide a component for a vehicle interior configured to provide an opening for airbag deployment through the opening comprising a trim panel, instrument panel or door panel with a cover structure comprising a single-layer cover comprising cavities and a groove formed in a mold.

SUMMARY

The present invention relates to a component for a vehicle interior comprising a cover structure comprising a single-layer skin providing a cover configured to be torn in an extension direction of a weakening line comprising a plurality of weakening holes extending from a back surface of the skin in a thickness direction of the skin; the plurality of weakening holes is arranged at intervals from each other to form the weakening line; the weakening line may comprise a tear-off section; a skin residual thickness of the weakening holes of the tear-off section is less than a skin residual thickness of the weakening holes of a portion of the weakening line outside the tear-off section; and the tear-off section may comprise at least two weakening holes with weakening portions; at least two weakening holes of the tear-off section are arranged such that a connecting line of the weakening portions of at least two weakening holes extends in the extension direction of the weakening line; the skin may comprise a thermoplastic elastomer layer; adjacent weakening holes of the tear-off section may be connected by a weakening groove extending from a back surface of the thermoplastic elastomer layer.

The present invention relates to a component for a vehicle interior configured to provide an opening for deployment of an airbag through the opening; the component may comprise a substrate and a cover structure comprising a single-layer skin providing a cover comprising an outer surface and an inner surface; the inner surface may comprise a line configured to provide a tear line for the opening for deployment of the airbag; the line comprises an opening section comprising a set of cavities and a groove configured to connect at least two cavities of the set of cavities; the line may comprise an intermediate section comprising a set of cavities; the line comprises a transition section comprising a set of cavities; each set of cavities may comprise at least one cavity comprising a profile; the cover comprises a molded cover layer; the at least two cavities of the set of cavities and the groove configured to connect the at least two cavities of the set of cavities are formed in the molded cover layer. The cover may consist of and/or consist essentially of a resin material.

The present invention relates to a component for a vehicle interior configured to provide an opening for deployment of an airbag through the opening; the component may comprise a substrate and a cover structure comprising a single-layer skin providing a cover comprising a rear side facing the substrate and configured to establish the opening for deployment of the airbag and a front side providing an external surface facing the vehicle interior; the cover may comprise a weakened portion in the rear side of the cover to establish the opening for deployment of the airbag; the front side of the cover may comprise a substantially continuous surface opposite to the weakened portion; the weakened portion comprises a set of cavities in a pattern; the cover may comprise a thermoplastic elastomer layer; the weakened portion comprises a groove configured to connect at least two cavities of the set of cavities in the thermoplastic elastomer layer. The groove at the line at the opening section may comprise a depth less than a depth of the set of cavities at the line at the intermediate section.

The present invention relates to a component for a vehicle interior configured to provide an opening for deployment of an airbag through the opening; the component may comprise a substrate and a cover structure comprising a single-layer skin providing a cover comprising an outer surface and an inner surface; the inner surface may comprise a line configured to provide a tear line for the opening for deployment of the airbag; the line comprises an opening section comprising a set of cavities and a groove configured to connect at least two cavities of the set of cavities; the line may comprise an intermediate section comprising a set of cavities; the line comprises a transition section comprising a set of cavities; each set of cavities may comprise at least one cavity comprising a profile; the cover comprises a molded cover layer; the at least two cavities of the set of cavities and the groove configured to connect the at least two cavities of the set of cavities are formed in the molded cover layer. The cover may consist essentially of a resin material.

The present invention relates to a component for a vehicle interior may comprise component for a vehicle interior configured to provide an opening for deployment of an airbag through the opening; the component may comprise a substrate and a cover structure comprising a single-layer skin providing a cover comprising a rear side facing the substrate and configured to establish the opening for deployment of the airbag and a front side providing an external surface facing the vehicle interior; the cover may comprise a weakened portion in the rear side of the cover to establish the opening for deployment of the airbag; the front side of the cover may comprise a substantially continuous surface opposite to the weakened portion; the weakened portion comprises a set of cavities in a pattern; the cover may comprise a thermoplastic elastomer layer; the weakened portion comprises a groove configured to connect at least two cavities of the set of cavities in the thermoplastic elastomer layer. The groove at the line at the opening section may comprise a depth less than a depth of the set of cavities at the line at the intermediate section. The cavity of the set of cavities may comprise at least one of (a) a bevel; (b) a fillet; (c) a chamfer. The set of cavities may be formed by molding the cover in a mold comprising at least one projection configured to form the cavity. The component may comprise at least one of (a) a trim panel; (b) an instrument panel; (c) a door panel; (d) a pillar; (e) a trim panel with the cover structure comprising the single-layer skin with the set of cavities comprising a cavity with a profile; (f) a trim panel with the cover structure comprising the single-layer skin with the set of cavities comprising a cavity with a profile comprising a flat surface and a curved surface; (g) a trim panel with the cover structure comprising the single-layer skin with the set of cavities comprising a cavity with a profile comprising a set of facets; (h) a trim panel with the cover structure comprising the single-layer skin with the set of cavities comprising a multi-faceted shape comprising a flat surface and a curved surface; (i) a trim component with the cover structure comprising the single-layer skin with the set of cavities comprising a profile comprising a multi-faceted shape; ( ) a trim component with the cover structure comprising the single-layer skin with the set of cavities comprising a flat shape and a curved shape; (k) an instrument panel comprising the single-layer skin and an intermediate foam layer; (l) an instrument panel comprising the single-layer skin and an intermediate foam layer and a framework; (m) automotive upholstery comprising the single-layer skin with the set of cavities on an underside; (n) automotive upholstery comprising the single-layer skin with the set of cavities on an underside and an opposing side providing a cover surface; (o) a trim panel with the cover structure comprising the single-layer skin formed as a molded layer with the set of cavities comprising a cavity with a profile comprising a multi-faceted shape; (p) a trim panel with the cover structure comprising the single-layer skin formed as an injection-molded layer with the set of cavities comprising a cavity with a profile comprising a multi-faceted shape; (q) a trim panel with the cover structure comprising the single-layer skin formed as a molded elastomer layer with the set of cavities comprising a cavity with a profile comprising a multi-faceted shape.

The present invention relates to a component for a vehicle interior comprising a skin configured to be torn in an extension direction of a weakening line comprising a plurality of weakening holes extending from a back surface of the skin in a thickness direction of the skin. The plurality of weakening holes may be arranged at intervals from each other to form the weakening line. The weakening line may comprise a tear-off section. A skin residual thickness of the weakening holes of the tear-off section may be less than a skin residual thickness of the weakening holes of a portion of the weakening line outside the tear-off section. The tear-off section may comprise at least two weakening holes with weakening portions. The at least two weakening holes of the tear-off section are arranged such that a connecting line of the weakening portions of the at least two weakening holes extending in the extension direction of the weakening line. A cross section of the weakening holes of the tear-off section may have an oval shape, and the weakening portions may be end portions of the weakening holes in a long axial direction of the oval shape. A cross section of the weakening holes of the tear-off section may have a polygonal shape, and the weakening portions may be corners of the weakening holes. Spacing between adjacent weakening holes of the tear-off section may be 1 mm to 2 mm. An area of a cross section of the weakening hole of the weakening line may be 0.04 mm2 (square millimeter) to 6 mm2 (square millimeter). An area of a cross section of the weakening hole of the weakening line may remain constant in the thickness direction of the skin. An area of a cross section of the weakening hole of the weakening line may decrease from the back surface of the skin in the thickness direction of the skin. The weakening line may comprise an exposed section at a center thereof; the tear-off section may be located at a center of the exposed section or at both ends of the exposed section. The skin residual thickness of the weakening holes of the tear-off section may be 0.2 mm to 0.6 mm. Adjacent weakening holes of the tear-off section may be connected by a weakening groove extending from the back surface of the skin in the thickness direction of the skin. The weakening groove may comprise a depth of 0.2 mm to 0.6 mm. The skin may comprise a thermoplastic elastomer. The skin may be formed by injection molding, slush molding or calendaring. The weakening holes may be formed (a) in a process of forming the skin by injection molding or (b) by hot pressing after forming a semi-finished product of the skin by slush molding or calendaring.

The present invention relates to a component for a vehicle interior configured to provide an opening for deployment of an airbag through the opening comprising a substrate and a cover comprising an outer surface and an inner surface. The inner surface may comprise a line configured to provide a tear line for the opening for deployment of the airbag. The line may comprise an opening section comprising a set of cavities and a groove configured to connect at least two cavities of the set of cavities. The line may comprise an intermediate section comprising a set of cavities. The line may comprise a transition section comprising a set of cavities. Each set of cavities may comprise at least one cavity comprising a profile. The cover may comprise a molded cover. The groove at the line at the opening section may comprise a depth less than a depth of the set of cavities at the line at the intermediate section.

The present invention relates to a component for a vehicle interior configured to provide an opening for deployment of an airbag through the opening comprising a substrate and a cover comprising a rear side facing the substrate and configured to establish the opening for deployment of the airbag and a front side providing an external surface facing the vehicle interior. The cover may comprise a weakened portion in the rear side of the cover to establish the opening for deployment of the airbag. The front side of the cover may comprise a substantially continuous surface opposite to the weakened portion. The weakened portion may comprise a set of cavities in a pattern. A cavity of the set of cavities may comprise at least one of (a) a bevel; (b) a fillet; (c) a chamfer. The set of cavities may be formed by molding the cover in a mold comprising at least one projection configured to form the cavity. The component may comprise at least one of (a) a trim panel; (b) an instrument panel; (c) a door panel; (d) a pillar; (e) a skin.

The present invention relates to a component for a vehicle interior configured to provide an opening for deployment of an airbag through the opening comprising a substrate and a cover comprising an outer surface and an inner surface. The inner surface may comprise a line configured to provide a tear line for the opening for deployment of the airbag. The line may comprise an opening section comprising a set of cavities and a groove configured to connect at least two cavities of the set of cavities. The line may comprise an intermediate section comprising a set of cavities; the line may comprise a transition section comprising a set of cavities; each set of cavities may comprise at least one cavity comprising a profile. The cover may comprise a molded cover. The molded cover may comprise a molded cover layer. The outer surface may comprise a generally uniform exterior surface. The outer surface may be configured so that the line is not readily perceptible at the outer surface. The outer surface may comprise a textured external surface. The tear line of the inner surface of the cover may comprise at least one of (a) a weakening line or (b) a weakened section. The profile of the cavity may comprise a depth within the inner surface of the cover. The profile of the cavity may comprise a set of facets. The groove of the opening section may comprise a profile. The profile of the groove may comprise a depth within the inner surface of the cover. The transition section may comprise a groove connecting at least one cavity of the set of cavities. The line may comprise a seam. The line may comprise a lateral section comprising a set of cavities. The opening for deployment of the airbag may be formed at the lateral section. The lateral section may be transverse to the opening section. The opening for deployment of the airbag may be formed at the line comprising the opening section and the intermediate section and the transition section. The groove at the line at the opening section may have a depth less than a depth of the set of cavities at the line at the intermediate section. The intermediate section may comprise the set of cavities separated at a spacing. The line at the transition section may comprise a curved line. The line at the transition section may comprise a connection to a first lateral section and a connection to a second lateral section. The line at the transition section may comprise a groove configured to connect at least two cavities of the set of cavities. The transition section may comprise a first section generally parallel to the opening section and a second section generally transverse to the opening section. The set of cavities of the intermediate section may comprise a set of disconnected cavities. The opening section may comprise the set of cavities at a first depth and the intermediate section may comprise the set of cavities at a second depth; the first depth may be greater than the second depth. The opening section may comprise the set of cavities at a first spacing and the intermediate section may comprise the set of cavities at a second spacing. The first spacing may be less than the second spacing. The transition section may comprise the set of cavities connected by a generally Y-shaped groove. The set of cavities may comprise a cavity. The cavity may comprise a profile. The profile of the cavity may comprise a set of facets. The profile of the cavity may comprise an angled surface. The profile of the cavity may comprise a curved surface. The profile of the cavity may comprise a flat surface. The profile of the cavity may comprise a multi-faceted shape. The profile of the cavity may comprise a curved shape. The component may comprise at least one of (a) a trim panel; (b) an instrument panel; (c) a door panel; (d) a pillar; (e) a trim panel; (f) a trim component.

The present invention relates to a component for a vehicle interior configured to provide an opening for deployment of an airbag through the opening comprising a substrate and a cover comprising a rear side facing the substrate and configured to establish the opening for deployment of the airbag and a front side providing an external surface facing the vehicle interior. The cover may comprise a weakened portion in the rear side of the cover to establish the opening for deployment of the airbag; the front side of the cover may comprise a substantially continuous surface opposite to the weakened portion; the weakened portion may comprise a set of cavities in a pattern. The cover may comprise a molded cover layer. The external surface may comprise a textured surface. The weakened portion may comprise a groove connecting two cavities of the set of cavities. The pattern may comprise a middle section, a side section and a transition section between the middle section and the side section. The middle section may be generally orthogonal to the side section. The middle section may comprise a transition cavity comprising a shape configured to provide a transition from the middle section to the side section. The middle section may comprise a set of cavities connected by a groove and a set of disconnected cavities. The middle section may comprise a set of cavities comprising a first depth and a set of cavities comprising a second depth greater than the first depth. The middle section may comprise a set of cavities comprising a first spacing distance between cavities and a set of cavities comprising a second spacing distance between cavities greater than the first spacing distance. The transition section may comprise a set of cavities connected by a groove. The groove may comprise a curved groove. The transition section may comprise a set of cavities comprising a spacing distance between cavities less than a spacing distance between a set of cavities adjacent the set of cavities of the transition section. The transition section may comprise a set of cavities comprising a depth greater than a depth of a set of cavities adjacent the set of cavities of the transition section. A cavity of the set of cavities may comprise a wall and a floor. The cavity may comprise at least one of (a) a bevel, (b) a fillet, (c) a chamfer. The cavity may comprise an angled surface connecting the wall and the floor. The floor may be generally parallel to the external surface of the front side of the cover. The floor may be configured to provide the substantially continuous surface providing a substantially continuous visual effect opposite the weakened portion of the cover at the external surface of the front side of the cover. The wall may comprise a generally planar wall and a generally curved wall. The wall may comprise a first generally planar wall connected to a second generally planar wall and a generally curved wall. The wall may comprise a first generally planar wall connected to a second generally planar wall at a line configured to provide a tear line in the cover for the opening. The set of cavities may be formed by molding the cover in a mold comprising at least one projection configured to form the cavity. The component may comprise at least one of (a) a trim panel; (b) an instrument panel; (c) a door panel; (d) a pillar; (e) a trim panel; (f) a trim component.

The present invention relates to a method for forming a component comprising a set of cavities and at least one groove in a mold comprising the following steps: closing the mold, injecting a material into the mold to form a cover with a line in an underside of the cover; opening the mold, removing the cover and attaching a substrate to the cover to form the trim component. The material may comprise a resin material. The mold may comprise a surface comprising a set of projections configured to form the set of cavities in the trim component and at least one rib configured to form at least one groove in the trim component. The rib of the mold may comprise a ridge. The set of projections may comprise a projection of the mold comprising a profile. The profile of the projection may comprise a set of facets. The profile of the projection may comprise a curved profile. The rib of the mold may comprise a profile. The profile of the rib may comprise a height. The component may comprise a trim component. The trim component may comprise a substrate and the cover; the cover may comprise an outer surface and an inner surface formed in the mold; the inner surface may comprise a tear line configured to provide a weakening of the cover for the opening for deployment of the airbag; the line may comprise an opening section comprising a set of cavities formed by the set of projections in the mold and a groove formed by the at least one ridge in the mold configured to connect at least two cavities of the set of cavities; the line may comprise an intermediate section comprising a set of cavities; the line may comprise a transition section comprising a set of cavities; each set of cavities may comprise at least one cavity comprising a profile formed by at least one projection in the mold. The profile may comprise a multi-faceted profile comprising a curved surface.

The present invention relates to a component for a vehicle interior providing a skin adapted for being torn in an extension direction of a weakening line comprising a plurality of weakening holes extending from a back surface of the skin in a thickness direction of the skin. The plurality of weakening holes may be arranged at intervals from each other to form the weakening line. The weakening line may comprise a tear-off section; a skin residual thickness of the weakening holes of the tear-off section may be less than a skin residual thickness of the weakening holes of a portion of the weakening line outside the tear-off section; the tear-off section may comprise at least two weakening holes with weakening portions; the at least two weakening holes of the tear-off section may be arranged such that a connecting line of the weakening portions of the at least two weakening holes extends in the extension direction of the weakening line.

The present invention relates to a skin for a vehicle interior adapted for being torn in an extension direction of a weakening line comprising a plurality of weakening holes extending from a back surface of the skin in a thickness direction of the skin. The plurality of weakening holes may be arranged at intervals from each other to form the weakening line. The weakening line may comprise a tear-off section. A skin residual thickness of the weakening holes of the tear-off section may be less than a skin residual thickness of the weakening holes of a portion of the weakening line outside the tear-off section. The tear-off section may comprise at least two weakening holes with weakening portions; the at least two weakening holes of the tear-off section may be arranged such that a connecting line of the weakening portions of the at least two weakening holes extending in the extension direction of the weakening line. A cross section of the weakening holes of the tear-off section may have an oval shape, and the weakening portions may be end portions of the weakening holes in a long axial direction of the oval shape. A cross section of the weakening holes of the tear-off section may have a polygonal shape, and the weakening portions may be corners of the weakening holes. The polygonal shape may be a triangle, a diamond or a hexagon. Spacing between adjacent weakening holes of the tear-off section may be less than spacing between adjacent weakening holes of a portion of the weakening line outside the tear-off section. Spacing between adjacent weakening holes of the tear-off section may be 1 mm to 2 mm. An area of a cross section of the weakening hole of the weakening line may be 0.04 mm2 (square millimeter) to 6 mm2 (square millimeter). An area of a cross section of the weakening hole of the weakening line may remain constant in the thickness direction of the skin, or an area of a cross section of the weakening hole of the weakening line may decrease from the back surface of the skin in the thickness direction of the skin. The weakening line may comprise an exposed section at a center thereof wherein the tear-off section is located at a center of the exposed section or at both ends of the exposed section. A length of the tear-off section may be ⅟20 to ½ of a length of the exposed section. A length of the tear-off section may be ¹⁄₁₀ to ¹⁄₃ of a length of the exposed section. The skin residual thickness of the weakening holes of the tear-off section may be 0.2 mm to 0.6 mm. Adjacent weakening holes of the tear-off section are connected by weakening grooves extending from the back surface of the skin in the thickness direction of the skin. A length direction of the weakening grooves may be in the same direction as the extension direction of the weakening line. The weakening groove may have a depth of 0.2 mm to 0.6 mm. The skin may be made of a thermoplastic elastomer. The thermoplastic elastomer may have a tensile strength of 2 MPa to 15 MPa and an elongation at break of 100 percent to 800 percent. The thermoplastic elastomer may have a tensile strength of 5 MPa to 9 MPa and an elongation at break of 200 percent to 600 percent. The skin at the tear-off section may have a tensile strength of 2 MPa to 4 MPa in a direction perpendicular to the extension direction of the weakening line under normal temperature conditions. The skin may be formed by injection molding, slush molding or calendering. The weakening holes of the weakening line may be formed in a process of forming the skin by injection molding. The weakening holes of the weakening lines may be formed by hot pressing after forming a semi-finished product of the skin by slush molding or calendering.

The present invention relates to a component for a vehicle interior configured to provide an opening for deployment of an airbag through the opening comprising a substrate and a cover comprising an outer surface and an inner surface. The inner surface may comprise a line configured to provide a tear line for the opening for deployment of the airbag. The line may comprise an opening section comprising a set of cavities and a groove configured to connect at least two cavities of the set of cavities. The line may comprise an intermediate section comprising a set of cavities; the line may comprise a transition section comprising a set of cavities; each set of cavities may comprise at least one cavity comprising a profile. The cover may comprise a molded cover. The tear line may be configured so that the opening for deployment of the airbag is initially formed at the opening section. The tear line may be configured so that the opening for deployment of the airbag is formed at the opening section, then the intermediate section, then the transition section. The set of cavities of the opening section may be at a depth greater than a depth of the set of cavities of the intermediate section. The component may comprise a lateral section comprising a set of cavities adjacent to the transition section; the transition section may comprise a groove; the groove of the transition section may be at a depth less than a depth of the set of cavities of the transition section. The set of cavities of the opening section may comprise at least one cavity comprising a profile comprising a curved surface and/or a facet. The profile may comprise a faceted profile.

FIGURES

FIGS. 16A through 16F are schematic perspective views of a deployment of an airbag from a vehicle interior component according to an exemplary embodiment.

DESCRIPTION

Figures 1A, 1B, 2A, 2B, 2C, 2D:
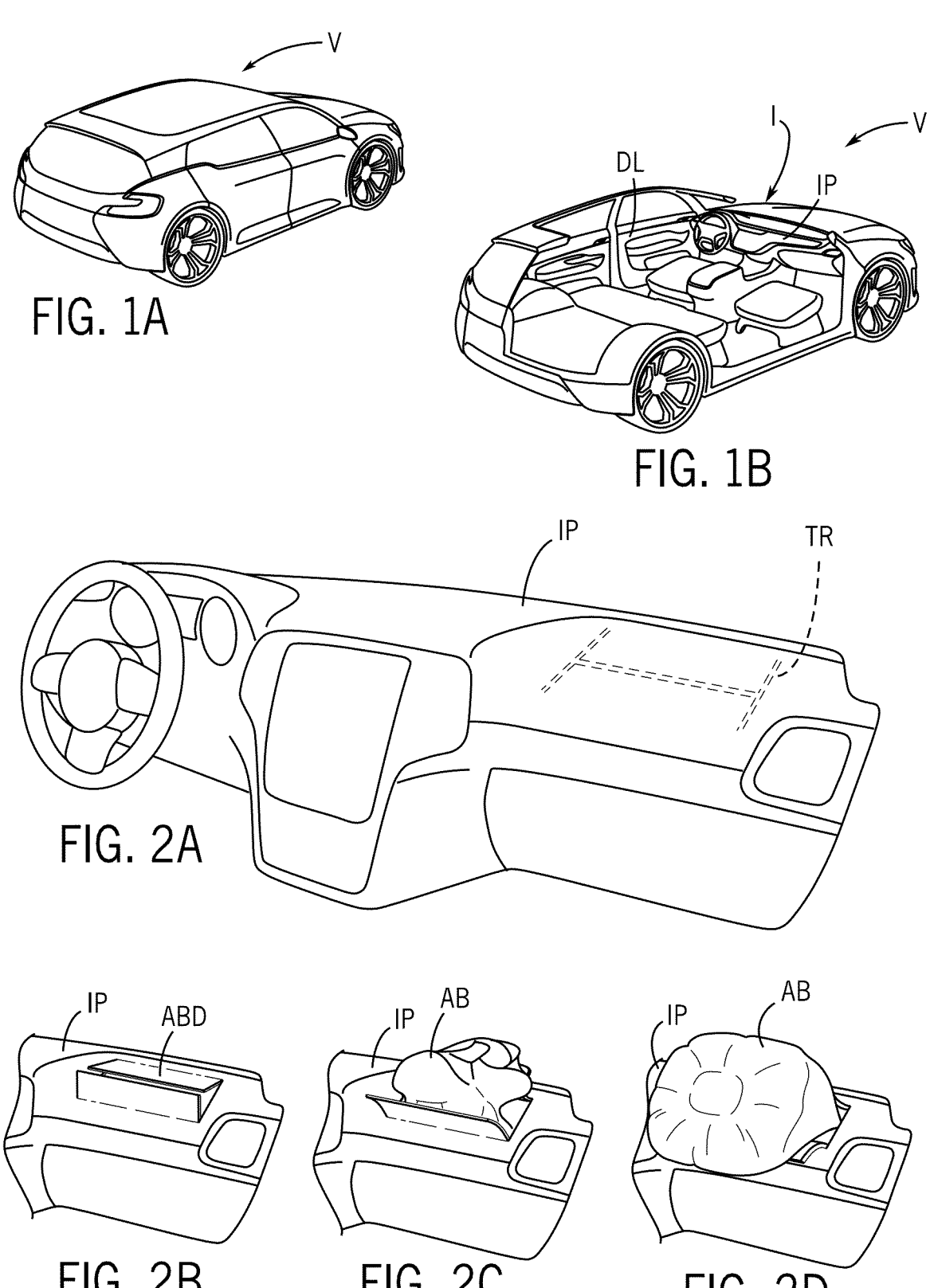
FIG. 1A is a schematic perspective view of a vehicle according to an exemplary embodiment.
FIG. 1B is a schematic perspective cut-away view of a vehicle showing a vehicle interior according to an exemplary embodiment.
FIG. 2A is a schematic perspective view of a vehicle interior component shown as an instrument panel according to an exemplary embodiment.
FIGS. 2B through 2D are schematic perspective views of a deployment of an airbag from a vehicle interior component according to an exemplary embodiment.
Figure 3A:
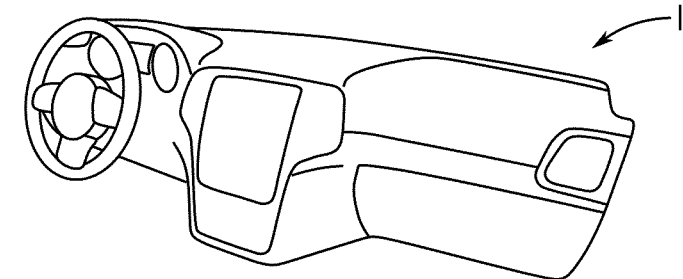
FIGS. 3A through 3F are schematic perspective views of a deployment of an airbag from a vehicle interior component according to an exemplary embodiment.
Figure 3B:
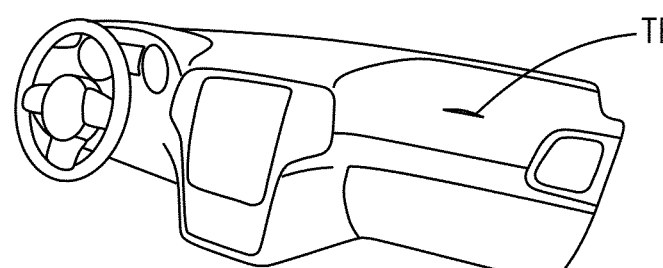
Figure 3C:
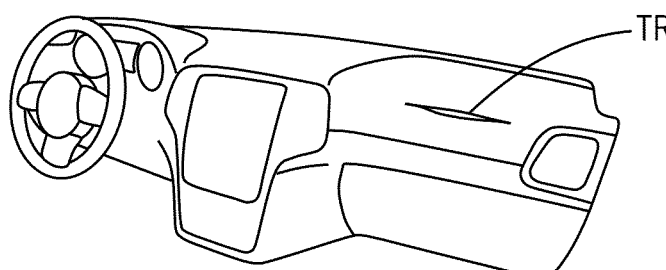
Figure 3D:
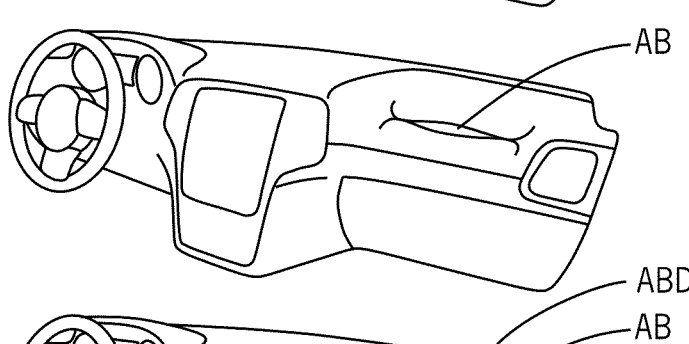
Figure 3E:
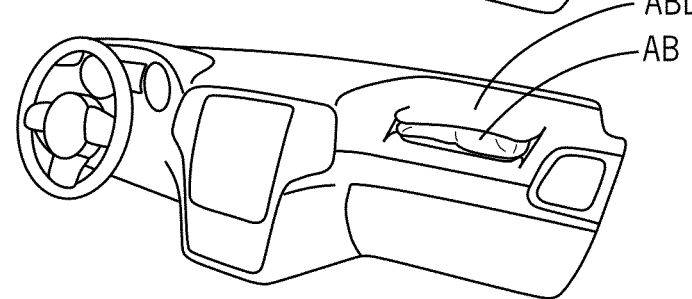
Figure 3F:
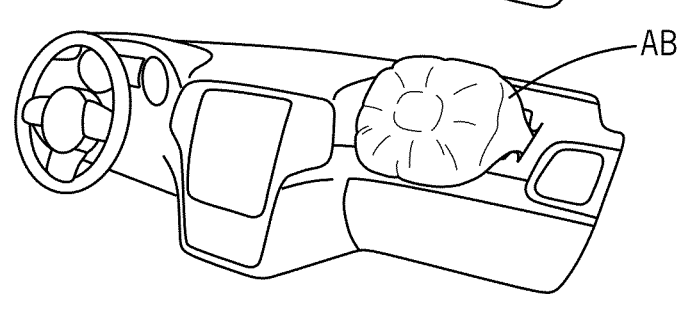
Figures 4A, 4B, 4C, 4D:
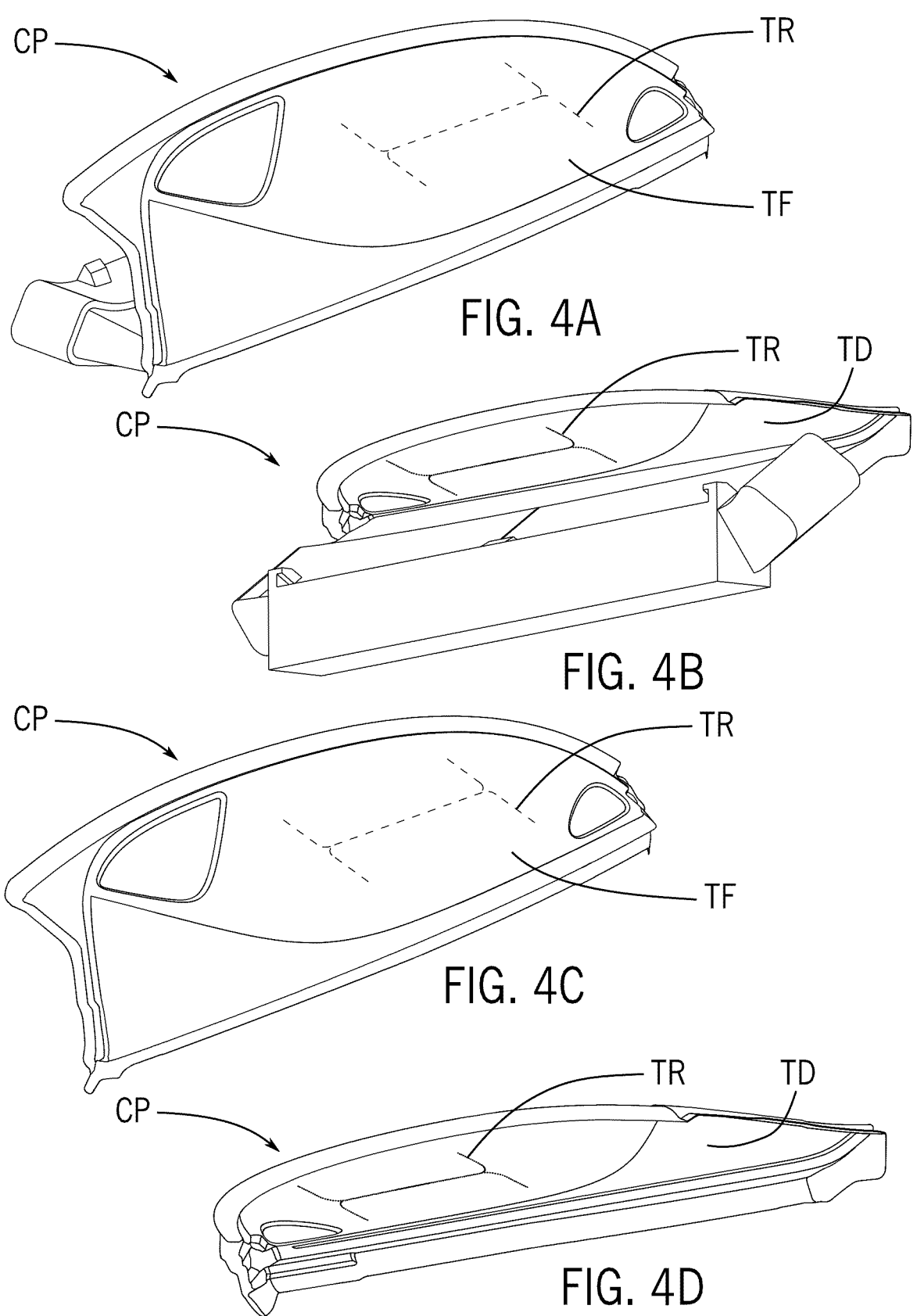
FIGS. 4A through 4D are schematic perspective views of a vehicle interior component shown as an instrument panel according to an exemplary embodiment.
Figure 5A:
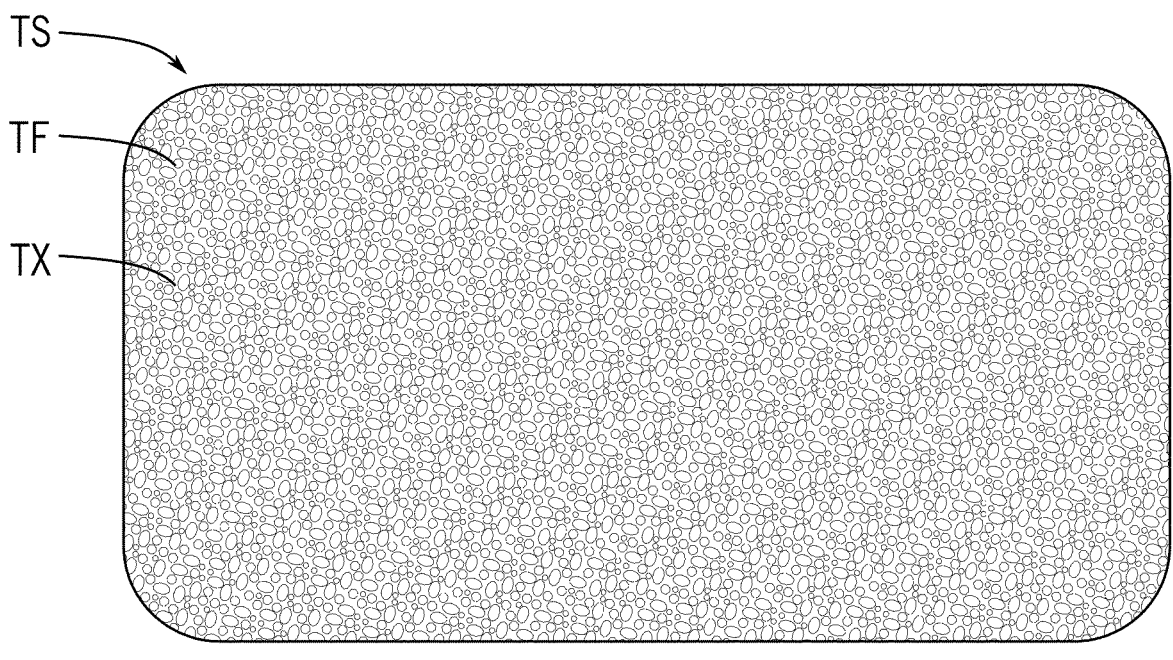
FIG. 5A is a schematic partial plan view of a cover surface of a cover structure for a vehicle interior component according to an exemplary embodiment.
Figure 5B:
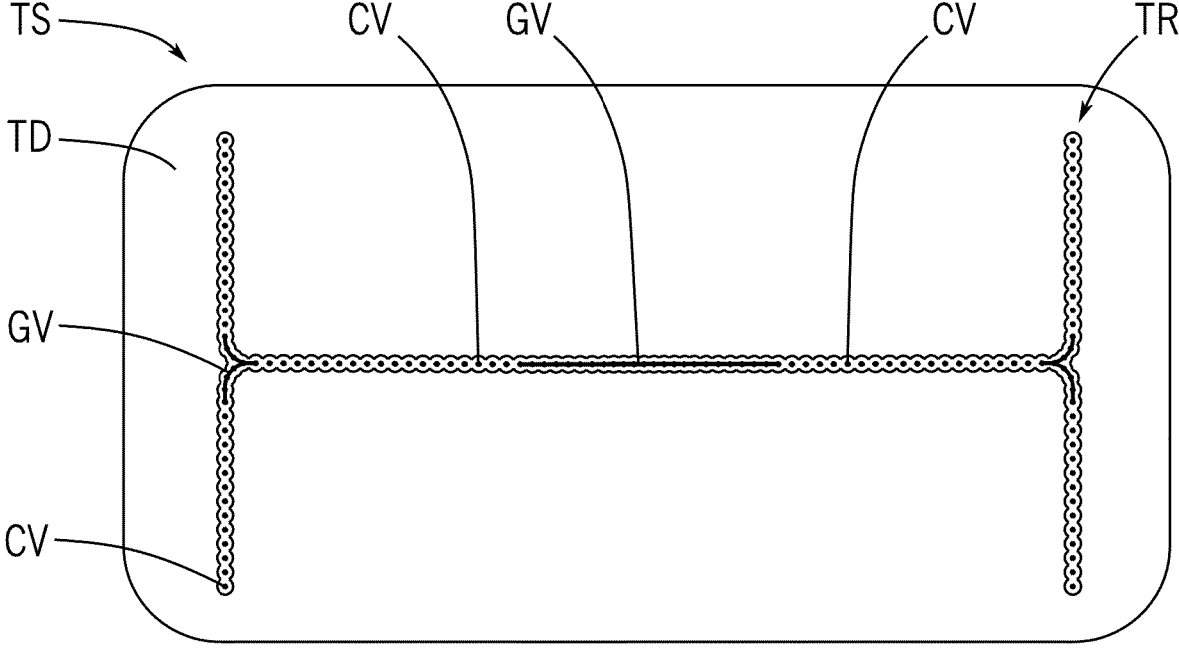
FIG. 5B is a schematic partial plan view of a cover underside of a cover structure for a vehicle interior component according to an exemplary embodiment.
Figures 6, 7A, 7B, 7C, 7D:
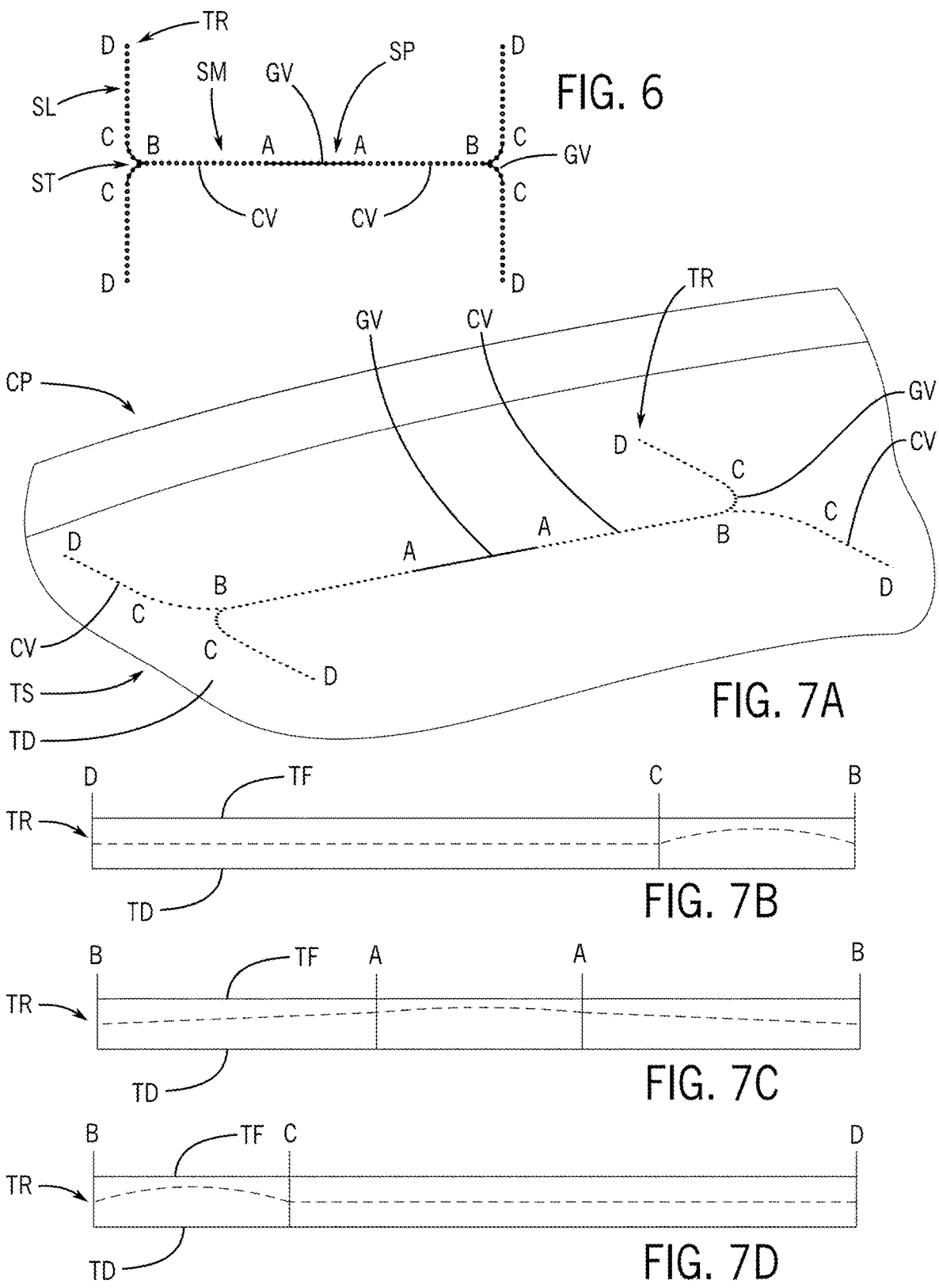
FIG. 6 is a schematic diagram of a tear line for an opening for deployment of an airbag from a vehicle interior component according to an exemplary embodiment.
FIG. 7A is a schematic partial perspective view of a cover structure for a vehicle interior component according to an exemplary embodiment.
FIGS. 7B through 7D are schematic side elevation views of a cover structure for a vehicle interior component according to an exemplary embodiment.
Figures 8A, 8B, 9A, 9B:
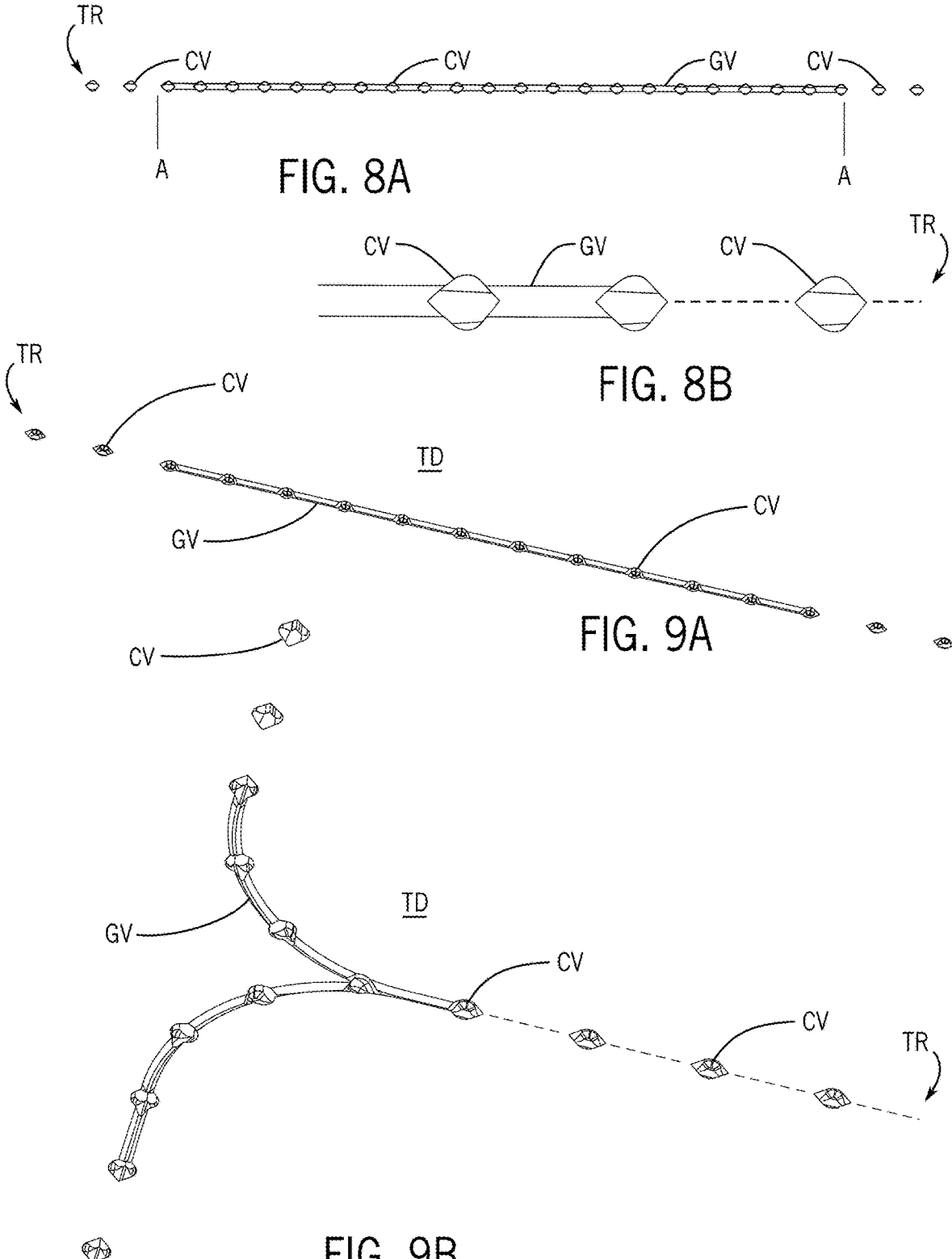
FIGS. 8A and 8B are schematic partial plan views of a tear line for an opening for deployment of an airbag from a vehicle interior component according to an exemplary embodiment.
FIGS. 9A and 9B are schematic partial perspective views of a tear line for an opening for deployment of an airbag from a vehicle interior component according to an exemplary embodiment.

Referring to FIGS. 1A and 1B, a vehicle V is shown including an interior I with an instrument panel IP and doors DL. According to an exemplary embodiment, interior components of vehicle V such as instrument panel IP and doors DL may include trim panels. According to an exemplary embodiment, components such as instrument panel IP and doors DL (and other trim components) may provide visible surfaces in the vehicle interior of vehicle V. According to an exemplary embodiment, instrument panel IP and/or doors DL may provide at least one airbag (configured to deploy from an airbag module) that is installed behind/within interior components such as instrument panel IP and/or doors DL. See FIG. 2A.

As indicated schematically according to an exemplary embodiment in FIG. 2A the cover/surface of the component such as instrument panel IP may be configured to provide an area to provide an opening/door for deployment of the airbag (from the airbag module); the cover structure of the component may comprise a weakened line/area such as a seam shown as tear line TR to facilitate formation of the opening/door shown as airbag door ABD through which the airbag AB will deploy from the airbag module (e.g. where the airbag will break through the cover of the component/panel during airbag deployment as intended). See also FIGS. 2B-2D and 3A-3F. As indicated schematically in FIGS. 3A-3F, the component such as instrument panel IP will provide a cover structure with the seam shown as tear line TR through which the airbag AB will progressively develop an opening at the tear line TR to provide the airbag door ABD and through which opening the airbag AB will deploy into the vehicle interior. See also FIGS. 4A-4D, 6, 16A-16F, 17A-17D and 18.

As indicated schematically in FIGS. 4A-4D and 5A-5B, the component CP comprises a cover structure TS providing a cover underside TD provided with the tear line TR and a cover surface TF shown as providing a generally uniform effect such as texture TX visible at the exterior (e.g. visible from within the vehicle interior). As shown schematically in FIGS. 3A-3F, 4A-4D, 5A-5B and 6, the tear line TR is configured to provide the opening for deployment of the airbag at an intended position in the cover structure TS from the cover underside TD through the cover surface TF during deployment of the airbag (e.g. when actuated to deploy from the airbag module installed within the component). See also FIGS. 16A-16F, 17A-17D and 18.

As indicated schematically in FIGS. 5B, 6 and 7A-7D, the tear line TR is provided/formed as a pattern of set of cavities and/or grooves in sections within the cover underside TD of the cover structure TS; as indicated schematically, the tear line TR may comprise a set of sections shown as comprising an opening section SP and an intermediate section SM and a transition section ST and a lateral section SL. See also FIGS. 15A-15C, 18, 19A-19D, 22A-22C, 23A-23C and 24A-24C. As shown schematically according to an exemplary embodiment in FIGS. 6, 7A-7D, 8A-8B and 9A-9B, the sections of the tear line TR may be configured with elements/features such as cavities and grooves in a pattern/configuration (e.g. size, shape, spacing/proximity, form, etc.) and with a variable depth to facilitate formation of the opening for deployment of the airbag and efficient full deployment of the airbag (e.g. airbag deployment from the airbag module according to a design intent without undue interference, without undue formation of fragments, etc.). See FIGS. 3A-3F and 16A-16F. As shown schematically in FIGS. 3A-3F, 6, 16A-16F and 18, the tear line TR may be configured so that the opening for deployment of the airbag is initially formed at the opening section SP; the tear line TR may be configured so that the opening for deployment of the airbag is formed at the opening section SP, then the intermediate section SM, then the transition section ST, then the lateral section SL. See also FIGS. 15A-15C, 20A-20F, 21A-21F, 22A-22C, 23A-23C and 24A-24C. As indicated schematically in FIGS. 7A-7B, 8A-8B, 9A-9B, 10A-10B, 11A-11B, 12A-12B, 13A-13D and 14, the elements such as cavities CV and groove arrangement GV of the cover underside TD may be configured in a shape/form and at a depth within the cover underside TD for differential weakening at each section of the cover structure; as indicated schematically in FIGS. 3A-3F, 6, 7A-7D, 8A-8B and 9A-9B, the elements such as cavities CV and groove arrangement GV may be configured within the cover underside TD to facilitate the formation of the initial opening for the airbag at the opening section SP (with cavities at greater depth and connected with the groove for weakening at A-A) and the progression of the opening across the intermediate section SM (with cavities at A-B) to the transition section ST (with cavities at greater depth and/or groove configured to direct the opening at B-C) to the lateral section SL (at C-D) of the tear line TR. See also FIGS. 15A-15C, 16A-16F, 18, 19A-19D, 20A-20F, 21A-21F, 22A-22C, 23A-23C and 24A-24C.

As shown schematically according to an exemplary embodiment in FIGS. 6, 7A-7D, 8A-8B and 9A-9B, the sections of the tear line TR may be provided with variations in form and/or elements and/or depth; opening section SP (at A-A) may comprise a generally linear form with a set of cavities CV along a groove GV; intermediate section SM (at A-B) may comprise a generally linear form with a set of cavities CV; transition section ST (at B-C) may comprise transitional/connection form shown as a Y-shaped form with a set of cavities CV along a groove GV; lateral section SL (at C-D) may comprise generally linear form with a set of cavities CV.

As indicated schematically in FIGS. 3A-3F and 16A-16F, the tear line provided by the set of cavities and/or groove arrangement may be configured in any of a wide variety of shapes, patterns and combinations and sections. See also FIGS. 15A-15C, 20A-20F, 21A-21F, 22A-22C, 23A-23C and 24A-24C. As shown schematically in FIGS. 6, 7A and 22A-22C, the tear line may be provided in a generally H-shaped arrangement (with a generally T-shaped/Y-shaped transition section) and with a variety of patterns for the set of cavities CV and/or groove GV. See also FIGS. 3A-3F and 15A-15C. As shown schematically in FIGS. 18, 19A and 23A-23C, the tear line may be provided in a generally U-shaped arrangement (with a curved transition section) and with a variety of patterns for the set of cavities CV and/or groove GV. See also FIGS. 16A-16F, 17A-17D. As shown schematically in FIGS. 24A-24C, the tear line may be provided in a so-called "bow-tie" arrangement (with a generally Y-shaped or V-shaped transition section) and with a variety of patterns for the set of cavities CV and/or groove GV.

As indicated schematically according to an exemplary embodiment in FIGS. 22A-22C, 23A-23C and 24A-24C, the pattern of elements may comprise a set of cavities CV (e.g. without a groove) (see FIGS. 22A, 23A and 24A) and/or a combination of a set of cavities CV with a groove arrangement GV (see FIGS. 22B-22C, 23B-23C and 24B-24C). As indicated schematically in FIGS. 15A-15C, the positioning, quantity and spacing/separation of elements of the tear line such as the set of cavities and groove arrangement may be varied to facilitate the initial and progressive formation of the opening for the deployment of the airbag (e.g. according to design and integration of the airbag module). See also FIGS. 3A-3F, 6, 16A-16F and 18. See also FIGS. 22A-22C, 23A-23C and 24A-24C. As indicated schematically in FIGS. 20A-20F and 21A-21F, the elements of the tear line TR shown as cavities CV providing the tear line may be provided in a variety of shapes (e.g. rounded, faceted, multi-faceted, flat, flat-sided, in combined forms, etc.). See also FIGS. 13A-13D, 33-36.

As indicated schematically in FIGS. 7A-7D and 19A-19D, the depth of the tear line TR within the cover underside TD below the cover surface TF of the cover structure as provided by the elements shown as the set of cavities and/or groove arrangement may be varied (e.g. to facilitate the initial and progressive formation of the opening for deployment of the airbag as intended). See also FIGS. 3A-3F and 16A-16F. As indicated schematically according to an exemplary embodiment in FIGS. 3A-3F, 5A-5B and 16A-16F, the selection and configuration of the elements of the tear line will be implemented in an pattern/arrangement that will have the tear line in the cover underside TD not be or become readily perceptible from the cover surface TF of the cover structure of the component in ordinary use but that will facilitate formation of the opening at the tear line in the cover structure for efficient deployment of the airbag when deployed from the airbag module (e.g. selective initial/ progressive formation of opening at tear line/sections). See also FIGS. 11A-11B (showing cavities CV at depth greater than connecting groove GV within cover underside TD and cavities CV ad varying depth within cover underside TD to facilitate selective weakening at tear line/sections) and FIG. 14 (showing cavities CV at varying depth within cover underside TD to facilitate selective weakening at tear line/ sections).

As indicated schematically in FIGS. 9A-9B, 10A-10B, 11A-11B and 12A-12B, the cavities CV and groove arrangement GV may be formed in the cover underside TD to provide the tear line TR with variations in depth/form and weakening (see also FIG. 14) across sections; as indicated schematically in FIGS. 11A-11B and 13A-13D, the cavities CV may be formed with a shape/profile shown as a faceted profile with facets Fx, Fa, Fb, Fc and Fd (e.g. angled/flat sides, flat and curved surfaces, depth variations, etc.) to facilitate efficient manufacture and function of the cover structure/component. As shown schematically in FIGS. 25A-25D, the cover structure may comprise an injection-molded cover structure (e.g. formed from resin material); the cover structure of the component may be formed in a mold tool MT (e.g. by injection molding) configured with a set of projections PR to form the set of cavities CV and with rib arrangement RB to form the groove arrangement GV in the cover underside TD. As indicated schematically in FIGS. 10A-10B, 11A-11B, 12A-12B, 13A-13D and 25A-25D, the form/shape of the cavities CV and projections PR and groove GV and rib RB may be configured to facilitate efficient manufacture (e.g. forming of elements and de-molding release from the mold without creating defects) and suitable aesthetic appearance at the cover surface TF (e.g. tear line not perceptible/visible to a vehicle occupant) and proper operation to provide formation of the opening at the tear line TR in the cover structure for deployment of the airbag. See FIGS. 3A-3F, 5A-5B and 20A-20F. According to an exemplary embodiment as indicated schematically in FIGS. 5A-5B and 25A-25D, the mold tool MT may be configured to produce a cover structure TS as a molded cover layer with a relatively thin dimension (approximately 1 mm) with suitable strength and durability and appearance for the component (with molded resin, elastomer, plastic, etc. materials) in the vehicle interior and with a tear line TR configured (e.g. with elements such as cavities at variable depth, groove arrangement/connectors, patterns/spacing, sections, etc.) for efficient formation of the opening for deployment of the airbag AB from the airbag module within the component into the vehicle interior. See also FIGS. 3A-3F and 16A-16F.

Figures 10A, 10B, 11A, 11B:
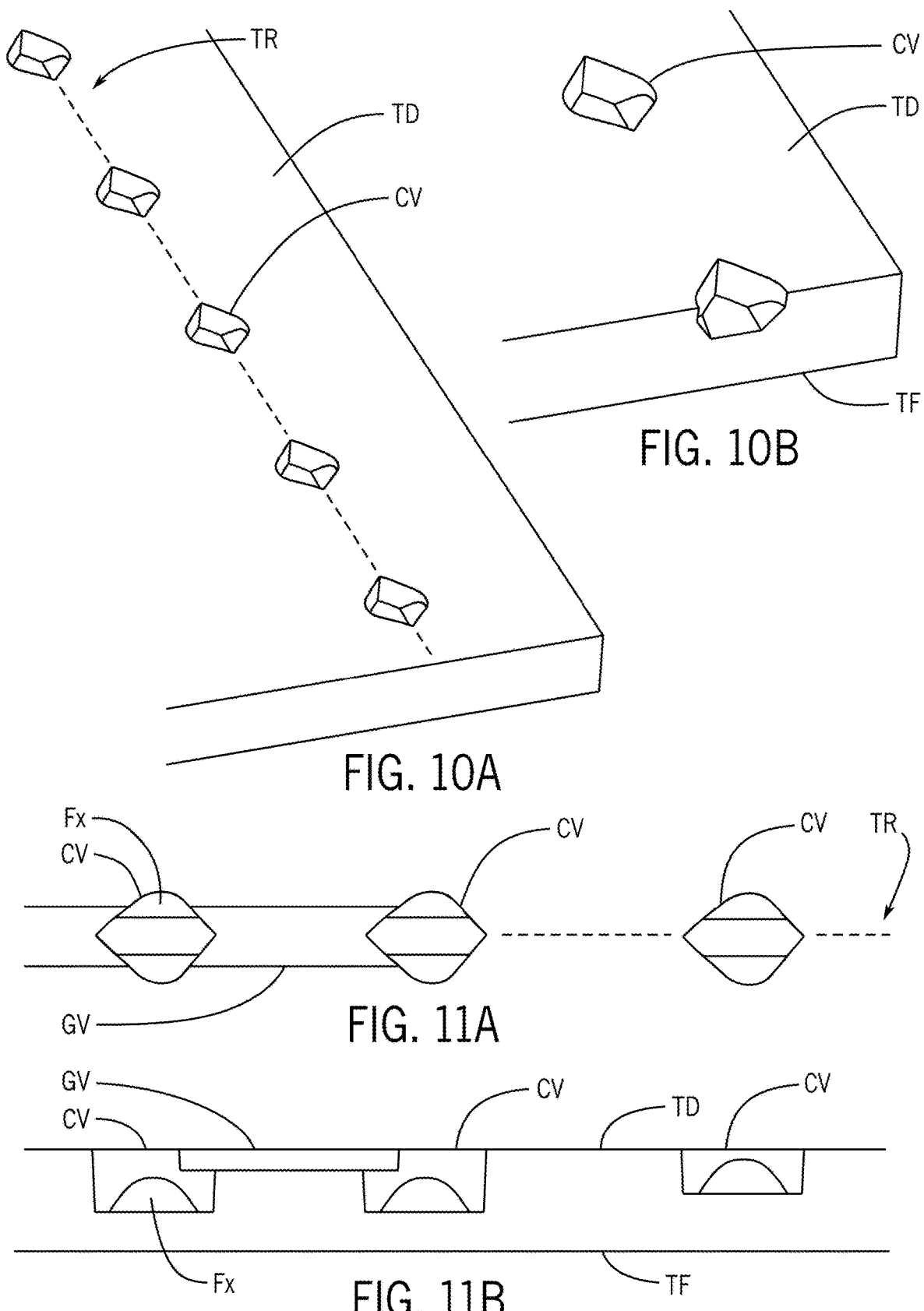
FIGS. 10A and 10B are schematic partial perspective views of a tear line for an opening for deployment of an airbag from a vehicle interior component according to an exemplary embodiment.
FIG. 11A is a schematic partial plan view of a tear line for an opening for deployment of an airbag from a vehicle interior component according to an exemplary embodiment.
FIG. 11B is a schematic partial side elevation view of a tear line for an opening for deployment of an airbag from a vehicle interior component according to an exemplary embodiment.
Figures 12A, 12B:
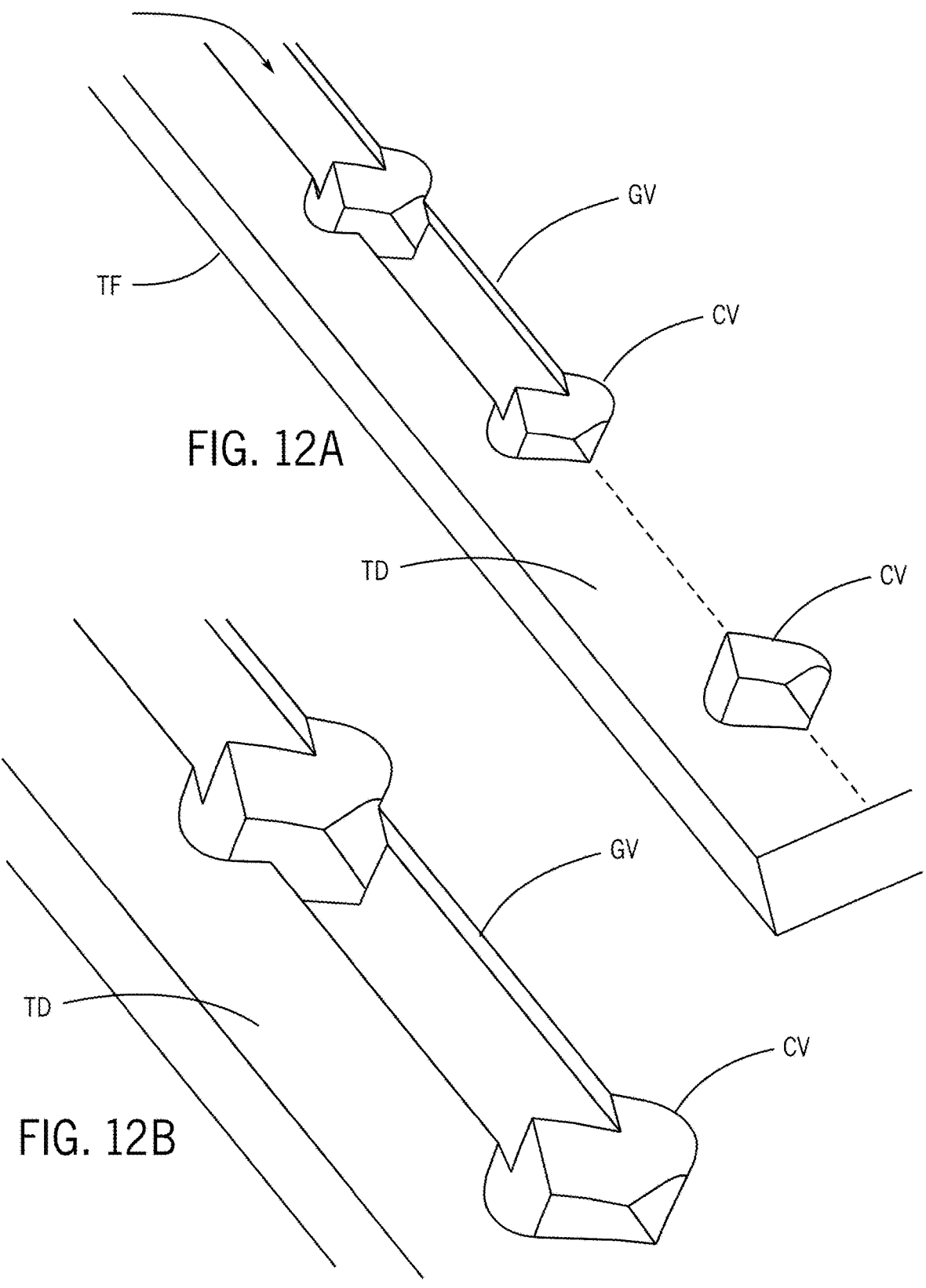
FIGS. 12A and 12B are schematic partial perspective views of a tear line for an opening for deployment of an airbag from a vehicle interior component according to an exemplary embodiment.
Figures 13A, 13B, 13C, 13D, 14:
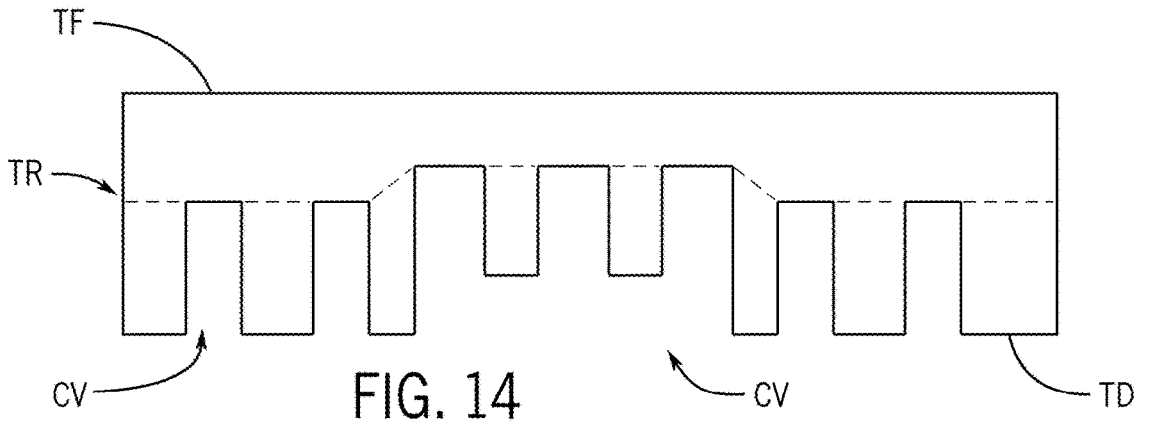
FIGS. 13A through 13D are schematic partial perspective views of an element of a tear line for an opening for deployment of an airbag from a vehicle interior component according to an exemplary embodiment.
FIG. 14 is a schematic partial side elevation view of cover structure with elements for a tear line for an opening deployment of an airbag from a vehicle interior component according to an exemplary embodiment.
Figures 15A, 15B, 15C:
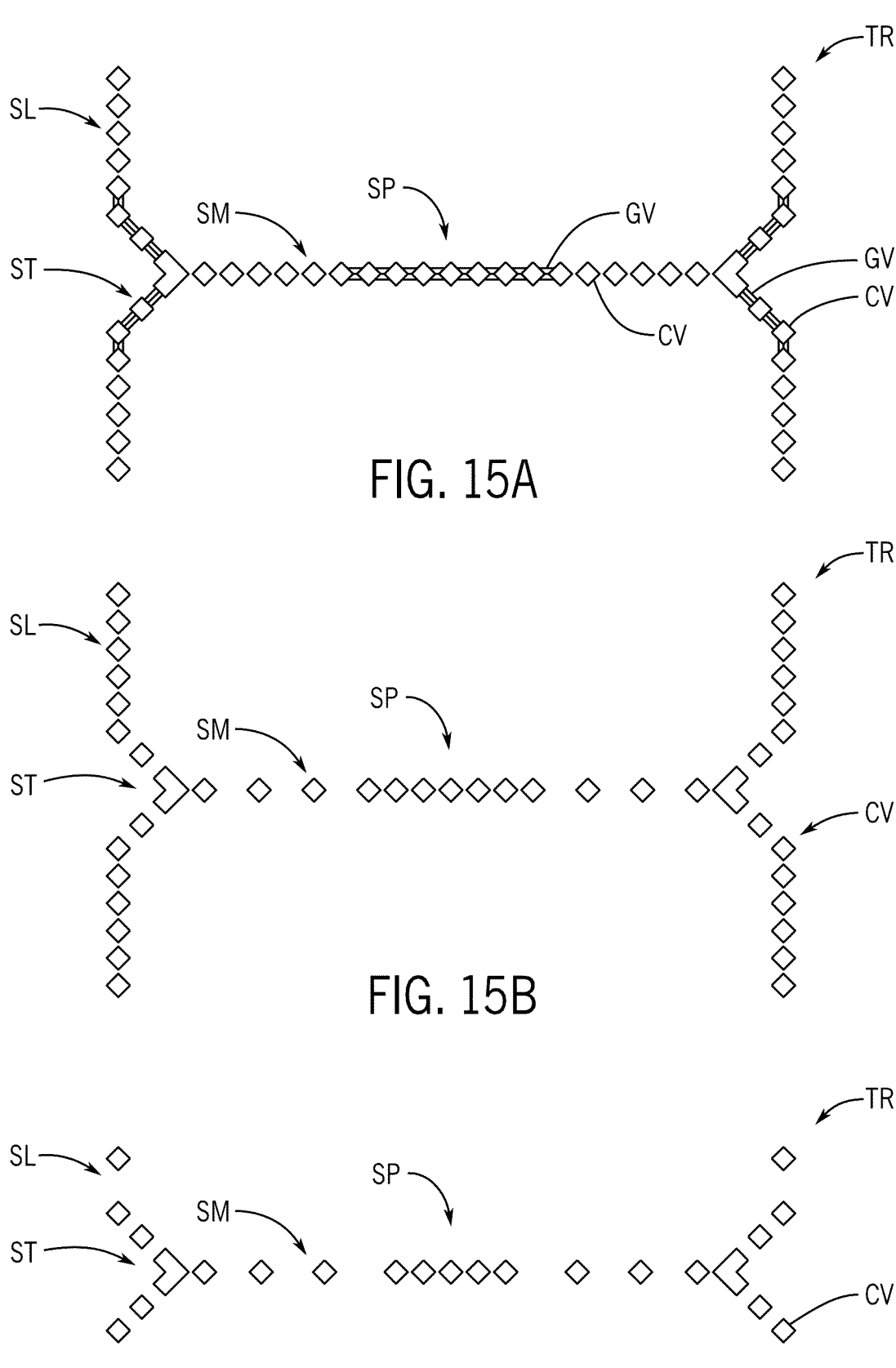
FIGS. 15A through 15C are schematic plan views of a tear line for an opening for deployment of an airbag from a vehicle interior component according to an exemplary embodiment.
Figures 17A, 17B, 17C, 17D:
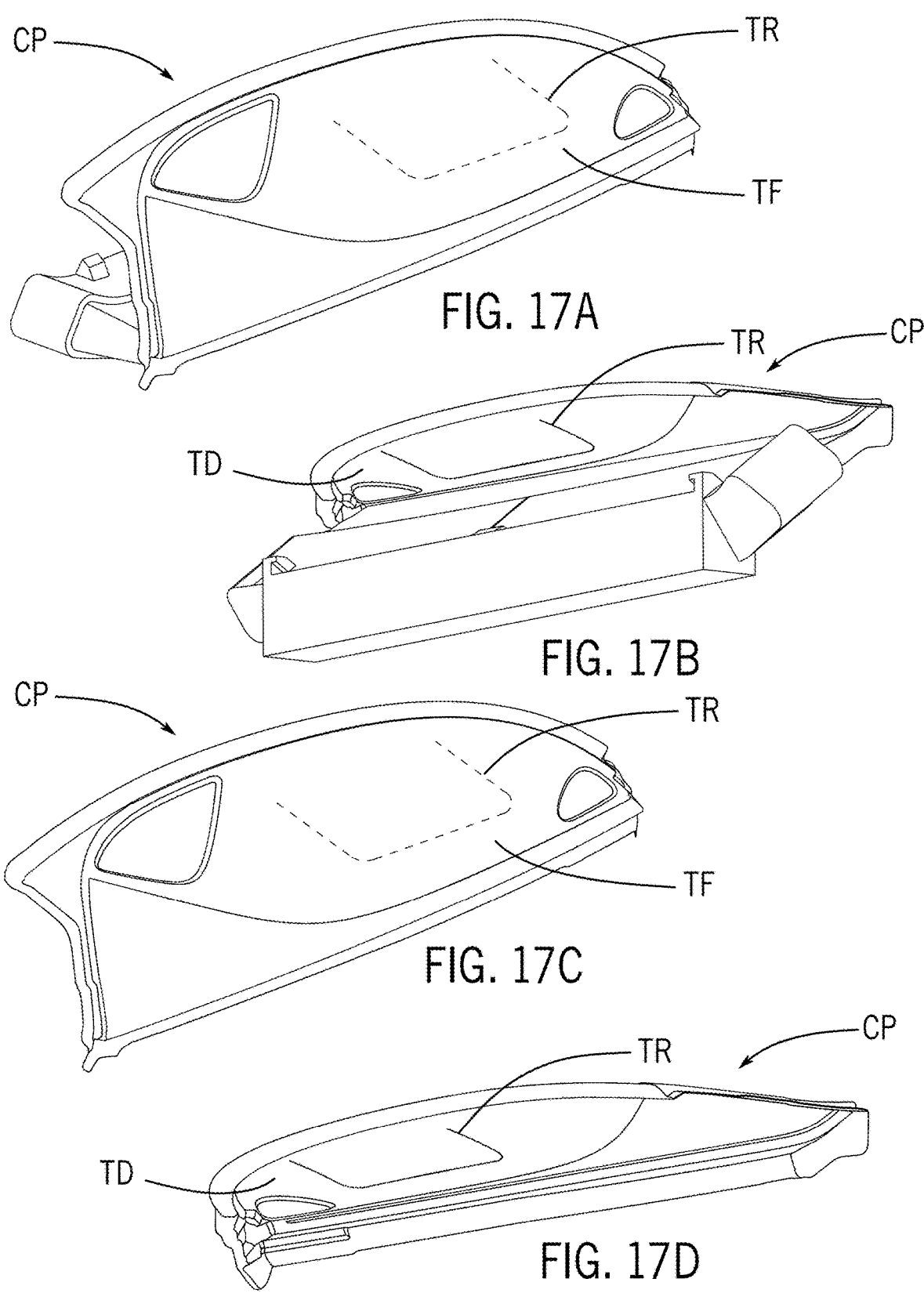
FIGS. 17A through 17D are schematic perspective views of a vehicle interior component shown as an instrument panel according to an exemplary embodiment.
Figures 18, 19A, 19B, 19C, 19D:
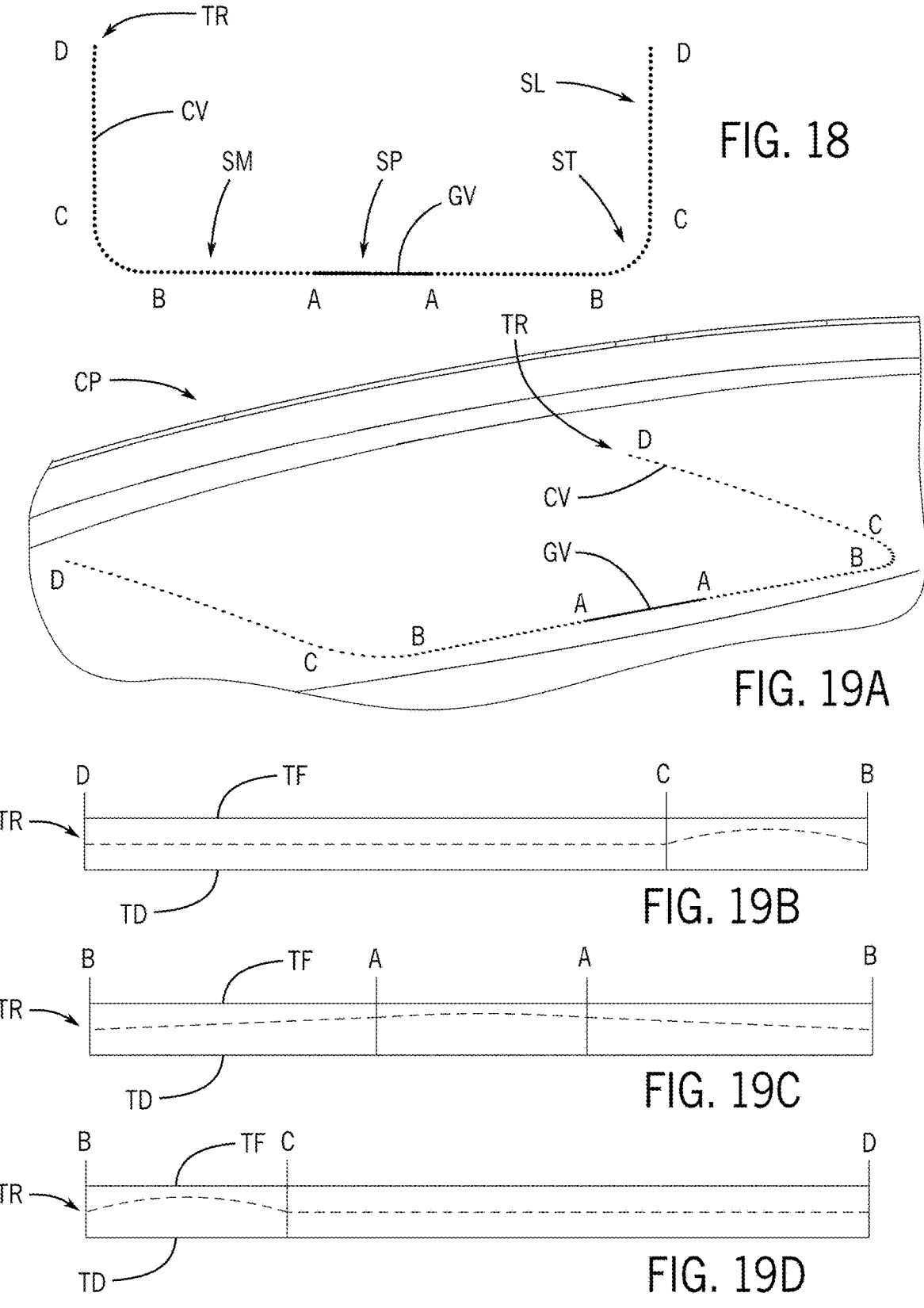
FIG. 18 is a schematic diagram of a tear line for an opening for deployment of an airbag from a vehicle interior component according to an exemplary embodiment.
FIG. 19A is a schematic partial perspective view of a cover structure for a vehicle interior component according to an exemplary embodiment.
FIGS. 19B through 19D are schematic side elevation views of cover structure for a vehicle interior component according to an exemplary embodiment.
Figures 20A, 20B, 20C, 20D, 20E, 20F:
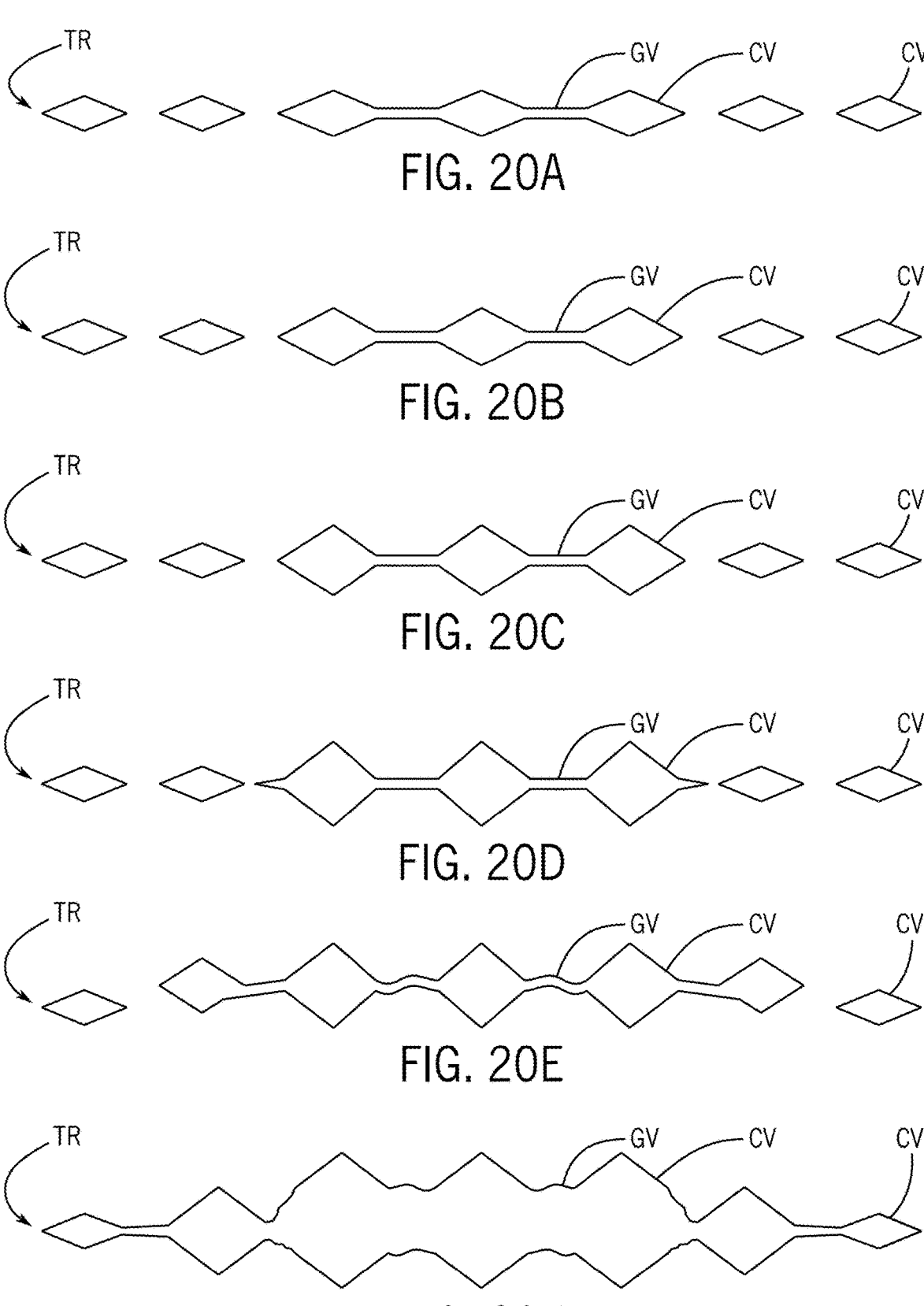
FIGS. 20A through 20F are schematic diagrams of elements of a tear line for an opening for deployment of an airbag from a vehicle interior component according to an exemplary embodiment.
Figures 21A, 21B, 21C, 21D, 21E, 21F:
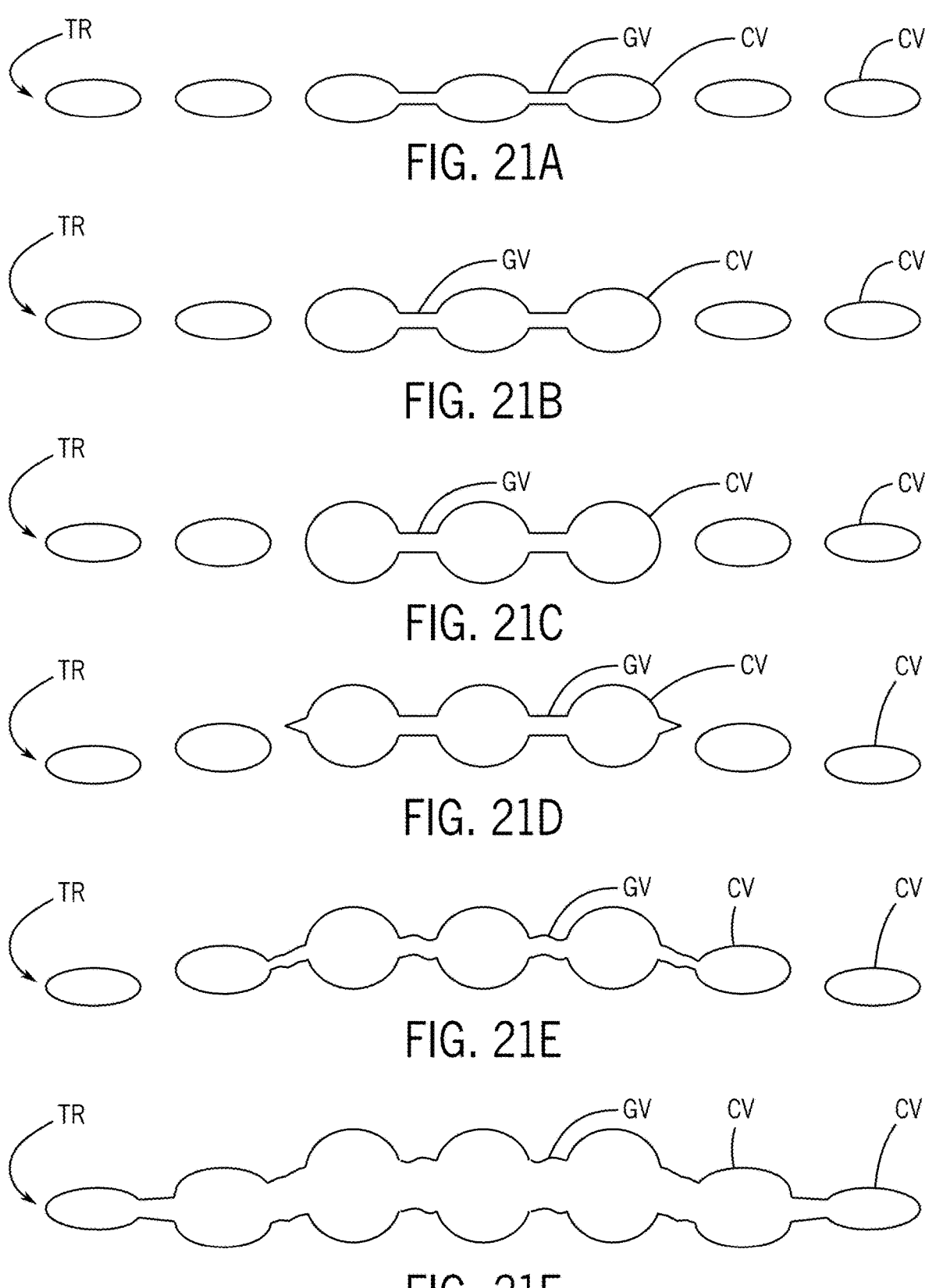
FIGS. 21A through 21F are schematic diagrams of elements of a tear line for an opening for deployment of an airbag from a vehicle interior component according to an exemplary embodiment.
Figures 22A, 22B, 22C:
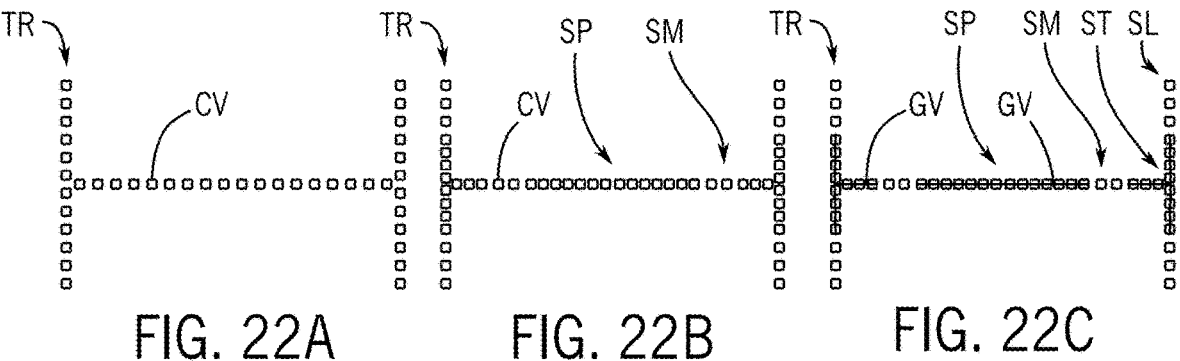
FIGS. 22A through 22C are schematic partial plan views of a tear line for an opening for deployment of an airbag from a vehicle interior component according to an exemplary embodiment.
Figures 23A, 23B, 23C:
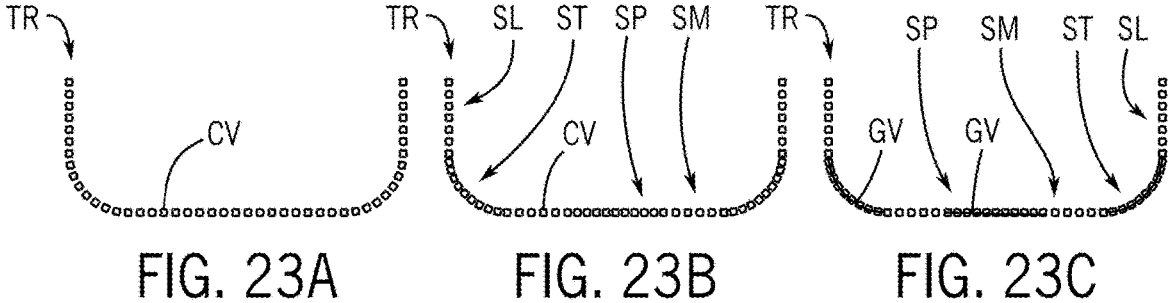
FIGS. 23A through 23C are schematic partial plan views of a tear line for an opening for deployment of an airbag from a vehicle interior component according to an exemplary embodiment.
Figures 24A, 24B, 24C:
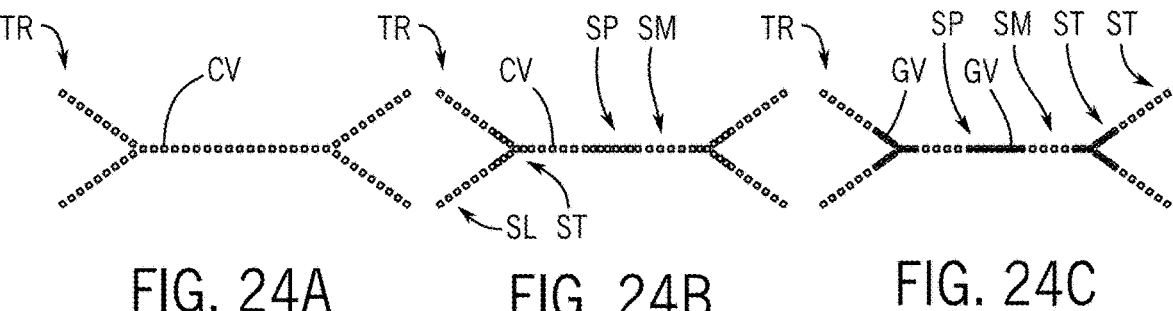
FIGS. 24A through 24C are schematic partial plan views of a tear line for an opening for deployment of an airbag from a vehicle interior component according to an exemplary embodiment.
Figures 25A, 25B, 25C, 25D:
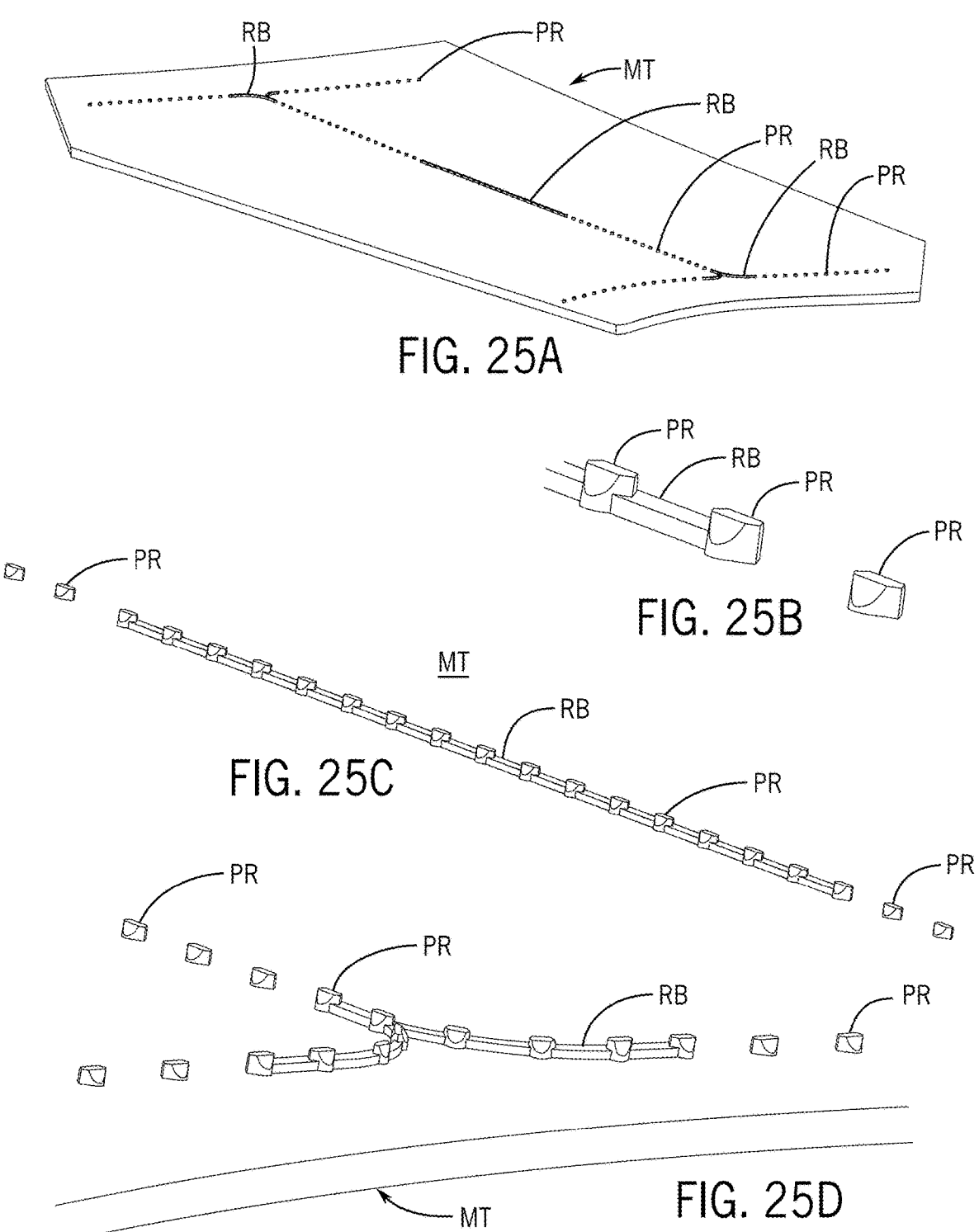
FIG. 25A is a schematic partial perspective view of a mold tool configured to form a vehicle interior component shown as an instrument panel according to an exemplary embodiment.
FIGS. 25B through 25D are schematic partial perspective views of a mold tool configured to form a vehicle interior component shown as an instrument panel according to an exemplary embodiment.

According to an exemplary embodiment as shown schematically in FIGS. 4A-4D, 17A-17D and 25A-25D, a method for forming a component CP comprising a set of cavities CV and at least one groove GV in a mold tool MT may comprise the following steps: closing the mold, inject-ing a material into the mold to form a cover structure TS with a tear line TR in a cover underside TD (but not visible at a cover surface TF); opening the mold sections, removing the cover and attaching a substrate to the cover structure to form the component CP. The material may comprise a resin material. The mold tool MT may comprise a surface com-prising a set of projections PR configured to form the set of cavities CV in the component and at least one rib RB configured to form at least one groove GV in the component. The rib of the mold may comprise a ridge. The set of projections PR may comprise a projection of the mold comprising a profile. As indicated in FIGS. 11A-11B and 25B, the profile of the projection PR may comprise a set of facets corresponding to facets Fx on the profile of the cavity CV; the profile of the projection may comprise a curved profile; the rib of the mold may comprise a profile. The profile of the rib RB may comprise a height; the profile of the projection PR may comprise a height; the projection PR and rib RB may be configured to form a cavity CV with a profile/depth greater than the profile/depth of the groove GV. See FIGS. 11A-11B and 25A-25D.

As shown schematically in FIGS. 4A-4D, 17A-17D and 25A-25D, the component may comprise a trim component; the cover structure TS of the trim component CP may comprise an outer surface provided by cover surface TF and an inner surface provided by cover underside TD formed in the mold; the inner surface may comprise a tear line TR configured to provide a weakening of the cover structure for the opening for deployment of the airbag; the line may comprise an opening section SP comprising a set of cavities CV formed by the set of projections PR in the mold and a groove GV formed by the at least one rib RB in the mold configured to connect at least two cavities of the set of cavities; the line may comprise an intermediate section SM comprising a set of cavities CV; the line may comprise a transition section ST comprising a set of cavities CV (and a groove GV) formed by projection PR (and rib RB) of the mold; each set of cavities may comprise at least one cavity comprising a profile formed by at least one projection in the mold. See also FIGS. 5A-5B, 6 and 18. The profile may comprise a multi-faceted profile comprising a curved surface. See FIGS. 13A-13D.

According to an exemplary embodiment as shown schematically in FIGS. 3A-3F, 4A-4D, 5A-5B, 6, 11A-11B, 16A-16F, 17A-17D, 18 and 19A-19D, a component (CP) for a vehicle interior configured to provide an opening for deployment of an airbag (AB) through the opening may comprise a substrate and a cover (TS) comprising an outer surface (TF) and an inner surface (TD). The inner surface may comprise a line configured to provide a tear line (TR) for the opening for deployment of the airbag. The line may comprise an opening section (A-A) comprising a set of cavities (CV) and a groove (GV) configured to connect at least two cavities of the set of cavities. The line may comprise an intermediate section (A-B) comprising a set of cavities; the line may comprise a transition section (B-C) comprising a set of cavities; each set of cavities may comprise at least one cavity comprising a profile. The cover may comprise a molded cover. The tear line may be configured so that the opening for deployment of the airbag is initially formed at the opening section. The tear line may be configured so that the opening for deployment of the airbag is formed at the opening section, then the intermediate section, then the transition section. The set of cavities of the opening section may be at a depth greater than a depth of the set of cavities of the intermediate section. The component may comprise a lateral section comprising a set of cavities adjacent to the transition section; the transition section may comprise a groove; the groove of the transition section may be at a depth less than a depth of the set of cavities of the transition section. The set of cavities of the opening section may comprise at least one cavity comprising a profile comprising a curved surface and/or a facet. The profile may comprise a faceted profile, multi-faceted profile, curved profile, etc. See e.g. FIGS. 13A-13D.

Exemplary Embodiments—A

According to an exemplary embodiment as shown schematically in FIGS. 2A-2D, a component for a vehicle interior (such as a trim panel, instrument panel, etc.) may be configured to provide/support a module with an airbag configured to be deployed through an opening into the vehicle interior. See also FIGS. 3A-3F and 16A-16F. As shown schematically in FIGS. 2A-2D, instrument panel IP may provide a weakened shape/zone shown as a recess TR to facilitate an airbag AB deployment through an airbag door ABD. According to an exemplary embodiment, the weakened shape/zone may comprise a set of cavities behind the visible surface of instrument panel IP. The weakened shape/zone may comprise an "H" shape pattern. According to an exemplary embodiment, the weakened shape/zone may comprise a "U" shape pattern, a "bow tie" shape pattern, or any pattern suitable for airbag deployment.

According to an exemplary embodiment as shown schematically in FIGS. 3A-3F, 4A-4D, 5A-5B, 6, 11A-11B, 16A-16F, 17A-17D, 18 and 19A-19D, a component for a vehicle interior configured to provide an opening for deployment of an airbag through the opening may comprise a substrate and a cover comprising an outer surface and an inner surface. The inner surface may comprise a line configured to provide a tear line for the opening for deployment of the airbag. The line may comprise an opening section comprising a set of cavities and a groove configured to connect at least two cavities of the set of cavities. The line may comprise an intermediate section comprising a set of cavities; the line may comprise a transition section comprising a set of cavities; each set of cavities may comprise at least one cavity comprising a profile. The cover may comprise a molded cover. The molded cover may comprise a molded cover layer. The outer surface may comprise a generally uniform exterior surface. The outer surface may be configured so that the line is not readily perceptible at the outer surface. The outer surface may comprise a textured external surface. The tear line of the inner surface of the cover may comprise at least one of (a) a weakening line or (b) a weakened section. The profile of the cavity may comprise a depth within the inner surface of the cover. The profile of the cavity may comprise a set of facets. The groove of the opening section may comprise a profile. The profile of the groove may comprise a depth within the inner surface of the cover. The transition section may comprise a groove connecting at least one cavity of the set of cavities. The line may comprise a seam. The line may comprise a lateral section comprising a set of cavities. The opening for deployment of the airbag may be formed at the lateral section. The lateral section may be transverse to the opening section. The opening for deployment of the airbag may be formed at the line comprising the opening section and the intermediate section and the transition section. The groove at the line at the opening section may have a depth less than a depth of the set of cavities at the line at the intermediate section. The intermediate section may comprise the set of cavities separated at a spacing. The line at the transition section may comprise a curved line. The line at the transition section may comprise a connection to a first lateral section and a connection to a second lateral section. The line at the transition section may comprise a groove configured to connect at least two cavities of the set of cavities. The transition section may comprise a first section generally parallel to the opening section and a second section generally transverse to the opening section. The set of cavities of the intermediate section may comprise a set of disconnected cavities. The opening section may comprise the set of cavities at a first depth and the intermediate section may comprise the set of cavities at a second depth; the first depth may be greater than the second depth. The opening section may comprise the set of cavities at a first spacing and the intermediate section may comprise the set of cavities at a second spacing. The first spacing may be less than the second spacing. The transition section may comprise the set of cavities connected by a generally Y-shaped groove. The set of cavities may comprise a cavity. The cavity may comprise a profile. The profile of the cavity may comprise a set of facets. The profile of the cavity may comprise an angled surface. The profile of the cavity may comprise a curved surface. The profile of the cavity may comprise a flat surface. The profile of the cavity may comprise a multi-faceted shape. The profile of the cavity may comprise a curved shape. The component may comprise at least one of (a) a trim panel; (b) an instrument panel; (c) a door panel; (d) a pillar; (e) a trim panel; (f) a trim component.

According to an exemplary embodiment as shown schematically in FIGS. 3A-3F, 4A-4D, 5A-5B, 6, 11A-11B, 16A-16F, 17A-17D, 18 and 19A-19D, a component for a vehicle interior configured to provide an opening for deployment of an airbag through the opening may comprise a substrate and a cover comprising a rear side facing the substrate and configured to establish the opening for deployment of the airbag and a front side providing an external surface facing the vehicle interior. The cover may comprise a weakened portion in the rear side of the cover to establish the opening for deployment of the airbag; the front side of the cover may comprise a substantially continuous surface opposite the weakened portion; the weakened portion may comprise a set of cavities in a pattern. The cover may comprise a molded cover layer. The external surface may comprise a textured surface. The weakened portion may comprise a groove connecting two cavities of the set of cavities. The pattern may comprise a middle section, a side section and a transition section between the middle section and the side section. The middle section may be generally orthogonal to the side section. The middle section may comprise a transition cavity comprising a shape configured to provide a transition from the middle section to the side section. The middle section may comprise a set of cavities connected by a groove and a set of disconnected cavities. The middle section may comprise a set of cavities comprising a first depth and a set of cavities comprising a second depth greater than the first depth. The middle section may comprise a set of cavities comprising a first spacing distance between cavities and a set of cavities comprising a second spacing distance between cavities greater than the first spacing distance. The transition section may comprise a set of cavities connected by a groove. The groove may comprise a curved groove. The transition section may comprise a set of cavities comprising a spacing distance between cavities less than a spacing distance between a set of cavities adjacent the set of cavities of the transition section. The transition section may comprise a set of cavities comprising a depth greater than a depth of a set of cavities adjacent the set of cavities of the transition section. A cavity of the set of cavities may comprise a wall and a floor. The cavity may comprise at least one of (a) a bevel, (b) a fillet, (c) a chamfer. The cavity may comprise an angled surface connecting the wall and the floor. The floor may be generally parallel to the external surface of the front side of the cover. The floor may be configured to provide the substantially continuous surface providing a substantially continuous visual effect opposite the weakened portion of the cover at the external surface of the front side of the cover. The wall may comprise a generally planar wall and a generally curved wall. The wall may comprise a first generally planar wall connected to a second generally planar wall and a generally curved wall. The wall may comprise a first generally planar wall connected to a second generally planar wall at a line configured to provide a tear line in the cover for the opening. The set of cavities may be formed by molding the cover in a mold comprising at least one projection configured to form the cavity. The component may comprise at least one of (a) a trim panel; (b) an instrument panel; (c) a door panel; (d) a pillar; (e) a trim panel; (f) a trim component; (g) steering wheel; (h) an other interior component.

Exemplary Embodiments—B

According to an exemplary embodiment as shown schematically in FIGS. 3A-3F, 4A-4D, 5A-5B, 6, 11A-11B, 16A-16F, 17A-17D, 18 and 19A-19D, a component for a vehicle interior providing a skin adapted for being torn in an extension direction of a weakening line may comprise a plurality of weakening holes extending from a back surface of the skin in a thickness direction of the skin. See also FIGS. 26A-26C, 27A-27C, 28A-28C, 29, 30, 31, 32, 33, 34, 35, 36, 37, 38, 39, 40, 41, 42 and 43. The plurality of weakening holes may be arranged at intervals from each other to form the weakening line. The weakening line may comprise a tear-off section; a skin residual thickness of the weakening holes of the tear-off section may be less than a skin residual thickness of the weakening holes of a portion of the weakening line outside the tear-off section; the tear-off section may comprise at least two weakening holes with weakening portions; the at least two weakening holes of the tear-off section may be arranged such that a connecting line of the weakening portions of the at least two weakening holes extends in the extension direction of the weakening line.

According to an exemplary embodiment as shown schematically in FIGS. 3A-3F, 4A-4D, 5A-5B, 6, 11A-11B, 16A-16F, 17A-17D, 18 and 19A-19D, a skin for a vehicle interior adapted for being torn in an extension direction of a weakening line may comprise a plurality of weakening holes extending from a back surface of the skin in a thickness direction of the skin. See also FIGS. 26A-26C, 27A-27C, 28A-28C, 29, 30, 31, 32, 33, 34, 35, 36, 37, 38, 39, 40, 41, 42 and 43. The plurality of weakening holes may be arranged at intervals from each other to form the weakening line. The weakening line may comprise a tear-off section. A skin residual thickness of the weakening holes of the tear-off section may be less than a skin residual thickness of the weakening holes of a portion of the weakening line outside the tear-off section. The tear-off section may comprise at least two weakening holes with weakening portions; the at least two weakening holes of the tear-off section may be arranged such that a connecting line of the weakening portions of the at least two weakening holes extending in the extension direction of the weakening line. A cross section of the weakening holes of the tear-off section may have an oval shape, and the weakening portions may be end portions of the weakening holes in a long axial direction of the oval shape. A cross section of the weakening holes of the tear-off section may have a polygonal shape, and the weakening portions may be corners of the weakening holes. The polygonal shape may be a triangle, a diamond or a hexagon. Spacing between adjacent weakening holes of the tear-off section may be less than spacing between adjacent weakening holes of a portion of the weakening line outside the tear-off section. Spacing between adjacent weakening holes of the tear-off section may be 1 mm to 2 mm. An area of a cross section of the weakening hole of the weakening line may be 0.04 mm2 (square millimeter) to 6 mm2 (square millimeter). An area of a cross section of the weakening hole of the weakening line may remain constant in the thickness direction of the skin, or an area of a cross section of the weakening hole of the weakening line may decrease from the back surface of the skin in the thickness direction of the skin. The weakening line may comprise an exposed section at a center thereof wherein the tear-off section is located at a center of the exposed section or at both ends of the exposed section. A length of the tear-off section may be ¹⁄₂₀ to ½ of a length of the exposed section. A length of the tear-off section may be ¹⁄₁₀ to ⅓ of a length of the exposed section. The skin residual thickness of the weakening holes of the tear-off section may be 0.2 mm to 0.6 mm. Adjacent weakening holes of the tear-off section are connected by weakening grooves extending from the back surface of the skin in the thickness direction of the skin. A length direction of the weakening grooves may be in the same direction as the extension direction of the weakening line. The weakening groove may have a depth of 0.2 mm to 0.6 mm. The skin may be made of a thermoplastic elastomer. The thermoplastic elastomer may have a tensile strength of 2 MPa to 15 MPa and an elongation at break of 100 percent to 800 percent. The thermoplastic elastomer may have a tensile strength of 5 MPa to 9 MPa and an elongation at break of 200 percent to 600 percent. The skin at the tear-off section may have a tensile strength of 2 MPa to 4 MPa in a direction perpendicular to the extension direction of the weakening line under normal temperature conditions. The skin may be formed by injection molding, slush molding or calendering. The weakening holes of the weakening line may be formed in a process of forming the skin by injection molding. The weakening holes of the weakening lines may be formed by hot pressing after forming a semi-finished product of the skin by slush molding or calendering.

Exemplary Embodiments—C

As shown schematically in FIGS. 1A-1B, 2A-2D and 43, an interior of the automobile V may comprise a component such as an instrument panel IP configured with a cover structure TS with a cover surface TF and a cover underside TD configured to provide a line such as a tear line TR with elements such as cavities and/or grooves GV in a pattern/ sections to provide an opening to deploy and airbag AB from an airbag module within the component. See FIGS. 3A-3F, 4A-4D, 5A-5B, 6, 11A-11B, 16A-16F, 17A-17D, 18 and 19A-19D.

The instrument panel IP may comprise a skin 10, an intermediate foam layer and a framework. The area of the skin 10 corresponding to a front passenger seat airbag may be provided with a weakening line 102, so that the skin 10 can be smoothly torn off during deployment of an airbag, and the airbag can be smoothly ejected. A shape of the weakening line 102 may generally conform to a shape of the airbag door. Commonly used airbag doors are U-shaped, H-shaped and double Y-shaped, and U-shaped, H-shaped and double Y-shaped weakening lines may be formed on the skin 10.

Figures 26A, 26B, 26C, 27A, 27B, 27C, 28A, 28B, 28C:
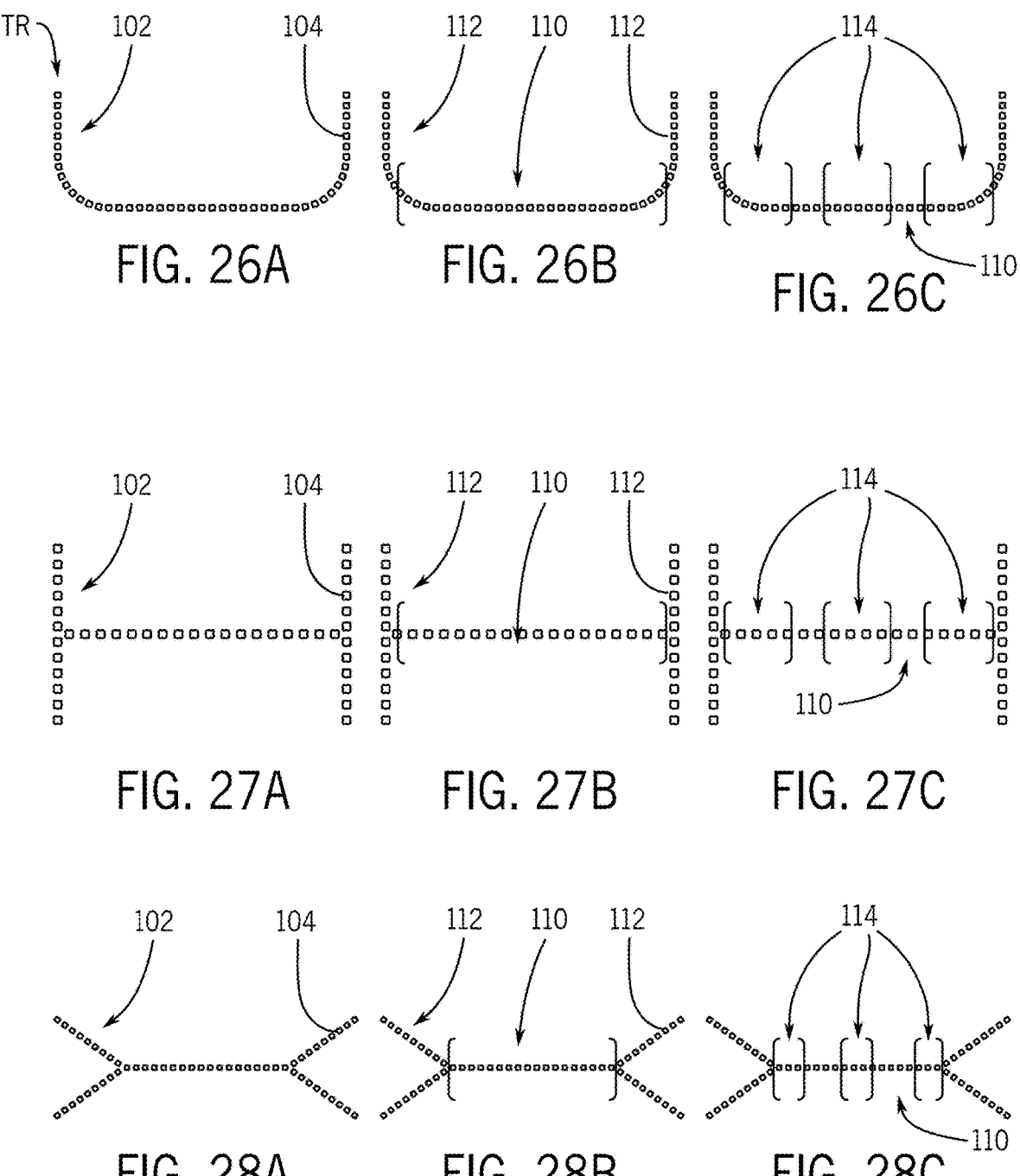
FIGS. 26A through 26C are schematic plan views of a tear line for an opening for deployment of an airbag from a vehicle interior component according to an exemplary embodiment.
FIGS. 27A through 27C are schematic plan views of a tear line for an opening for deployment of an airbag from a vehicle interior component according to an exemplary embodiment.
FIGS. 28A through 28C are schematic plan views of a tear line for an opening for deployment of an airbag from a vehicle interior component according to an exemplary embodiment.

FIGS. 26A, 27A and 28A schematically show U-shaped, H-shaped, and double Y-shaped weakening lines 102. According to an exemplary embodiment, the weakening line 102 may be primarily formed by a plurality of weakening cavities 104 arranged at intervals. The weakening cavities 104 are shown schematically in FIGS. 26A, 27A and 28A. A portion of the skin 10 where the weakening cavities 104 are present may be weaker than other portions. The skin 10 may be torn off in an extension direction of the weakening line 102 when the airbag is deployed. The weakening line 102 may comprise an intended tearing path of the skin 10.

Figures 37, 38, 39:
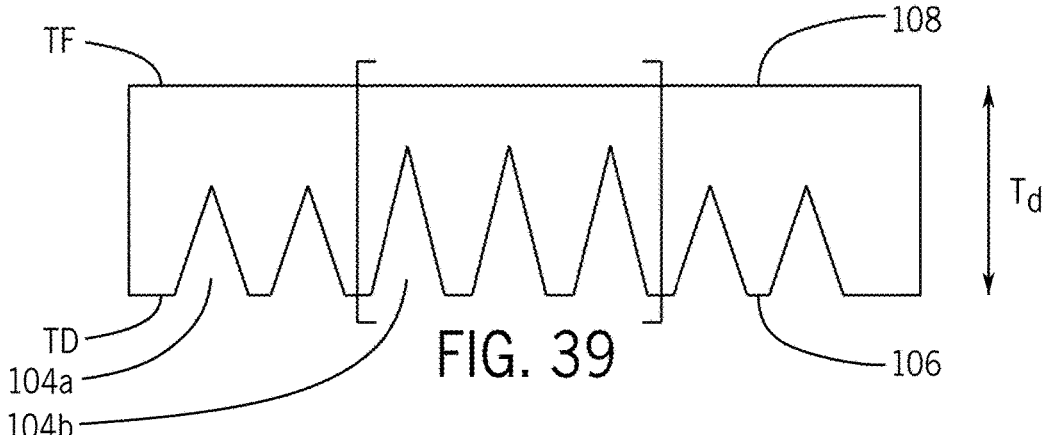
FIG. 37 is a schematic partial side elevation view of cover structure with elements for a tear line for an opening for deployment of an airbag from a vehicle interior component according to an exemplary embodiment.
FIG. 38 is a schematic partial side elevation view of cover structure with elements for a tear line for an opening for deployment of an airbag from a vehicle interior component according to an exemplary embodiment.
FIG. 39 is a schematic partial side elevation view of a tear line for an opening for deployment of an airbag from a vehicle interior component according to an exemplary embodiment.

With reference to FIG. 38, the weakening cavities 104 may extend from a back surface 106 of the skin 10 in a thickness direction Td of the skin 10, and are blind cavities so that the weakening cavities 104 are not visible to passengers or drivers in the vehicle. A distance from a bottom 105 of the weakening cavities 104 to a surface 108 of the skin 10 is called skin residual thickness. The skin residual thickness of the weakening cavities 104 has a great influence on the appearance and safety of the skin 10. If the skin residual thickness of the weakening cavities 104 is too low, the skin 10 will age and cause the surface 108 of the skin 10 to appear concave (i.e., weakening marks) corresponding to locations of the weakening cavities 104, thereby affecting the appearance of the instrument panel, as affected by high-temperature and sun roasting for a long time. If the skin residual thickness of the weakening cavities 104 is too high, the skin 10 cannot be torn off according to a preset tearing track, and skin splashing easily occurs to cause injury to passengers or drivers.

With reference to FIGS. 26B, 27B, 28B and FIG. 43, the weakening lines 102 may each include an exposed section 110 (i.e., a portion as shown schematically enclosed by brackets) at a center thereof and an extension 112 on both sides of the exposed section 110. In the illustrated embodiment, the exposed section 110 is a portion of the weakening line 102 that is substantially parallel to an axle, as well as the portion of the weakening line that can be seen by a passenger in the front passenger seat when looking at the instrument panel after the burst of the front passenger seat airbag causes the skin 10 to be torn off. As shown schematically in FIG. 26B, the middle of the exposed section 110 of the U-shaped weakening line 102 may comprise a straight line shape, and both ends of the exposed section 110 may comprise an arc shape. In FIGS. 27B and 28B, the exposed sections 110 of the H-shaped and Y-shaped weakening lines 102 may be generally linear.

With reference to FIGS. 26C, 27C and 28C, a tear-off section 114 (a portion as shown schematically enclosed by brackets) is provided in the exposed section 110. A location of the tear-off section 114 may be set as desired. The tear-off section 114 may be located at a center of the exposed section 110 or at both ends of the exposed section 110. For example, for the U-shaped weakening line 102 in FIG. 26C, the tear-off section 114 may be a straight portion at the center of the exposed section 110 or an arcuate portion at both ends of the exposed section 110. FIGS. 26C, 27C and 28C schematically illustrate exemplary positions of the tear-off sections and do not indicate that the exposed section 110 has three tear-off sections. Typically, one tear-off section 114 is provided in the exposed section 110. A length of the tear-off section 114 may be ½0 to ½ of a length of the exposed section 110. Preferably, the length of the tear-off section 114 may be ⅒ to ⅓ of the length of the exposed section 110. With reference to FIG. 38, the portion enclosed by brackets is the tear-off section 114; the weakening cavities in a portion of the weakening line 102 outside the tear-off section 114 are designated by reference numeral 104a, and the weakening cavities within the tear-off section 114 are designated by reference numeral 104b, both of which may be collectively referred to as the weakening cavities 104. As shown, a skin residual thickness h1 of the weakening cavities 104a at the portion outside the tear-off section 114 is greater than a skin residual thickness h2 of the weakening cavities 104b of the tear-off section 114. Thus, the skin 10 is torn off from the weaker tear-off section 114 when the airbag is burst, so that the tearing of the skin 10 is controllable.

Referring to FIGS. 29 to 32, different weakening lines are shown schematically according to exemplary embodiments. As shown schematically, the weakening cavities 104 of the weakening line 102 have weakening portions 116, and the four weakening cavities 102 in each FIGURE are arranged such that a connecting line 117 (shown in broken lines) of the weakening portions 116 of the four weakening cavities 102 may extend in an extension direction of the weakening lines 102. The weakening portions 116 indicate that under the same stress condition, the portion where a stress in the weakening cavities 104 is more concentrated or a portion containing a stress concentration point. Locations of the weakening portions 116 may vary for different shapes of the weakening cavities 104, and generally the weakening portions 116 may be a portion with a relatively low radius of curvature or a relatively sharp point in the weakening cavities 104.

Figures 29, 30, 31, 32:
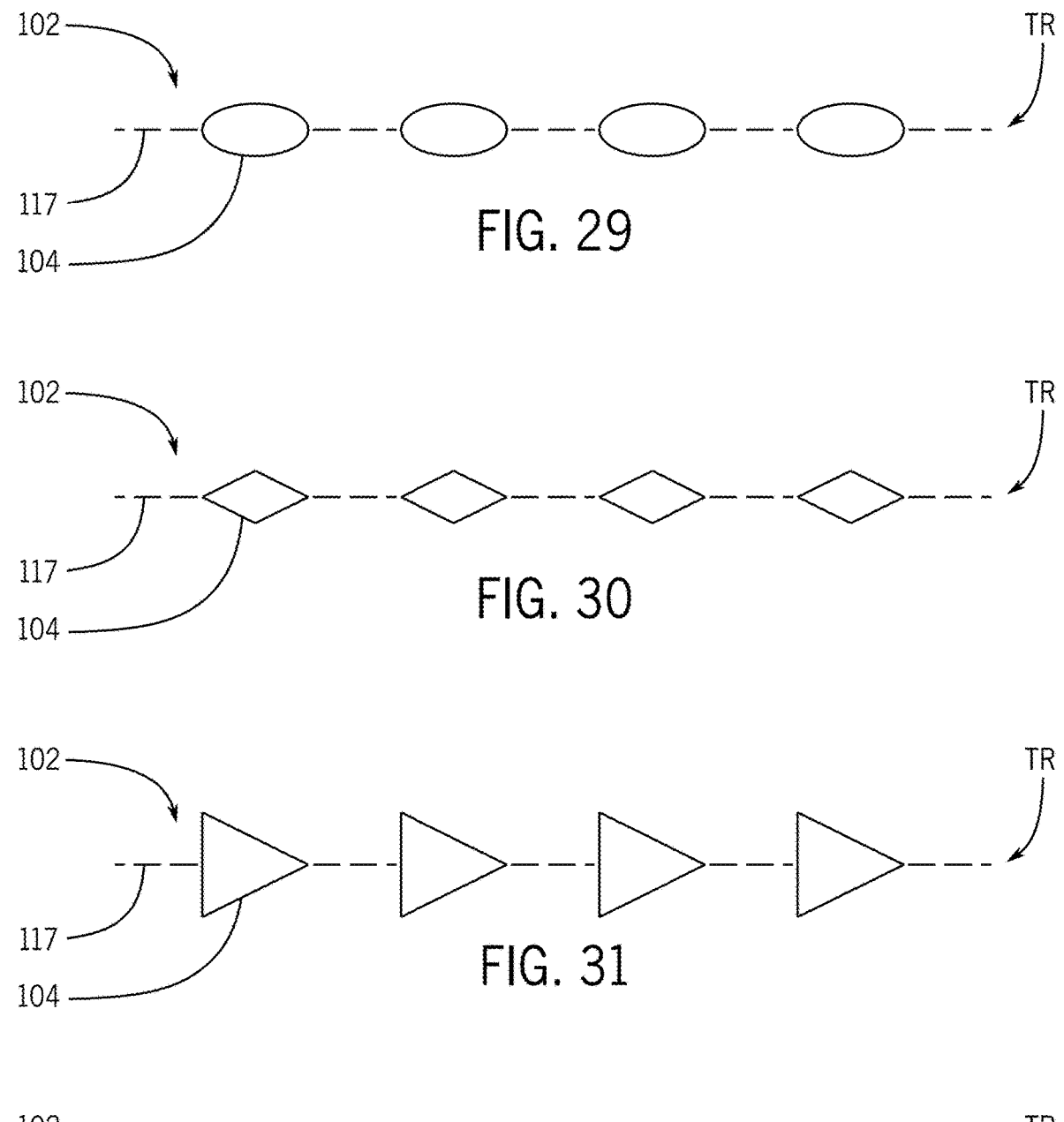
FIG. 29 is a schematic diagram of elements of a tear line for an opening for deployment of an airbag from a vehicle interior component according to an exemplary embodiment.
FIG. 30 is a schematic diagram of elements of a tear line for an opening for deployment of an airbag from a vehicle interior component according to an exemplary embodiment.
FIG. 31 is a schematic diagram of elements of a tear line for an opening for deployment of an airbag from a vehicle interior component according to an exemplary embodiment.
FIG. 32 is a schematic diagram of elements of a tear line for an opening for deployment of an airbag from a vehicle interior component according to an exemplary embodiment.

According to an exemplary embodiment as shown schematically in FIG. 29, a cross-section of the weakening cavities 104 may comprise an oval shape. For oval-shaped weakening cavities 104, a radius of curvature of end portions 116 on the long axis of the oval shape of the weakening cavities 104 may be less than that of other portions of the weakening cavities 104, so that the end portion 116 is more concentrated in stress and easier to be torn off than other portions under the same stress conditions; the weakening portions of the oval-shaped weakening cavities 104 are two end portions 116 of the weakening cavities 104 on the long axis of the oval shape, the two end portions 116 being disposed toward the extension direction of the weakening line 102, so that the connecting line 117 of the eight weakening portions 116 of the four oval-shaped weakening cavities 104 extend along the extension direction of the weakening line 102, thereby making the weakening line 102 easier to tear off.

According to an exemplary embodiment as shown schematically in FIGS. 30 to 32, a cross-section of the weakening cavities 104 may comprise a polygonal shape, the polygonal shape specifically being diamond, triangular, and hexagonal, respectively. In case of polygonal-shaped weakening cavities 104, the weakening portions of the polygonal-shaped weakening cavities 104 are corners 116 because the corners 116 of the weakening cavities 104 are sharper than other portions of the weakening cavities 104, such as a straight line portion between the two corners, and under the same stress condition, the corners 116 are more concentrated in stress than the other portions (specifically, a stress concentration point is located at a vertex of the corner 116) and are more easily torn off. For example, for diamond-shaped weakening cavities 104 in FIG. 30, the four corners 116 of the weakening hole 104 are weakening portions. For triangular shaped weakening cavities 104 in FIG. 31, the three corners 116 of the weakening hole 104 are weakening portions. Furthermore, depending on the symmetry of the weakening hole 104, one or two weakening portions 116 of the weakening hole 104 may be arranged towards the extension direction of the weakening line 102, so that the line connecting the weakening portions 116 of the weakening cavities 104 extends in the extension direction of the weakening line 102, thereby making the weakening line 102 easier to tear off. In the embodiment shown in FIG. 30, the two corners 116, which are at an acute angle, of the diamond-shaped weakening hole 104 are arranged towards the extension direction of the weakening line 102, so that the connecting line 117 of the eight weakening portions 116 of the four diamond-shaped weakening cavities 104 extends in the extension direction of the weakening line 102. It will be appreciated that the two obtuse-angled corners 116 of the diamond-shaped weakening cavity 104 may also be arranged toward the extension of the weakening line 102, again with the effect of making the weakening line 102 easier to tear. In the embodiment shown in FIG. 31, one corner 116 of the triangular weakening cavity 104 is arranged toward the extension direction of the weakening line 102 such that the connecting line 117 of the four weakening portions 116 of the four triangular weakening cavities 104 extends in the extension direction of the weakening line 102. In the embodiment shown in FIG. 32, the two corners 116 in a long axial direction of the hexagonal weakening cavity 104 are arranged toward the extension direction of the weakening line 102, so that the connecting line 117 of the eight weakening portions 116 of the four hexagonal weakening cavities 104 extends in the extension direction of the weakening line 102.

The arrangement of the weakening cavities 104 (i.e. the weakening cavities have weakening portions and are arranged such that the connecting line of the weakening portions of the plurality of weakening cavities extends in the extension direction of the weakening line) makes the skin 10 easier to tear off. The skin 10 may be torn off according to the preset tearing track (namely, the weakening line 102) so as to avoid splashing, and the skin residual thickness of the weakening cavity 104 can be properly increased on the premise that the skin 10 can be smoothly torn off, so that the skin can be prevented from showing weakening marks after being subjected to high temperature or sunlight roasting for a long time.

Since the tear-off section 114 is the portion of the weakening line 102 where the skin residual thickness is minimum and is the first to tear, and it has a significant effect on the tearing process and appearance of the skin. It is possible to arrange only the weakening cavities 104b of the tear-off section 114 in the manner described above, and also to arrange all the weakening cavities 104 in the entire weakening line 102 in the manner described above.

FIGS. 29 to 32 schematically illustrate alternative shapes of the weakening cavities 104. The weakening cavities 104 may also take any other suitable shape so long as it has a weakening portion 116. The weakening cavities 104 may have an acute angle at two ends and a circular arc at other portions; the weakening portions 116 may be acute angle corners at two ends of the weakening cavities 104, and the acute angle weakening portions 116 at two ends of the plurality of weakening cavities 104 may be arranged towards the extension direction of the weakening line 102 such that a connecting line 117 of the weakening portions 116 of the plurality of weakening cavities 104 extends in the extension direction of the weakening line 102.

An area of a single weakening cavity 104 in the weakening line 102 is about 0.04 mm2 to 6 mm2. As shown in FIG. 38, a cross-sectional area of the weakening cavities 104a, 104b of the weakening line 102 can be kept constant in the thickness direction Td of the skin 10. Accordingly, the weakening cavities 104a, 104b are rectangular in cross-section in the thickness direction Td of the skin 10. Alternatively, as shown in FIG. 39, the cross-sectional area of the weakening cavities 104a, 104b of the weakening line 102 decreases from the back surface 106 of the skin 10 in the thickness direction Td of the skin 10. Accordingly, the cross-section of the weakening cavities 104a, 104b in the thickness direction Td of the skin 10 is triangular.

Figure 33:
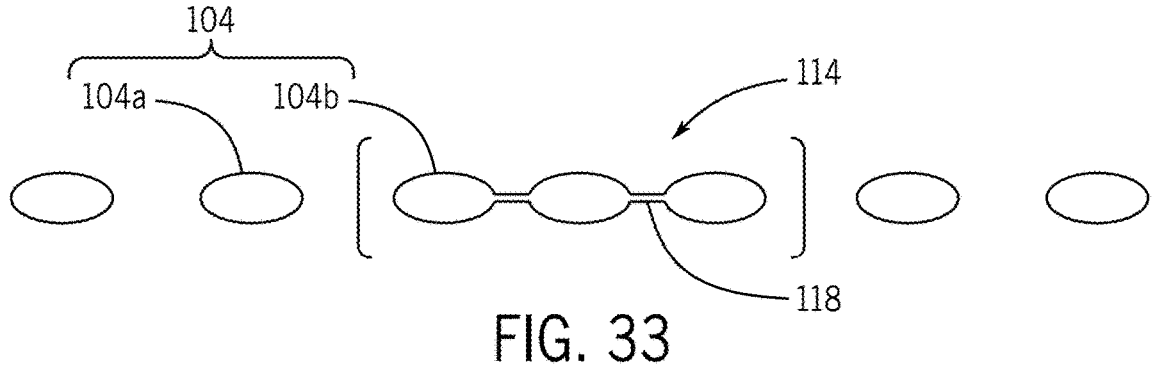
FIG. 33 is a schematic diagram of elements of a tear line for an opening for deployment of an airbag from a vehicle interior component according to an exemplary embodiment.
Figure 34:
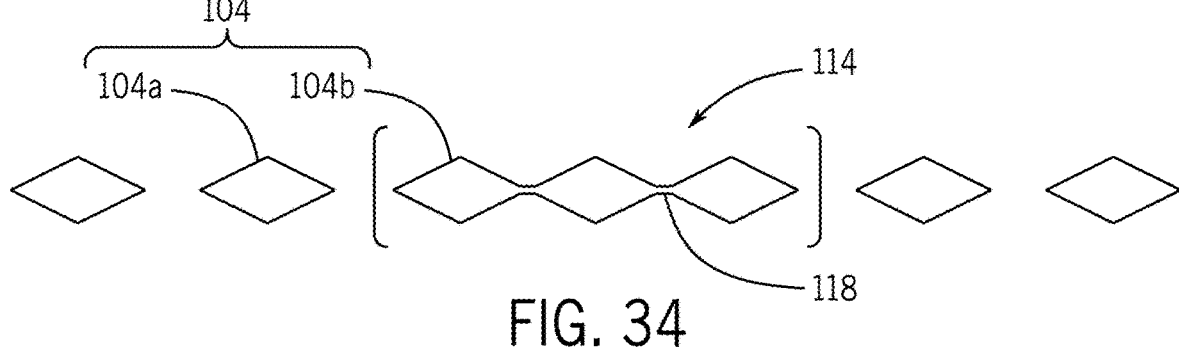
FIG. 34 is a schematic diagram of elements of a tear line for an opening for deployment of an airbag from a vehicle interior component according to an exemplary embodiment.
Figure 35:
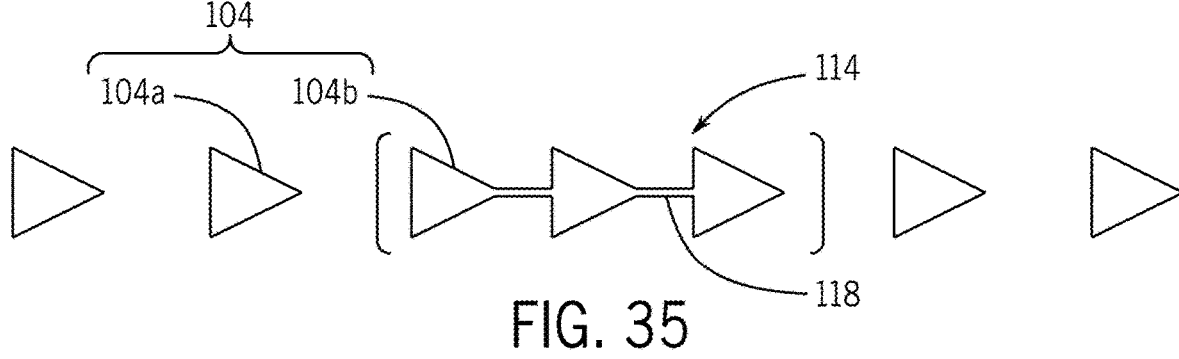
FIG. 35 is a schematic diagram of elements of a tear line for an opening for deployment of an airbag from a vehicle interior component according to an exemplary embodiment.
Figure 36:
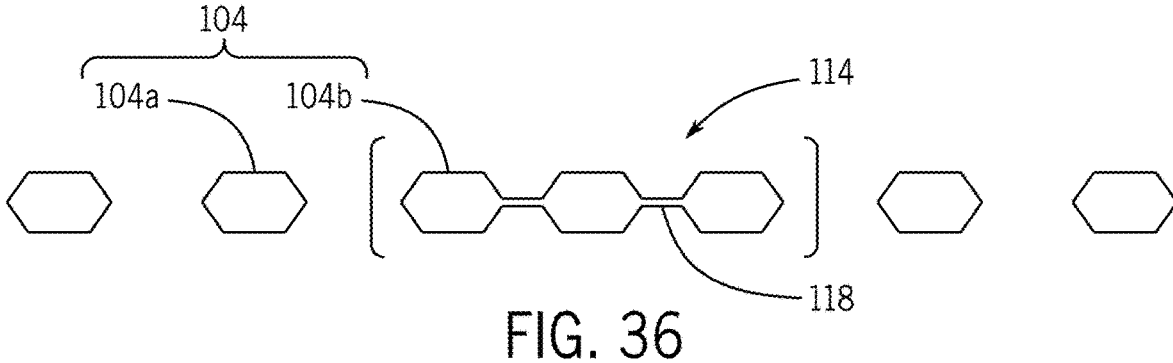
FIG. 36 is a schematic diagram of elements of a tear line for an opening for deployment of an airbag from a vehicle interior component according to an exemplary embodiment.

Spacing between adjacent weakening cavities 104 in the weakening line 102 may be 0.3 mm to 50 mm, preferably 1 mm to 3 mm. Spacing between adjacent weakening cavities 104b in the tear-off section 114 may be set to 1 mm to 2 mm. With reference to FIGS. 33 and 38, spacing S2 between adjacent weakening cavities 104b in the tear-off section 114 enclosed by brackets may be less than spacing S1 between adjacent weakening cavities 104a in a portion outside the tear-off section 114 of the weakening line 102 to enhance the degree of weakening of the tear-off section 114.

The skin residual thickness of the weakening cavities 104 in the weakening line 102 may be 0.2 mm to 1 mm. The skin residual thickness of the weakening cavities 104b in the tear-off section 114 may be set to 0.2 mm to 0.6 mm.

As shown schematically in FIGS. 33 to 36 and FIG. 37, adjacent weakening cavities 104b, enclosed by brackets, of the tear-off section 114 may be connected by the weakening grooves 118. The weakening portions 116 of adjacent weakening cavities 104b of the tear-off section 114 may be connected by the weakening grooves 118, thereby enhancing the weakening effect of the tear-off section 114, making the tear-off section 114 easier to tear off. The weakening grooves 118 extend from the back surface 106 of the skin 10 in the thickness direction Td of the skin 10. A length direction of the weakening grooves 118 may be in the same direction as the extension direction De of the weakening line 102. A depth of the weakening groove 118 may be 0.2 mm to 0.6 mm.

The skin 10 may be made of a thermoplastic elastomer. At room temperature, the thermoplastic elastomer may have a Shore A hardness of 30 to 95, a tensile strength of 2 MPa to 15 MPa, an elongation at break of 100 to 800 percent, and a melt index of 50 g/10 min to 400 g/10 min (230° C./2.16 kg). The thermoplastic elastomer may have a Shore A hardness of 65 to 85, a tensile strength of 5 MPa to 9 MPa, an elongation at break of 200 percent to 600 percent, and a melt index of 150 g/10 min to 300 g/10 min (230° C./2.16 kg).

To ensure that the airbag is smoothly ejected (e.g. de-molded/released), especially in a low-temperature state, the weakening degree of the tear-off section 114 may be matched with the tensile strength of the material, so that at room temperature, the skin 10 at the tear-off section 114 has a tensile strength of 1 MPa to 5 MPa, preferably 2 MPa to 4 MPa, in a direction perpendicular to the extension direction De of the weakening line 102. The tear-off section 114 may be smoothly torn off and opened at a low temperature, and the cracking risk of the tear-off section 114 is low when the tear-off section 114 is stored at a high temperature.

The arrangement of the extensions 112 of the weakening line 102 may be slightly adjusted depending on a toughness of the skin material at low temperatures. When the skin 10 is made of a soft material having good low-temperature toughness in the temperature range of –30° C. to 40° C., the extensions 112 may be somewhat shorter, and the skin 10 may be torn off first from the tear-off section 114 and then along the extensions 112 when the airbag is burst. Because the low-temperature toughness of the material is good, the risk of splashing of the skin 10 is low. As the weakening cavities are reduced, the risk of cracking at the weakening line of the skin in a high-temperature storage state is reduced. When using a soft material having poor low-temperature toughness in the temperature range of –30° C. to 40° C., the extensions 112 are preferably not excessively reduced, and the degree of weakening of the extensions 112 can be appropriately reduced in order to reduce the risk of cracking during high-temperature storage.

The skin 10 may be formed by injection molding, slush molding or calendering. When the skin 10 is formed by injection molding, the weakening cavities 104 of the weakening line 102 may be formed in a process of forming the skin 10 by injection molding, thereby simplifying the manufacturing process. In the case where the skin 10 is formed by slush molding or calendering, the weakening cavities 104 of the weakening line 102 may be formed by hot pressing after a semi-finished product of the skin 10 is formed by slush molding or calendering.

When forming the skin 10 by injection molding, a fixed or movable insert 20 for forming the weakening line 102 may be provided in the injection mold.

Figure 40:
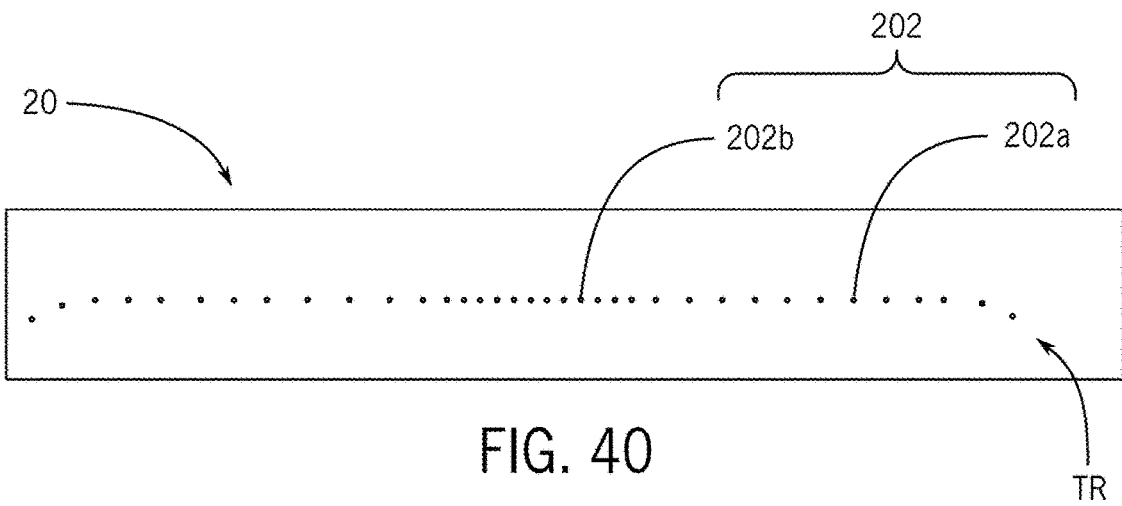
FIG. 40 is a schematic diagram of a tear line for an opening for deployment of an airbag from a vehicle interior component according to an exemplary embodiment.

According to an exemplary embodiment as shown in FIG. 40, a fixed insert 20 for forming the exposed section 110 may be provided with a number of bumps 202a, 202b (collectively referred to as bumps 202). In an injection molding process of the skin 10, corresponding weakening cavities 104 can be formed in the back surface area of the skin corresponding to the front passenger seat airbag by means of the bumps 202 on the insert 20, so that the exposed section 110 of the weakening line 102 is formed on the skin 10. The bumps 202a of left and right side portions of the insert 20 are relatively sparse and the height thereof is relatively low, and the bumps 202a can be used to form the weakening cavities 104a with large spacing and larger residual thickness in the portion outside the tear-off section 114 of the exposed section 110. While the bumps 202b in a middle portion of the insert 20 are relatively dense and the height thereof is relatively high, the bumps 202b can be used to form the weakening cavities 104b with low spacing and a lower residual thickness in the tear-off section 114.

Figure 41:
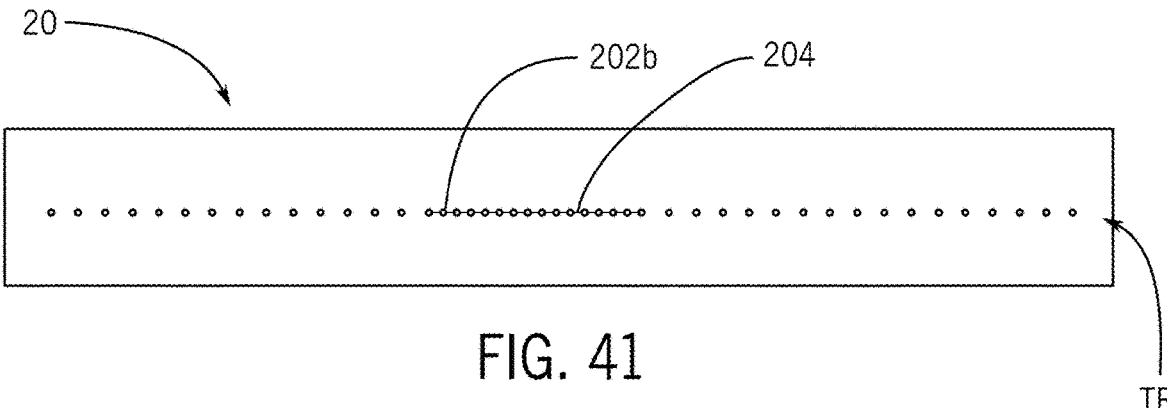
FIG. 41 is a schematic diagram of a tear line for an opening for deployment of an airbag from a vehicle interior component according to an exemplary embodiment.

According to an exemplary embodiment as shown schematically in FIG. 41, a stationary insert 20 for forming the exposed section 110 may comprise bumps 202b of a middle portion of the insert 20; the bumps 202b may be relatively dense and as described above may be used to form the weakening cavities 104b of the tear-off section 114, two adjacent bumps 202b being connected by ribs 204, which may be used to form the weakening grooves 118. The insert 20 shown schematically FIG. 41 may be used to form the exposed section 110 having weakening grooves 118 in the tear-off section 114 as previously described, and is adapted to form the exposed section 110 of the weakening line 102 in the skin 10 formed of a soft material having good low temperature toughness. A height of the ribs 204 should not exceed 30 percent of a skin thickness, which might otherwise interfere with material flow during injection molding to form appearance defects such as bright spots, or flow marks.

According to an exemplary in FIGS. 40 and 41, two types of inserts 20 for forming the exposed section 110 by means of injection molding are shown schematically. The inserts 20 may be designed accordingly according to a specific structure of the exposed section 110, and the inserts 20 may be used in combination with the insert for forming the extension 112 to collectively form the weakening line 102.

Figure 42:
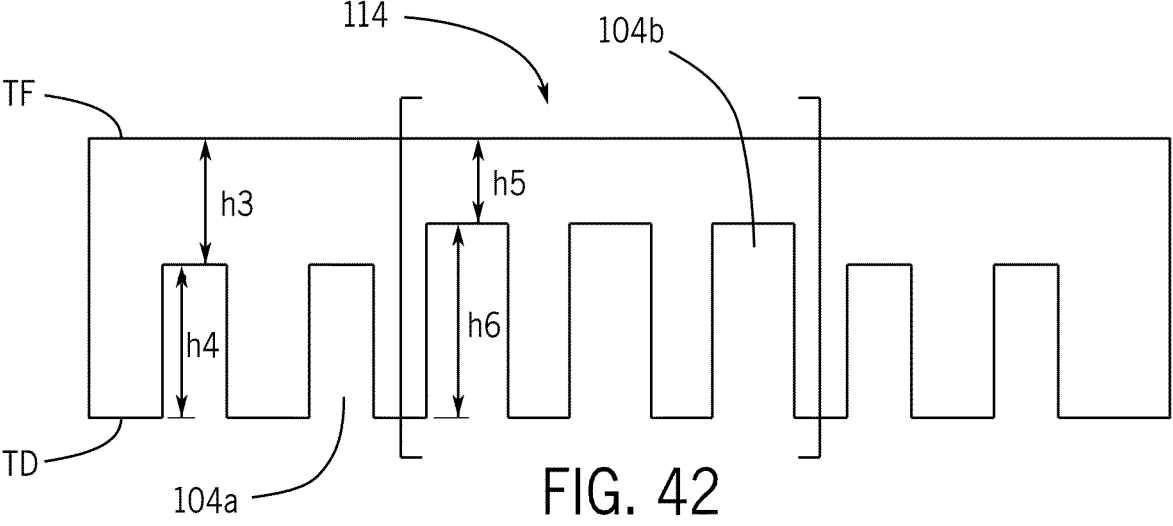
FIG. 42 is a schematic partial side elevation view of cover structure with elements for a tear line for an opening for deployment of an airbag from a vehicle interior component according to an exemplary embodiment.

According to an exemplary embodiment as shown schematically in FIG. 42, the skin 10 may formed by injection molding. The skin 10 may have a thickness of 1 mm. A skin residual thickness h3 of the weakening cavities 104a outside the tear-off section 114 may be 0.4 mm, and a depth h4 of the weakening cavities 104a may be 0.6 mm. A skin residual thickness h5 of the weakening cavities 104b of the tear-off section 114 may be 0.2 mm and a depth h6 of the weakening cavities 104 may be 0.8 mm. A perimeter of the injection molded weakening cavities 104a, 104b may be rounded and fixed in size, which is a distinct feature from laser weakened weakening cavities. The cost of forming the weakening cavities by an injection molding process may be low, the process stability may be good, and the risk of stress cracking at the perimeter of the weakening cavities 104a, 104b may be low.

Figure 43:
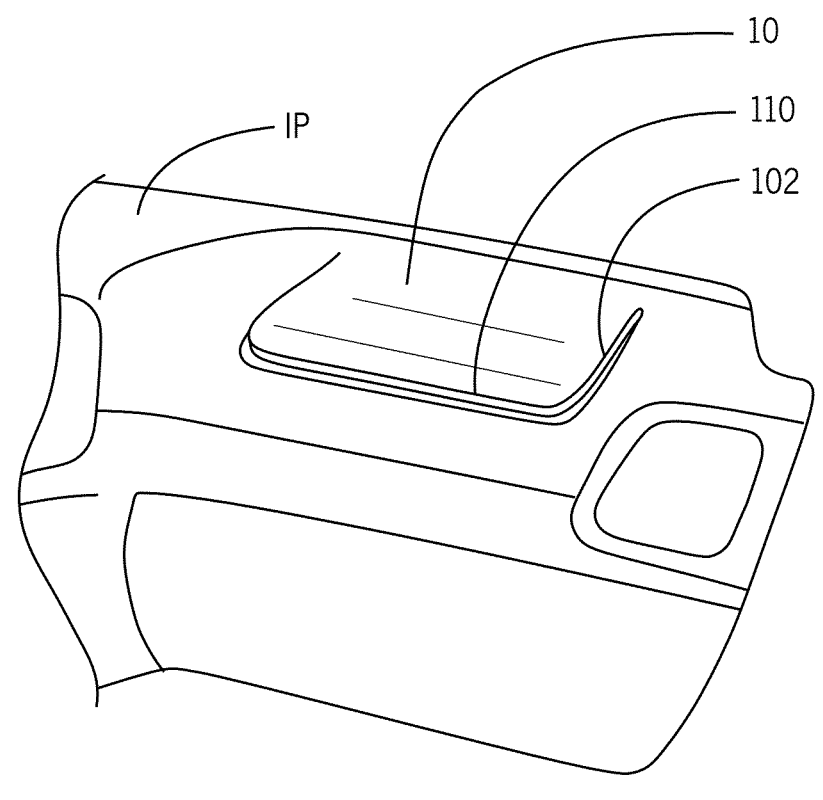
FIG. 43 is a schematic perspective partial view of a vehicle interior component shown as an instrument panel according to an exemplary embodiment.

FIG. 43 shows the schematic effect of tearing of the skin 10 formed by injection molding when the airbag is burst at a low temperature point according to the disclosure. The skin 10 may be torn off neatly along the weakening line 102 without splashing.

In the present disclosure, the terms "connected with", "connection", and the like are to be understood in a broad sense, e.g., "connection" may be a fixed connection, or may be a detachable connection, or integrally connected. The "connection" may be a direct connection or an indirect connection through an intermediary. The specific meaning of the terms in the present disclosure will be understood by those of ordinary skill in the art.

According to an exemplary embodiment, each side facing an interior of the vehicle compartment of the skin of the instrument panel may be referred to as a surface, the opposing/other side of the skin of the instrument panel may be referred to as a back surface (i.e. the surface of the skin can be seen by a passenger or driver without seeing the back surface of the skin). Compare FIGS. 5A (facing/front side shown as cover surface TF) and FIG. 5B (back surface/side shown as cover underside TD).

According to an exemplary embodiment, the cover structure TS for the component CP may comprise the skin for automotive upholstery; the skin may be provided with a line such as a tear line TR comprising a plurality of element such as cavities (e.g. weakening cavities) extending from a cover underside TD providing a back surface of the skin in a thickness direction of the skin; the weakening cavities may be arranged in a pattern such as at intervals from each other to form a weakening line for tear line TR; and the skin of cover structure TS may be suitable for being torn along an extension direction of the weakening line (e.g. to provide an exit door such as a tear-off section); a skin residual thickness of the weakening cavities of the tear-off section is less than a skin residual thickness of the weakening cavities of a portion of the weakening line outside the tear-off section; and the tear-off section may comprise at least two weakening cavities with weakening portions, and the at least two weakening cavities of the tear-off section are arranged such that a connecting line of the weakening portions of the at least two weakening cavities extends in the extension direction of the weakening line. According to an exemplary embodiment as indicated schematically in FIGS. 3A-3F, 5A and 43, the cover structure shown as skin for automotive upholstery will provide excellent appearance and high efficiency for airbag deployment.

Exemplary Embodiments—D

As indicated schematically in FIGS. 2A-2D, 7B-7D, 10A-10B, 11B, 12A-12B, 14, 19B-19D, 37, 38, 39, 42 and 43, the component CP may comprise a cover structure TS providing a cover shown as a single-layer skin/cover. See also FIGS. 44A-44B, 45, 46A-46B, 47, 48, 49, 50 and 51.

As shown schematically in FIGS. 25A-25D, the cover structure may comprise an injection-molded cover structure (e.g. formed from resin material); the cover structure of the component may be formed in a mold tool MT (e.g. by injection molding) configured with a set of projections PR to form the set of cavities CV and with rib arrangement RB to form the groove arrangement GV in the cover underside TD. As indicated schematically in FIGS. 10A-10B, 11A-11B, 12A-12B, 13A-13D and 25A-25D, the form/shape of the cavities CV and projections PR and groove GV and rib RB may be configured to facilitate efficient manufacture (e.g. forming of elements and de-molding release from the mold without creating defects) and suitable aesthetic appearance at the cover surface TF (e.g. tear line not perceptible/visible to a vehicle occupant) and proper operation to provide formation of the opening at the tear line TR in the cover structure for deployment of the airbag. See FIGS. 3A-3F, 5A-5B and 20A-20F. As indicated schematically in FIGS. 2A-2D, 7B-7D, 10A-10B, 11B, 12A-12B, 14, 19B-19D, 37, 38, 39, 42 and 43, the component CP may comprise a cover structure TS providing a cover shown as a single-layer skin/cover. See also FIGS. 44A-44B, 45, 46A-46B, 47, 48, 49, 50 and 51.

According to an exemplary embodiment as indicated schematically in FIGS. 5A-5B and 25A-25D, the mold tool MT may be configured to produce a cover structure TS as a molded cover layer with a relatively thin dimension (approximately 1 mm) with suitable strength and durability and appearance for the component (with molded resin, elastomer, plastic, etc. materials) in the vehicle interior and with a tear line TR configured (e.g. with elements such as cavities at variable depth, groove arrangement/connectors, patterns/spacing, sections, etc.) for efficient formation of the opening for deployment of the airbag AB from the airbag module within the component into the vehicle interior. See also FIGS. 3A-3F and 16A-16F. As indicated schematically in FIGS. 2A-2D, 7B-7D, 10A-10B, 11B, 12A-12B, 14, 19B-19D, 37, 38, 39, 42 and 43, the component CP may comprise a cover structure TS providing a cover shown as a single-layer skin/cover. See also FIGS. 44A-44B, 45, 46A-46B, 47, 48, 49, 50 and 51.

According to an exemplary embodiment as shown schematically in FIGS. 4A-4D, 17A-17D and 25A-25D, a method for forming a component CP comprising a set of cavities CV and at least one groove GV in a mold tool MT may comprise the following steps: closing the mold, injecting a material into the mold to form a cover structure TS with a tear line TR in a cover underside TD (but not visible at a cover surface TF); opening the mold sections, removing the cover and attaching a substrate to the cover structure to form the component CP. The material may comprise a resin material. The cover may comprise a molded cover; the molded cover may comprise a single-layer molded cover and/or a single-layer skin. As indicated schematically in FIGS. 2A-2D, 7B-7D, 10A-10B, 11B, 12A-12B, 14, 19B-19D, 37, 38, 39, 42 and 43, the component CP may comprise a cover structure TS providing a cover shown as a single-layer skin/cover. See also FIGS. 44A-44B, 45, 46A-46B, 47, 48, 49, 50 and 51.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component may comprise a single-layer skin configured to be torn in an extension direction of a weakening line comprising a plurality of weakening holes extending from a back surface of the skin in a thickness direction of the skin. The plurality of weakening holes may be arranged at intervals from each other to form the weakening line; the weakening line may comprise a tear-off section. A skin residual thickness of the weakening holes of the tear-off section may be less than a skin residual thickness of the weakening holes of a portion of the weakening line outside the tear-off section; the tear-off section may comprise at least two weakening holes with weakening portions. At least two weakening holes of the tear-off section may be arranged such that a connecting line of the weakening portions of at least two weakening holes extends in the extension direction of the weakening line. A cross section of the weakening holes of the tear-off section may have an oval shape, and the weakening portions may be end portions of the weakening holes in a long axial direction of the oval shape; a cross section of the weakening holes of the tear-off section may have a polygonal shape, and the weakening portions may be corners of the weakening holes. Spacing between adjacent weakening holes of the tear-off section may be 1 mm to 2 mm. An area of a cross section of the weakening hole of the weakening line may be 0.04 mm2 (square millimeter) to 6 mm2 (square millimeter); an area of a cross section of the weakening hole of the weakening line may remain constant in the thickness direction of the skin; an area of a cross section of the weakening hole of the weakening line may decrease from the back surface of the skin in the thickness direction of the skin; the weakening line may comprise an exposed section at a center thereof; the tear-off section may be located at a center of the exposed section or at both ends of the exposed section. The skin residual thickness of the weakening holes of the tear-off section may be 0.2 mm to 0.6 mm. Adjacent weakening holes of the tear-off section may be connected by a weakening groove extending from the back surface of the skin in the thickness direction of the skin; the weakening groove may comprise a depth of 0.2 mm to 0.6 mm. The skin may comprise a thermoplastic elastomer. The skin may be formed by injection molding, slush molding or calendaring. The weakening holes may be formed (a) in a process of forming the skin by injection molding or (b) by hot pressing after forming a semi-finished product of the skin by slush molding or calendaring. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component may be configured to provide an opening for deployment of an airbag through the opening; the component may comprise a substrate and a cover structure such as a single-layer cover comprising an outer surface and an inner surface; the inner surface may comprise a line configured to provide a tear line for the opening for deployment of the airbag; the line may comprise an opening section comprising a set of cavities and a groove configured to connect at least two cavities of the set of cavities; the line may comprise an intermediate section comprising a set of cavities; the line may comprise a transition section comprising a set of cavities; each set of cavities may comprise at least one cavity comprising a profile; the cover may comprise a molded cover; the groove at the line at the opening section may comprise a depth less than a depth of the set of cavities at the line at the intermediate section. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component may be configured to provide an opening for deployment of an airbag through the opening; the component may comprise a substrate and a single-layer cover comprising a rear side facing the substrate and configured to establish the opening for deployment of the airbag and a front side providing an external surface facing the vehicle interior. The cover may comprise a weakened portion in the rear side of the cover to establish the opening for deployment of the airbag. The front side of the cover may comprise a substantially continuous surface opposite to the weakened portion. The weakened portion may comprise a set of cavities in a pattern. A cavity of the set of cavities may comprise at least one of (a) a bevel; (b) a fillet; (c) a chamfer. The set of cavities may be formed by molding the cover in a mold comprising at least one projection configured to form the cavity. The component may comprise at least one of (a) a trim panel; (b) an instrument panel; (c) a door panel; (d) a pillar; (e) a skin. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior may comprise a skin such as a single-layer skin configured to be torn in an extension direction of a weakening line comprising a plurality of weakening holes extending from a back surface of the skin in a thickness direction of the skin; the plurality of weakening holes may be arranged at intervals from each other to form the weakening line; the weakening line may comprise a tear-off section. A skin residual thickness of the weakening holes of the tear-off section may be less than a skin residual thickness of the weakening holes of a portion of the weakening line outside the tear-off section; the tear-off section may comprise at least two weakening holes with weakening portions. At least two weakening holes of the tear-off section may be arranged such that a connecting line of the weakening portions of at least two weakening holes extends in the extension direction of the weakening line; the skin may comprise a thermoplastic elastomer layer. Adjacent weakening holes of the tear-off section may be connected by a weakening groove extending from a back surface of the thermoplastic elastomer layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior configured to provide an opening for deployment of an airbag through the opening; the component may comprise a substrate and a cover such as a single-layer cover comprising an outer surface and an inner surface; the inner surface may comprise a line configured to provide a tear line for the opening for deployment of the airbag; the line may comprise an opening section comprising a set of cavities and a groove configured to connect at least two cavities of the set of cavities; the line may comprise an intermediate section comprising a set of cavities; the line may comprise a transition section comprising a set of cavities; each set of cavities may comprise at least one cavity comprising a profile; the cover may comprise a molded cover layer; the at least two cavities of the set of cavities and the groove configured to connect the at least two cavities of the set of cavities may be formed in the molded cover layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior may be configured to provide an opening for deployment of an airbag through the opening; the component may comprise a substrate and a cover such as a single-layer cover comprising a rear side facing the substrate and configured to establish the opening for deployment of the airbag and a front side providing an external surface facing the vehicle interior; the cover may comprise a weakened portion in the rear side of the cover to establish the opening for deployment of the airbag; the front side of the cover may comprise a substantially continuous surface opposite to the weakened portion; the weakened portion may comprise a set of cavities in a pattern; the cover may comprise a thermoplastic elastomer layer; the weakened portion may comprise a groove configured to connect at least two cavities of the set of cavities in the thermoplastic elastomer layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior may comprise a cover structure comprising a single-layer skin providing a cover configured to be torn in an extension direction of a weakening line comprising a plurality of weakening holes extending from a back surface of the skin in a thickness direction of the skin. The plurality of weakening holes may be arranged at intervals from each other to form the weakening line. The weakening line may comprise a tear-off section. A skin residual thickness of the weakening holes of the tear-off section may be less than a skin residual thickness of the weakening holes of a portion of the weakening line outside the tear-off section. The tear-off section may comprise at least two weakening holes with weakening portions. At least two weakening holes of the tear-off section may be arranged such that a connecting line of the weakening portions of at least two weakening holes extends in the extension direction of the weakening line. The skin may comprise a thermoplastic elastomer layer. Adjacent weakening holes of the tear-off section may be connected by a weakening groove extending from a back surface of the thermoplastic elastomer layer. A cross section of the weakening holes of the tear-off section may have an oval shape. The weakening portions may be end portions of the weakening holes in a long axial direction of the oval shape. A cross section of the weakening holes of the tear-off section may have a polygonal shape. The weakening portions may be corners of the weakening holes. Spacing between adjacent weakening holes of the tear-off section may be 1 mm to 2 mm. An area of a cross section of the weakening hole of the weakening line may be 0.04 mm2 (square millimeter) to 6 mm2 (square millimeter). An area of a cross section of the weakening hole of the weakening line may remain constant in the thickness direction of the skin. An area of a cross section of the weakening hole of the weakening line may decrease from the back surface of the skin in the thickness direction of the skin. The weakening line may comprise an exposed section at a center thereof; the tear-off section may be located at a center of the exposed section or at both ends of the exposed section. The skin residual thickness of the weakening holes of the tear-off section may be 0.2 mm to 0.6 mm. The weakening groove may extend from the back surface of the skin in the thickness direction of the skin. The weakening groove may comprise a depth of 0.2 mm to 0.6 mm. The weakening groove may comprise a depth in the thermoplastic elastomer layer less than a depth of the adjacent weakening holes of the tear-off section. The skin may be formed by injection molding, slush molding or calendaring. The weakening holes may be formed (a) in a process of forming the skin by injection molding or (b) by hot pressing after forming a semi-finished product of the skin by slush molding or calendaring. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior may be configured to provide an opening for deployment of an airbag through the opening; the component may comprise a substrate and a cover structure comprising a single-layer skin providing a cover comprising an outer surface and an inner surface. The inner surface may comprise a line configured to provide a tear line for the opening for deployment of the airbag. The line may comprise an opening section comprising a set of cavities and a groove configured to connect at least two cavities of the set of cavities. The line may comprise an intermediate section comprising a set of cavities. The line may comprise a transition section comprising a set of cavities. Each set of cavities may comprise at least one cavity comprising a profile. The cover may comprise a molded cover layer. The at least two cavities of the set of cavities and the groove configured to connect the at least two cavities of the set of cavities may be formed in the molded cover layer. The cover may comprise a resin material. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component CP for a vehicle interior may comprise a cover structure TS providing a cover shown as a single-layer skin/cover; the component for a vehicle interior may be configured to provide an opening for deployment of an airbag through the opening; the component may comprise a substrate and a cover structure comprising a single-layer skin providing a cover comprising a rear side facing the substrate and configured to establish the opening for deployment of the airbag and a front side providing an external surface facing the vehicle interior; the cover may comprise a weakened portion in the rear side of the cover to establish the opening for deployment of the airbag; the front side of the cover may comprise a substantially continuous surface opposite to the weakened portion; the weakened portion may comprise a set of cavities in a pattern; the cover may comprise a thermoplastic elastomer layer; the weakened portion may comprise a groove configured to connect at least two cavities of the set of cavities in the thermoplastic elastomer layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the component may comprise at least one of (a) a trim panel, (b) an instrument panel, (c) a door panel, (d) a pillar, (e) a trim panel with the cover structure comprising the single-layer skin with the set of cavities comprising a cavity with a profile, (f) a trim panel with the cover structure comprising the single-layer skin with the set of cavities comprising a cavity with a profile comprising a flat surface and a curved surface, (g) a trim panel with the cover structure comprising the single-layer skin with the set of cavities comprising a cavity with a profile comprising a set of facets, (h) a trim panel with the cover structure comprising the single-layer skin with the set of cavities comprising a multi-faceted shape comprising a flat surface and a curved surface, (i) a trim component with the cover structure comprising the single-layer skin with the set of cavities comprising a profile comprising a multi-faceted shape, ( ) a trim component with the cover structure comprising the single-layer skin with the set of cavities comprising a flat shape and a curved shape, (k) an instrument panel comprising the single-layer skin and an intermediate foam layer, (l) an instrument panel comprising the single-layer skin and an intermediate foam layer and a framework, (m) automotive upholstery comprising the single-layer skin with the set of cavities on an underside, (n) automotive upholstery comprising the single-layer skin with the set of cavities on an underside and an opposing side providing a cover surface, (o) a trim panel with the cover structure comprising the single-layer skin formed as a molded layer with the set of cavities comprising a cavity with a profile comprising a multi-faceted shape, (p) a trim panel with the cover structure comprising the single-layer skin formed as an injection-molded layer with the set of cavities comprising a cavity with a profile comprising a multi-faceted shape, (q) a trim panel with the cover structure comprising the single-layer skin formed as a molded elastomer layer with the set of cavities comprising a cavity with a profile comprising a multi-faceted shape. See also FIGS. 2A-2D, 7B-7D, 10A-

10B, 11B, 12A-12B, 14, 19B-19D, 37, 38, 39, 42 and 43. As indicated schematically in FIGS. 44A-44B and 51, the component may comprise a cover structure comprising a single-layer skin providing a cover with a tear line for an opening for deployment of an airbag from a vehicle interior component according to an exemplary embodiment.

Figures 44A, 44B, 45:
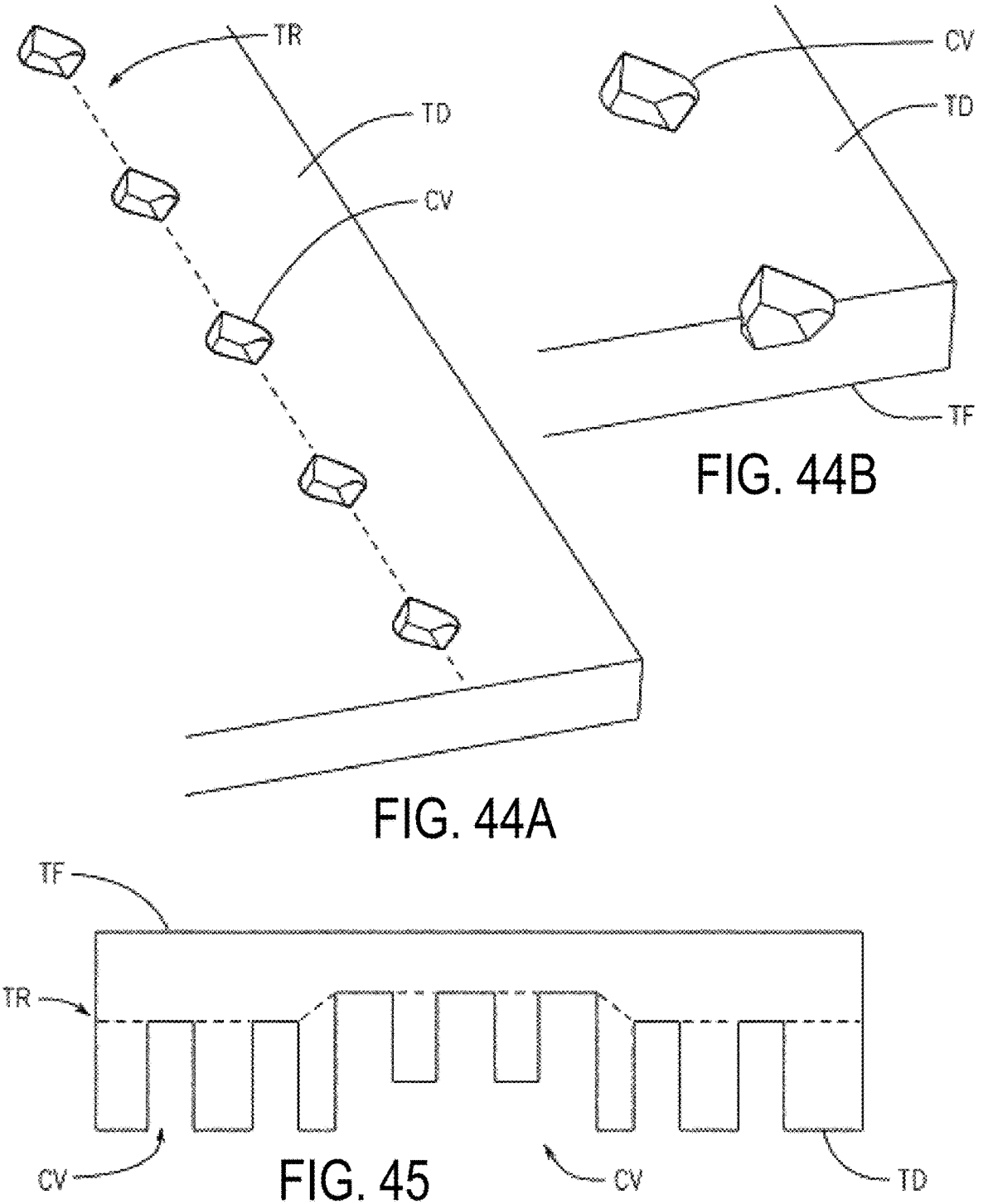
FIGS. 44A and 44B are schematic partial perspective views of a cover structure comprising a single-layer skin providing a cover with a tear line for an opening for deployment of an airbag from a vehicle interior component according to an exemplary embodiment.
FIG. 45 is a schematic partial side elevation view of a cover structure comprising a single-layer skin providing a cover with a tear line for an opening for deployment of an airbag from a vehicle interior component according to an exemplary embodiment.
Figure 51:
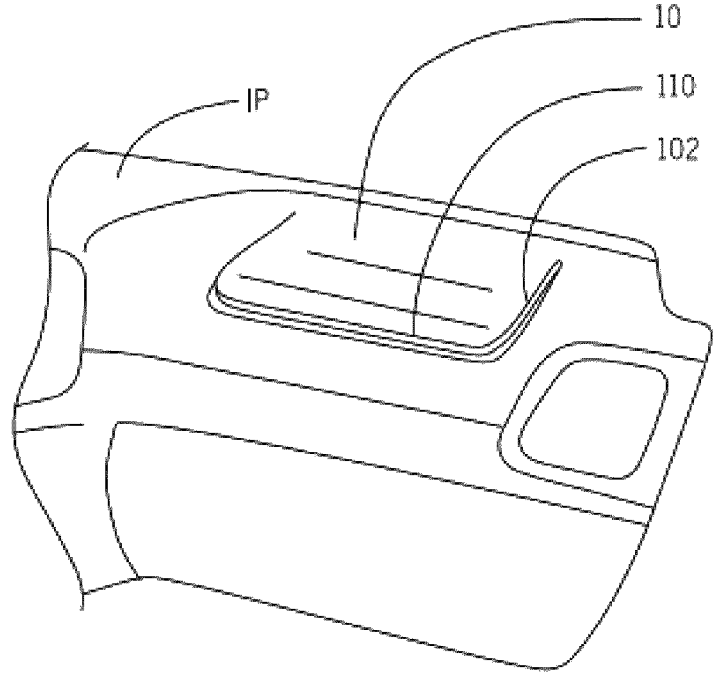
FIG. 51 is a schematic perspective partial view of a vehicle interior component shown as an instrument panel with a cover structure comprising a single-layer skin/cover according to an exemplary embodiment.
Figures 52A, 52B, 52C, 52D:
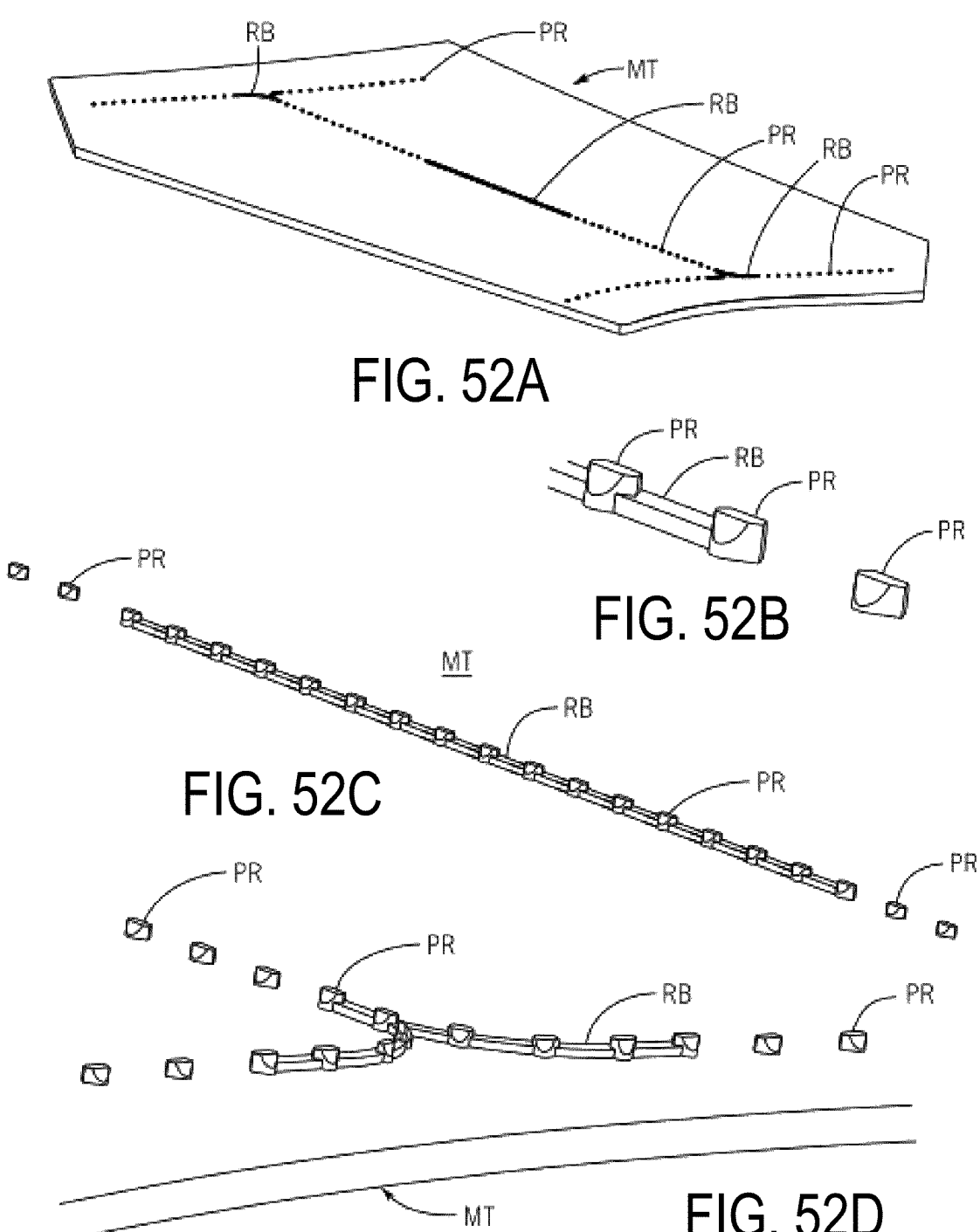
FIG. 52A is a schematic partial perspective view of a mold tool configured to form a vehicle interior component shown as an instrument panel with a cover structure comprising a single-layer skin/cover according to an exemplary embodiment.
FIGS. 52B through 52D are schematic partial perspective views of a mold tool configured to form a vehicle interior component shown as an instrument panel with a cover structure comprising a single-layer skin/cover according to an exemplary embodiment.

As indicated schematically in FIGS. 45 and 51, the component may comprise a cover structure comprising a single-layer skin providing a cover with a tear line for an opening for deployment of an airbag from a vehicle interior component according to an exemplary embodiment.

Figures 46A, 46B:
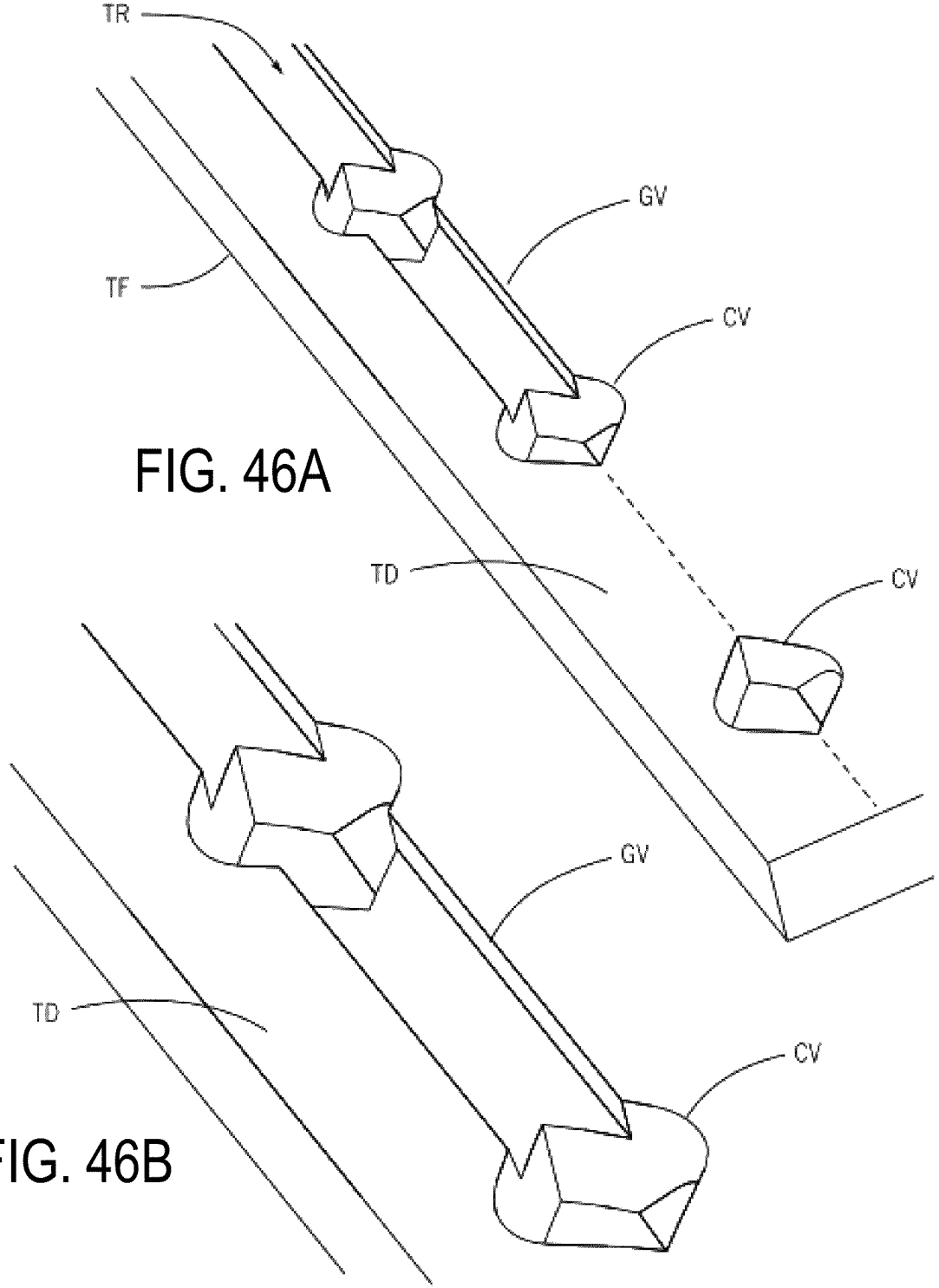
FIGS. 46A and 46B are schematic partial perspective views of a cover structure comprising a single-layer skin providing a cover with a tear line for an opening for deployment of an airbag from a vehicle interior component according to an exemplary embodiment.

As indicated schematically in FIGS. 46A-46B and 51, the component may comprise a cover structure comprising a single-layer skin providing a cover with a tear line for an opening for deployment of an airbag from a vehicle interior component according to an exemplary embodiment.

Figures 47, 48, 49:
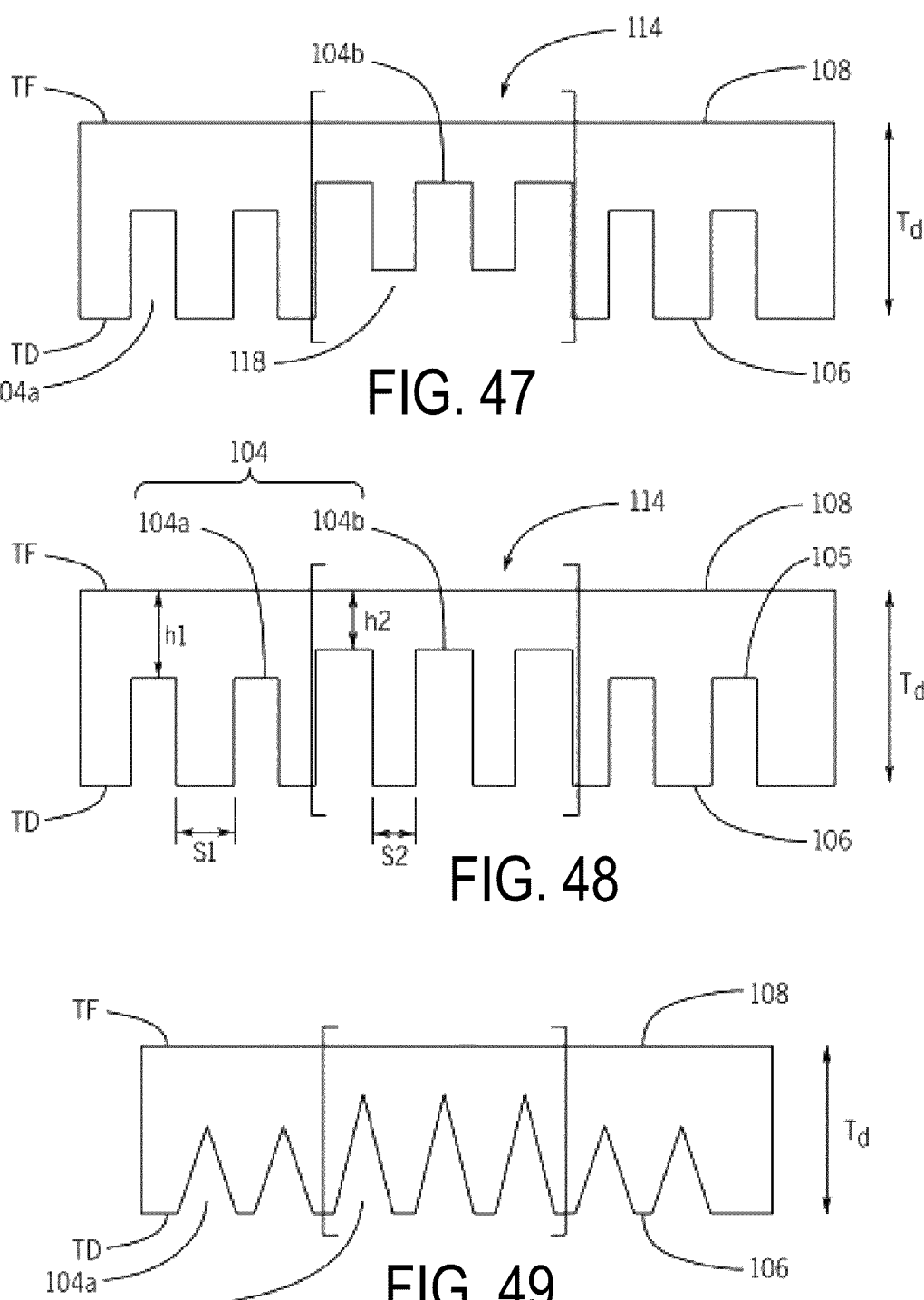
FIG. 47 is a schematic partial side elevation view of a cover structure comprising a single-layer skin providing a cover with elements for a tear line for an opening deployment of an airbag from a vehicle interior component according to an exemplary embodiment.
FIG. 48 is schematic partial side elevation view of a cover structure comprising a single-layer skin providing a cover with elements for a tear line for an opening for deployment of an airbag from a vehicle interior component according to an exemplary embodiment.
FIG. 49 is a schematic partial side elevation view of a cover structure comprising a single-layer skin providing a cover with elements for a tear line for an opening for deployment of an airbag from a vehicle interior component according to an exemplary embodiment.
Figure 50:
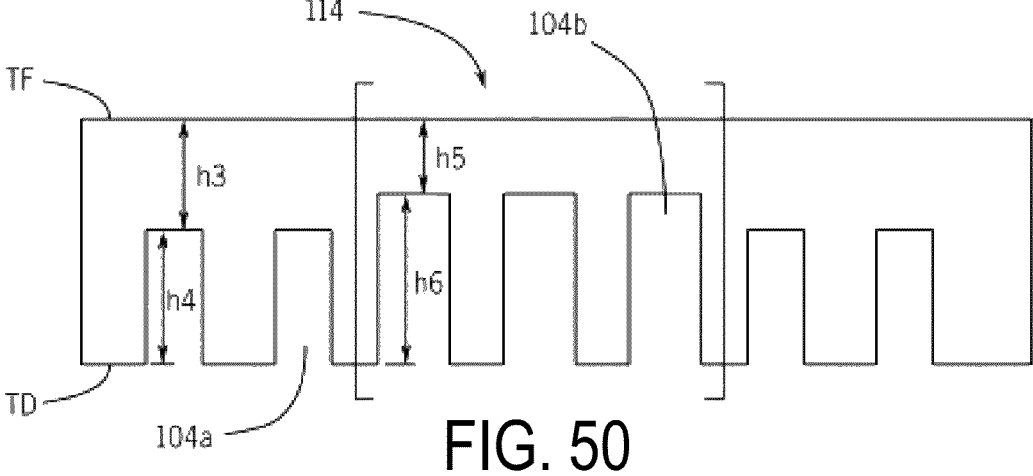
FIG. 50 is a schematic partial side elevation view of a cover structure comprising a single-layer skin providing a cover with elements for a tear line for an opening for deployment of an airbag from a vehicle interior component according to an exemplary embodiment.

As indicated schematically in FIGS. 47. 48, 49, 50 and 51, the component may comprise a cover structure comprising a single-layer skin providing a cover with elements for a tear line for an opening deployment of an airbag from a vehicle interior component according to an exemplary embodiment.

As indicated schematically in FIG. 51, the vehicle interior component shown as an instrument panel may comprise a cover structure comprising a single-layer skin/cover according to an exemplary embodiment.

Exemplary Embodiments—D

Referring to FIGS. 1A and 1B, a vehicle V is shown including an interior I with an instrument panel IP and doors DL. According to an exemplary embodiment, interior components of vehicle V such as instrument panel IP and doors DL may include trim panels. According to an exemplary embodiment, components such as instrument panel IP and doors DL (and other trim components) may provide visible surfaces in the vehicle interior of vehicle V. According to an exemplary embodiment, instrument panel IP and/or doors DL may provide at least one airbag (configured to deploy from an airbag module) that is installed behind/within interior components such as instrument panel IP and/or doors DL. See FIG. 2A.

As indicated schematically according to an exemplary embodiment in FIGS. 2A-2D and 3A-3F, the cover/surface of the component such as instrument panel IP may comprise a single-layer cover configured to provide an area to provide an opening/door for deployment of the airbag (from the airbag module); the cover structure of the component may comprise a weakened line/area such as a seam shown as tear line TR to facilitate formation of the opening/door shown as airbag door ABD through which the airbag AB will deploy from the airbag module (e.g. where the airbag will break through the cover of the component/panel during airbag deployment as intended). See also FIGS. 7B-7D, 10A-10B, 11B, 12A-12B, 14, 19B-19D, 37, 38, 39, 42, 43, 44A-44B, 45, 46A-46B, 47, 48, 49, 50 and 51.

As indicated schematically in FIGS. 3A-3F, 4A-4D, 6, 16A-16F, 17A-17D and 18, the component such as instrument panel IP will provide a cover structure comprising a single-layer cover with the seam shown as tear line TR through which the airbag AB will progressively develop an opening at the tear line TR to provide the airbag door ABD and through which opening the airbag AB will deploy into the vehicle interior. See also FIGS. 2A-2D, 7B-7D, 10A-10B, 11B, 12A-12B, 14, 19B-19D, 37, 38, 39, 42, 43, 44A-44B, 45, 46A-46B, 47, 48, 49, 50 and 51.

As indicated schematically in FIGS. 4A-4D and 5A-5B, the component CP may comprise a cover structure TS providing a single-layer cover comprising a cover underside TD provided with the tear line TR and a cover surface TF shown as providing a generally uniform effect such as texture TX visible at the exterior (e.g. visible from within the vehicle interior). See also FIGS. 2A-2D, 7B-7D, 10A-10B, 11B, 12A-12B, 14, 19B-19D, 37, 38, 39, 42, 43, 44A-44B, 45, 46A-46B, 47, 48, 49, 50 and 51.

As shown schematically in FIGS. 3A-3F, 4A-4D, 5A-5B, 6, 16A-16F, 17A-17D and 18, the tear line TR is configured to provide the opening for deployment of the airbag at an intended position in the cover structure TS from the cover underside TD through the cover surface TF during deployment of the airbag (e.g. when actuated to deploy from the airbag module installed within the component). See also FIGS. 2A-2D, 7B-7D, 10A-10B, 11B, 12A-12B, 14, 19B-19D, 37, 38, 39, 42, 43, 44A-44B, 45, 46A-46B, 47, 48, 49, 50 and 51.

As indicated schematically in FIGS. 5B, 6, 7A-7D, 15A-15C, 18, 19A-19D, 22A-22C, 23A-23C and 24A-24C, the tear line TR is provided/formed as a pattern of set of cavities and/or grooves in sections within the cover underside TD of the cover structure TS comprising the single-layer cover; as indicated schematically, the tear line TR may comprise a set of sections shown as comprising an opening section SP and an intermediate section SM and a transition section ST and a lateral section SL. See also FIGS. 2A-2D, 10A-10B, 11B, 12A-12B, 14, 37, 38, 39, 42, 43, 44A-44B, 45, 46A-46B, 47, 48, 49, 50 and 51. As shown schematically according to an exemplary embodiment in FIGS. 6, 7A-7D, 8A-8B and 9A-9B, the sections of the tear line TR may be configured with elements/features such as cavities and grooves in a pattern/configuration (e.g. size, shape, spacing/proximity, form, etc.) and with a variable depth to facilitate formation of the opening for deployment of the airbag and efficient full deployment of the airbag (e.g. airbag deployment from the airbag module according to a design intent without undue interference, without undue formation of fragments, etc.). See FIGS. 3A-3F and 16A-16F. As shown schematically in FIGS. 3A-3F, 6, 16A-16F and 18, the tear line TR may be configured so that the opening for deployment of the airbag is initially formed at the opening section SP; the tear line TR may be configured so that the opening for deployment of the airbag is formed at the opening section SP, then the intermediate section SM, then the transition section ST, then the lateral section SL. See also FIGS. 15A-15C, 20A-20F, 21A-21F, 22A-22C, 23A-23C and 24A-24C. As indicated schematically in FIGS. 7A-7B, 8A-8B, 9A-9B, 10A-10B, 11A-11B, 12A-12B, 13A-13D and 14, the elements such as cavities CV and groove arrangement GV of the cover underside TD may be configured in a shape/form and at a depth within the cover underside TD for differential weakening at each section of the cover structure comprising the single-layer cover. See also FIGS. 2A-2D, 10A-10B, 11B, 12A-12B, 14, 37, 38, 39, 42, 43, 44A-44B, 45, 46A-46B, 47, 48, 49, 50 and 51. As indicated schematically in FIGS. 3A-3F, 6, 7A-7D, 8A-8B and 9A-9B, the elements such as cavities CV and groove arrangement GV may be configured within the cover underside TD to facilitate the formation of the initial opening for the airbag at the opening section SP (with cavities at greater depth and connected with the groove for weakening at A-A) and the progression of the opening across the intermediate section SM (with cavities at A-B) to the transition section ST (with cavities at greater depth and/or groove configured to direct the opening at B-C) to the lateral section SL (at C-D) of the tear line TR. See also FIGS. 15A-15C, 16A-16F, 18, 19A-19D, 20A-20F, 21A-21F, 22A-22C, 23A-23C and 24A-24C.

As indicated schematically according to an exemplary embodiment in FIGS. 44A-44B, 45, 46A-46B, 47, 48, 49, 50 and 51, a vehicle interior component may comprise a cover structure comprising a single-layer cover configured with a set of elements in the cover underside configured to facilitate the formation of an opening for deployment of an airbag from an airbag module. See also FIGS. 2A-2D, 7B-7D, 10A-10B, 11B, 12A-12B, 14, 19B-19D, 37, 38, 39, 42 and 43. The component may comprise the cover structure/cover configured with a set of elements in the cover underside configured in sections to facilitate the formation of an opening in a progression across the sections for deployment of an airbag from an airbag module; the component may comprise a cover such as a single-layer cover formed by molding and configured with a set of elements in the cover underside configured to facilitate the formation of an opening for deployment of an airbag from an airbag module and to provide a uniform consistent appearance without perceptible defects. The component may comprise a cover such as a single-layer cover formed by molding in a mold tool and configured with a set of elements in the cover underside configured to facilitate the formation of an opening for deployment of an airbag from an airbag module and to be produced in an efficient manner with a relatively thin molded cover and with projections in the mold tool to form the set of elements with a set of projections configured to facilitate formation and efficient release of the cover from the mold tool. The component may comprise a component for a vehicle interior configured to provide an opening for airbag deployment through the opening comprising a substrate and a single-layer cover structure/cover comprising a generally uniform outer/exterior surface and an inner surface comprising a line not readily perceptible at the outer surface to provide a tear line for the opening. The component may comprise a component for a vehicle interior configured to provide an opening for airbag deployment through the opening comprising a substrate and a single-layer cover structure/cover consisting essentially of a resin material. The component may comprise a component for a vehicle interior configured to provide an opening for airbag deployment through the opening comprising a trim panel, instrument panel or door panel with a cover structure comprising a single-layer cover comprising cavities and a groove formed in a mold.

As indicated schematically according to an exemplary embodiment in the FIGURES, the vehicle interior component configured to provide an opening for airbag deployment may comprise a substrate and a cover structure comprising a single-layer cover comprising a generally uniform outer surface and an inner surface comprising a line such as a tear line or seam; the line may be not readily perceptible at the outer surface; the line may comprise a sections and/or a set of cavities; the line may be not readily perceptible at the outer surface; the line may comprise an opening section comprising a set of cavities and a groove connecting a set of cavities; the line may comprise an intermediate section comprising a set of cavities and a transition section comprising a set of cavities. The cover structure may comprise a molded cover such as a single-layer molded cover; the cover structure may comprise a single-layer skin. A cavity may comprise a depth within the inner surface of the cover and a set of facets. The cover structure/cover may consist of a resin material and/or may consist essentially of a resin material. The component may comprise a trim panel, instrument panel or door panel or etc. A method for forming the component comprising the cover structure comprising a single-layer cover comprising cavities and a groove may be performed in a mold/tool.

As indicated schematically according to an exemplary embodiment in FIGS. 44A-44B, 45, 46A-46B, 47, 48, 49, 50 and 51, a component for a vehicle interior may comprise a cover structure comprising a single-layer skin providing a cover configured to be torn in an extension direction of a weakening line comprising a plurality of weakening holes extending from a back surface of the skin in a thickness direction of the skin; the plurality of weakening holes is arranged at intervals from each other to form the weakening line; the weakening line may comprise a tear-off section; a skin residual thickness of the weakening holes of the tear-off section is less than a skin residual thickness of the weakening holes of a portion of the weakening line outside the tear-off section; and the tear-off section may comprise at least two weakening holes with weakening portions; at least two weakening holes of the tear-off section are arranged such that a connecting line of the weakening portions of at least two weakening holes extends in the extension direction of the weakening line; the skin may comprise a thermoplastic elastomer layer; adjacent weakening holes of the tear-off section may be connected by a weakening groove extending from a back surface of the thermoplastic elastomer layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, a cross section of the weakening holes of the tear-off section has an oval shape, and the weakening portions are end portions of the weakening holes in a long axial direction of the oval shape; a cross section of the weakening holes of the tear-off section has a polygonal shape, and the weakening portions are corners of the weakening holes; spacing between adjacent weakening holes of the tear-off section is 1 mm to 2 mm; an area of a cross section of the weakening hole of the weakening line is 0.04 mm2 (square millimeter) to 6 mm2 (square millimeter); an area of a cross section of the weakening hole of the weakening line remains constant in the thickness direction of the skin, or an area of a cross section of the weakening hole of the weakening line decreases from the back surface of the skin in the thickness direction of the skin; the weakening line may comprise an exposed section at a center thereof; the tear-off section is located at a center of the exposed section or at both ends of the exposed section; the skin residual thickness of the weakening holes of the tear-off section is 0.2 mm to 0.6 mm; the weakening groove extends from the back surface of the skin in the thickness direction of the skin; the weakening groove may comprise a depth of 0.2 mm to 0.6 mm; the weakening groove comprises a depth in the thermoplastic elastomer layer less than a depth of the adjacent weakening holes of the tear-off section. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the skin may be formed by injection molding, slush molding or calendaring; the weakening holes may be formed in a process of forming the skin by injection molding and/or by hot pressing after forming a semi-finished product of the skin by slush molding or calendaring. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, a component for a vehicle interior configured to provide an opening for deployment of an airbag through the opening may comprise a substrate and a cover structure comprising a single-layer skin providing a cover comprising an outer surface and an inner surface; the inner surface may comprise a line configured to provide a tear line for the opening for deployment of the airbag; the line comprises an opening section comprising a set of cavities and a groove configured to connect at least two cavities of the set of cavities; the line may comprise an intermediate section comprising a set of cavities; the line comprises a transition section comprising a set of cavities; each set of cavities may comprise at least one cavity comprising a profile; the cover comprises a molded cover layer; the at least two cavities of the set of cavities and the groove configured to connect the at least two cavities of the set of cavities are formed in the molded cover layer. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, the cover may consist of a resin material; the cover may consist essentially of a resin material. See also FIGS. 2A-2D, 7B-7D, 10A-10B, 11B, 12A-12B, 14, 19B-19D, 37, 38, 39, 42 and 43. The cover structure may consist of and/or consist essentially of a resin material; the cover/cover structure may consist of and/or consist essentially of a resin material in a single layer.

As indicated schematically according to an exemplary embodiment in FIGS. 44A-44B, 45, 46A-46B, 47, 48, 49, 50 and 51, a component for a vehicle interior may be configured to provide an opening for deployment of an airbag through the opening; the component may comprise a substrate and a cover structure comprising a single-layer skin providing a cover comprising a rear side facing the substrate and configured to establish the opening for deployment of the airbag and a front side providing an external surface facing the vehicle interior; the cover may comprise a weakened portion in the rear side of the cover to establish the opening for deployment of the airbag; the front side of the cover may comprise a substantially continuous surface opposite to the weakened portion; the weakened portion comprises a set of cavities in a pattern; the cover may comprise a thermoplastic elastomer layer; the weakened portion comprises a groove configured to connect at least two cavities of the set of cavities in the thermoplastic elastomer layer. See also FIGS. 2A-2D, 7B-7D, 10A-10B, 11B, 12A-12B, 14, 19B-19D, 37, 38, 39, 42 and 43. As indicated schematically according to an exemplary embodiment in the FIGURES, the groove at the line at the opening section may comprise a depth less than a depth of the set of cavities at the line at the intermediate section.

As indicated schematically according to an exemplary embodiment in FIGS. 44A-44B, 45, 46A-46B, 47, 48, 49, 50 and 51, the cavity of the set of cavities may comprise at least one of a bevel, a fillet, a chamfer, etc. See also FIGS. 2A-2D, 7B-7D, 10A-10B, 11B, 12A-12B, 14, 19B-19D, 37, 38, 39, 42 and 43. As indicated schematically according to an exemplary embodiment in FIGS. 44A-44B, 45, 46A-46B, 47, 48, 49, 50 and 51, the set of cavities may be formed by molding the cover in a mold comprising at least one projection configured to form the cavity. See also FIGS. 2A-2D, 7B-7D, 10A-10B, 11B, 12A-12B, 14, 19B-19D, 37, 38, 39, 42 and 43.

As indicated schematically according to an exemplary embodiment in FIGS. 44A-44B, 45, 46A-46B, 47, 48, 49, 50 and 51, a component for a vehicle interior may comprise at least one of (a) a trim panel; (b) an instrument panel; (c) a door panel; (d) a pillar; (e) a trim panel with the cover structure comprising the single-layer skin with the set of cavities comprising a cavity with a profile; (f) a trim panel with the cover structure comprising the single-layer skin with the set of cavities comprising a cavity with a profile comprising a flat surface and a curved surface; (g) a trim panel with the cover structure comprising the single-layer skin with the set of cavities comprising a cavity with a profile comprising a set of facets; (h) a trim panel with the cover structure comprising the single-layer skin with the set of cavities comprising a multi-faceted shape comprising a flat surface and a curved surface; (i) a trim component with the cover structure comprising the single-layer skin with the set of cavities comprising a profile comprising a multi-faceted shape; (j) a trim component with the cover structure comprising the single-layer skin with the set of cavities comprising a flat shape and a curved shape; (k) an instrument panel comprising the single-layer skin and an intermediate foam layer; (l) an instrument panel comprising the single-layer skin and an intermediate foam layer and a framework; (m) automotive upholstery comprising the single-layer skin with the set of cavities on an underside; (n) automotive upholstery comprising the single-layer skin with the set of cavities on an underside and an opposing side providing a cover surface; (o) a trim panel with the cover structure comprising the single-layer skin formed as a molded layer with the set of cavities comprising a cavity with a profile comprising a multi-faceted shape; (p) a trim panel with the cover structure comprising the single-layer skin formed as an injection-molded layer with the set of cavities comprising a cavity with a profile comprising a multi-faceted shape; (q) a trim panel with the cover structure comprising the single-layer skin formed as a molded elastomer layer with the set of cavities comprising a cavity with a profile comprising a multi-faceted shape. See also FIGS. 2A-2D, 7B-7D, 10A-10B, 11B, 12A-12B, 14, 19B-19D, 37, 38, 39, 42 and 43.

TABLE A

| REFERENCE SYMBOL LIST | |
|---|---|
| REFERENCE SYMBOL | ELEMENT, PART OR COMPONENT |
| V | Vehicle |
| I | Vehicle interior |
| CP | Component |
| IP | Instrument panel |
| DL | Door panel |
| AB | Air bag |
| ABD | Air bag door |
| TR | Tear/tear line (seam) |
| TS | Cover structure (e.g. layer, cover layer, single-layer cover/skin, etc.) |
| TF | Cover surface |
| TX | Cover texture/surface effect |
| TD | Cover underside |
| CV | Cavity |
| GV | Groove |
| Fx, Fa, Fb, Fc, Fd, Fe | Facets |
| SP | Opening section |
| SM | Intermediate section |
| ST | Transition section |
| SL | Lateral section |
| MT | Mold tool |
| RB | Rib |
| PR | Protrusion |
| 10 | Skin (e.g. single-layer cover/skin) |
| 102 | Weakening line |
| 104 | Weakening cavity |

TABLE A-continued

REFERENCE SYMBOL LIST

| REFERENCE SYMBOL | ELEMENT, PART OR COMPONENT |
|---|---|
| 110 | Exposed section of weakening line |
| 112 | Extension of weakening line |
| 114 | Tear-off section |
| 116 | Weakening portion |
| | (e.g. end portion, corners, etc.) |
| 117 | Connecting line |
| 104a | Weakening cavity (outside of 114 tear-off section) |
| 104b | Weakening cavity (inside of 114 tear-off section) |
| 118 | Weakening groove |
| 105 | Bottom of weakening cavity |
| 106 | Back surface |
| 108 | Surface |
| h1 | Skin residual thickness |
| h2 | Skin residual thickness |
| S1 | Spacing |
| S2 | Spacing |
| Td | Thickness |
| 20 | Fixed insert |
| 202 | Bump |
| 202a | Bump |
| 202b | Bump |
| 204 | Rib |
| h3 | Skin residual thickness |
| h4 | Depth of weakening cavity |
| h5 | Skin residual thickness |
| h6 | Depth of weakening cavity |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior configured to provide an opening for deployment of an airbag through the opening comprising:

a substrate; and a cover structure comprising a single-layer skin providing a cover comprising a rear side facing the substrate and configured to establish the opening for deployment of the airbag and a front side providing an external surface facing the vehicle interior;

wherein the cover comprises a weakened portion in the rear side of the cover to establish the opening for deployment of the airbag;

wherein the front side of the cover comprises a substantially continuous surface opposite to the weakened portion;

wherein the weakened portion comprises a set of cavities in a pattern;

wherein the cover comprises a thermoplastic elastomer layer;

wherein the weakened portion comprises a groove configured to connect at least two cavities of the set of cavities in the thermoplastic elastomer layer;

comprising at least one of (a) a trim panel; (b) an instrument panel; (c) a door panel; (d) a pillar; (e) a trim panel with the cover structure comprising the single-layer skin with the set of cavities comprising a cavity with a profile; (f) a trim panel with the cover structure comprising the single-layer skin with the set of cavities comprising a cavity with a profile comprising a flat surface and a curved surface; (g) a trim panel with the cover structure comprising the single-layer skin with the set of cavities comprising a cavity with a profile comprising a set of facets; (h) a trim panel with the cover structure comprising the single-layer skin with the set of cavities comprising a multi-faceted shape comprising a flat surface and a curved surface; (i) a trim component with the cover structure comprising the single-layer skin with the set of cavities comprising a profile comprising a multi-faceted shape; (j) a trim component with the cover structure comprising the single-layer skin with the set of cavities comprising a flat shape and a curved shape; (k) an instrument panel comprising the single-layer skin and an intermediate foam layer; (l) an instrument panel comprising the single-layer skin and an intermediate foam layer and a framework; (m) automotive upholstery comprising the single-layer skin with the set of cavities on an underside; (n) automotive upholstery comprising the single-layer skin with the set of cavities on an underside and an opposing side providing a cover surface; (o) a trim panel with the cover structure comprising the single-layer skin formed as a molded layer with the set of cavities comprising a cavity with a profile comprising a multi-faceted shape; (p) a trim panel with the cover structure comprising the single-layer skin formed as an injection-molded layer with the set of cavities comprising a cavity with a profile comprising a multi-faceted shape; (q) a trim panel with the cover structure comprising the single-layer skin formed as a molded elastomer layer with the set of cavities comprising a cavity with a profile comprising a multi-faceted shape.

2. The component of claim 1 wherein a cavity of the set of cavities comprises at least one of (a) a bevel; (b) a fillet; (c) a chamfer.

3. The component of claim 1 wherein the set of cavities is formed by molding the cover in a mold comprising at least one projection configured to form the cavity.

4. The component of claim 1 wherein the inner surface comprises a line configured to provide a tear line for the opening for deployment of the airbag; wherein the tear line comprises an opening section comprising a set of cavities and a groove configured to connect at least two cavities of the set of cavities; wherein the tear line comprises an intermediate section comprising a set of cavities; wherein the tear line comprises a transition section comprising a set of cavities.

5. The component of claim 4 wherein the cover comprises a molded cover layer.

6. The component of claim 4 wherein at least two cavities of the set of cavities are configured to connect to a groove configured to provide the tear line.

7. The component of claim 6 wherein the groove comprises a depth less than a depth of the set of cavities at the tear line at the intermediate section.

8. The component of claim 1 wherein the cover consists essentially of a resin material.

9. The component of claim 1 wherein the cover is configured to be torn in an extension direction of a weakening line comprising a plurality of weakening holes extending from a back surface of the skin in a thickness direction of the skin.

10. The component of claim 9 wherein the plurality of weakening holes is arranged at intervals from each other to form the weakening line.

11. The component of claim 9 wherein the weakening line comprises a tear-off section.

12. The component of claim 9 wherein a skin residual thickness of the weakening holes of the tear-off section is less than a skin residual thickness of the weakening holes of a portion of the weakening line outside the tear-off section.

13. The component of claim 9 wherein the tear-off section comprises at least two weakening holes with weakening portions; wherein at least two weakening holes of the tear-off section are arranged such that a connecting line of weakening portions of at least two weakening holes extends in the extension direction of the weakening line.

14. The component of claim 9 wherein adjacent weakening holes of the tear-off section are connected by a weakening groove extending from a back surface of the thermoplastic elastomer layer.

15. The component of claim 9 wherein spacing between adjacent weakening holes of the tear-off section is 1 mm to 2 mm.

16. The component of claim 9 wherein the weakening line comprises an exposed section at a center; wherein the tear-off section is located at a center of the exposed section.

17. The component of claim 9 wherein the skin residual thickness of the weakening holes of the tear-off section is 0.2 mm to 0.6 mm; wherein the weakening groove comprises a depth of 0.2 mm to 0.6 mm.

18. The component of claim 9 wherein the weakening groove comprises a depth in the thermoplastic elastomer layer less than a depth of the adjacent weakening holes of the tear-off section.

19. The component of claim 9 wherein the skin is formed by injection molding, slush molding or calendaring.

20. The component of claim 9 wherein the weakening holes are formed (a) in a process of forming the skin by injection molding or (b) by hot pressing after forming a semi-finished product of the skin by slush molding or calendaring.

* * * * *